United States Patent
Niergarth et al.

(10) Patent No.: US 12,503,980 B2
(45) Date of Patent: *Dec. 23, 2025

(54) GAS TURBINE ENGINE

(71) Applicant: General Electric Company, Evendale, OH (US)

(72) Inventors: Daniel Alan Niergarth, Norwood, OH (US); Jeffrey Donald Clements, Mason, OH (US); Jeffrey S. Spruill, Hillsboro, OH (US); Erich Alois Krammer, West Chester, OH (US); Matthew Kenneth MacDonald, Austin, TX (US); Scott Alan Schimmels, Miamisburg, OH (US); Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/032,996

(22) Filed: Jan. 21, 2025

(65) Prior Publication Data

US 2025/0163853 A1   May 22, 2025

Related U.S. Application Data

(63) Continuation-in-part of application No. 18/481,515, filed on Oct. 5, 2023, which is a continuation-in-part
(Continued)

(51) Int. Cl.
*F02C 7/00*    (2006.01)
*F01D 5/14*    (2006.01)
(Continued)

(52) U.S. Cl.
CPC .............. *F02C 7/185* (2013.01); *F01D 5/143* (2013.01); *F01D 5/146* (2013.01); *F01D 5/282* (2013.01);
(Continued)

(58) Field of Classification Search
CPC .......... F02C 7/185; F02K 3/077; F01D 5/282; F01D 5/143; F01D 5/146
See application file for complete search history.

(56) References Cited

U.S. PATENT DOCUMENTS 2,264,297 A    12/1941  Clay
2,623,721 A    12/1952  Harrington
(Continued)

FOREIGN PATENT DOCUMENTS

CH    308991 A    8/1955
CN    1603596 A   4/2005
(Continued)

OTHER PUBLICATIONS

Bae, Integrally Cored Ceramic Investment Casting Mold Fabricated by Ceramic Stereolithography, Chapter 5, A Dissertation Submitted in Partial Fulfillment of the Requirements for the Degree of Doctor of Philosophy, Materials and Engineering, 2008, pp. 102-139.
(Continued)

*Primary Examiner* — Katheryn A Malatek
(74) *Attorney, Agent, or Firm* — Dority & Manning, P.A.

(57) ABSTRACT

A gas turbine engine is provided. The gas turbine engine includes: a turbomachine having a compressor section, a combustion section, and a turbine section arranged in serial flow order, the compressor section having a high pressure compressor defining a high pressure compressor exit area ($A_{HPCExit}$) in square inches; wherein the gas turbine engine defines a redline exhaust gas temperature (EGT) in degrees Celsius, a total sea level static thrust output ($Fn_{Total}$) in
(Continued)

pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

20 Claims, 19 Drawing Sheets

Related U.S. Application Data of application No. 17/978,629, filed on Nov. 1, 2022, now abandoned.

(51) Int. Cl.
    *F01D 5/28*     (2006.01)
    *F02C 7/18*     (2006.01)
    *F02C 9/18*     (2006.01)

(52) U.S. Cl.
    CPC ............ *F02C 9/18* (2013.01); *F05D 2200/14* (2013.01); *F05D 2260/213* (2013.01); *F05D 2300/603* (2013.01)

(56) References Cited

U.S. PATENT DOCUMENTS

| | | |
|---|---|---|
| 3,039,736 A | 6/1962 | Pon |
| 3,193,185 A | 7/1965 | Erwin et al. |
| 3,420,055 A | 1/1969 | Lavash |
| 3,528,250 A | 9/1970 | Johnson |
| 3,628,885 A | 12/1971 | Sidenstick |
| 3,651,645 A | 3/1972 | Grieb |
| 3,692,425 A | 9/1972 | Erwin |
| 3,779,007 A | 12/1973 | Lavash |
| 3,861,139 A | 1/1975 | Jones |
| 4,012,012 A | 3/1977 | Ligler |
| 4,023,350 A | 5/1977 | Hovan et al. |
| 4,064,692 A | 12/1977 | Johnson et al. |
| 4,078,604 A | 3/1978 | Christl et al. |
| 4,078,761 A | 3/1978 | Thompson |
| 4,120,150 A | 10/1978 | Wakeman |
| 4,137,705 A | 2/1979 | Andersen et al. |
| 4,254,618 A | 3/1981 | Elovic |
| 4,263,786 A | 4/1981 | Eng |
| 4,546,605 A | 10/1985 | Mortimer et al. |
| 4,696,156 A | 9/1987 | Burr et al. |
| 4,741,152 A | 5/1988 | Burr et al. |
| 4,773,212 A | 9/1988 | Griffin et al. |
| 4,776,536 A | 10/1988 | Hudson et al. |
| 4,815,940 A | 3/1989 | LeShane et al. |
| 4,966,005 A | 10/1990 | Cowell et al. |
| 5,024,580 A | 6/1991 | Olive |
| 5,121,598 A | 6/1992 | Butler |
| 5,152,146 A | 10/1992 | Butler |
| 5,152,661 A | 10/1992 | Sheets |
| 5,177,951 A | 1/1993 | Butler |
| 5,203,163 A | 4/1993 | Parsons |
| 5,241,814 A | 9/1993 | Butler |
| 5,255,505 A | 10/1993 | Cloyd et al. |
| 5,256,340 A | 10/1993 | Allison et al. |
| 5,261,227 A | 11/1993 | Giffin, III |
| 5,296,308 A | 3/1994 | Caccavale et al. |
| 5,297,386 A | 3/1994 | Kervistin |
| 5,305,616 A | 4/1994 | Coffinberry |
| 5,317,877 A | 6/1994 | Stuart |
| 5,370,499 A | 12/1994 | Lee |
| 5,387,380 A | 2/1995 | Cima et al. |
| 5,392,614 A | 2/1995 | Coffinberry |
| 5,402,638 A | 4/1995 | Johnson |
| 5,414,992 A | 5/1995 | Glickstein |
| 5,511,374 A | 4/1996 | Glickstein et al. |
| 5,544,700 A | 8/1996 | Shagoury |
| 5,545,003 A | 8/1996 | O'Connor et al. |
| 5,553,449 A | 9/1996 | Rodgers et al. |
| 5,554,000 A | 9/1996 | Katoh et al. |
| 5,558,303 A | 9/1996 | Koethe et al. |
| 5,615,547 A | 4/1997 | Beutin et al. |
| 5,619,855 A | 4/1997 | Burrus |
| 5,680,767 A | 10/1997 | Lee et al. |
| 5,724,816 A | 3/1998 | Ritter et al. |
| 5,725,355 A | 3/1998 | Crall et al. |
| 5,782,076 A | 7/1998 | Huber et al. |
| 5,802,841 A | 9/1998 | Maeda |
| 5,819,525 A | 10/1998 | Gaul et al. |
| 5,853,044 A | 12/1998 | Wheaton et al. |
| 5,918,458 A | 7/1999 | Coffinberry et al. |
| 6,106,229 A | 8/2000 | Nikkanen et al. |
| 6,117,612 A | 9/2000 | Halloran et al. |
| 6,139,259 A | 10/2000 | Ho et al. |
| 6,182,435 B1 | 2/2001 | Niggemann et al. |
| 6,182,458 B1 | 2/2001 | Franklin, Jr. |
| 6,253,554 B1 | 7/2001 | Kobayashi et al. |
| 6,302,191 B1 | 10/2001 | Wickham et al. |
| 6,347,660 B1 | 2/2002 | Sikkenga et al. |
| 6,415,595 B1 | 7/2002 | Wilmot, Jr. et al. |
| 6,578,362 B1 | 6/2003 | Coffinberry |
| 6,584,778 B1 | 7/2003 | Griffiths et al. |
| 6,595,749 B2 | 7/2003 | Lee et al. |
| 6,805,535 B2 | 10/2004 | Tiemann |
| 6,913,064 B2 | 7/2005 | Beals et al. |
| 6,990,797 B2 | 1/2006 | Venkataramani et al. |
| 6,993,913 B2 | 2/2006 | Kobayashi et al. |
| 7,000,404 B2 | 2/2006 | Palmisano et al. |
| 7,090,463 B2 | 8/2006 | Milburn et al. |
| 7,094,027 B2 | 8/2006 | Turner et al. |
| 7,140,174 B2 | 11/2006 | Johnson |
| 7,143,581 B2 | 12/2006 | Kobayashi et al. |
| 7,188,464 B2 | 3/2007 | Ackerman et al. |
| 7,216,475 B2 | 5/2007 | Johnson |
| 7,231,769 B2 | 6/2007 | Spadaccini et al. |
| 7,260,926 B2 | 8/2007 | Sabatino et al. |
| 7,306,026 B2 | 12/2007 | Memmen |
| 7,395,657 B2 | 7/2008 | Johnson |
| 7,448,433 B2 | 11/2008 | Ortiz et al. |
| 7,452,202 B2 | 11/2008 | Gram |
| 7,481,214 B2 | 1/2009 | Eilers |
| 7,527,475 B1 | 5/2009 | Liang |
| 7,533,713 B2 | 5/2009 | Pfeifer et al. |
| 7,594,325 B2 | 9/2009 | Read |
| 7,608,131 B2 | 10/2009 | Jensen |
| 7,610,946 B2 | 11/2009 | Morris et al. |
| 7,624,592 B2 | 12/2009 | Lui et al. |
| 7,716,913 B2 | 5/2010 | Rolt |
| 7,717,676 B2 | 5/2010 | Cunha et al. |
| 7,753,104 B2 | 7/2010 | Luczak et al. |
| 7,770,381 B2 | 8/2010 | Johnson et al. |
| 7,836,680 B2 | 11/2010 | Schwarz et al. |
| 7,926,289 B2 | 4/2011 | Lee et al. |
| 8,015,788 B2 | 9/2011 | Stephenson et al. |
| 8,056,345 B2 | 11/2011 | Norris et al. |
| 8,066,052 B2 | 11/2011 | Blair |
| 8,105,042 B2 | 1/2012 | Parkin et al. |
| 8,303,258 B2 | 11/2012 | Aubin |
| 8,307,662 B2 | 11/2012 | Turco |
| 8,419,374 B2 | 4/2013 | Huth et al. |
| 8,506,836 B2 | 8/2013 | Szuromi et al. |
| 8,573,947 B2 | 11/2013 | Klinetob et al. |
| 8,641,807 B2 | 2/2014 | Thomas |
| 8,696,319 B2 | 4/2014 | Naik |
| 8,747,055 B2 | 6/2014 | McCune et al. |
| 8,789,376 B2 | 7/2014 | Coffinberry |
| 8,814,527 B2 | 8/2014 | Huth et al. |
| 8,845,286 B2 | 9/2014 | Ramachandran et al. |
| 8,851,151 B2 | 10/2014 | Frasier et al. |
| 8,851,855 B2 | 10/2014 | James et al. |
| 8,920,127 B2 | 12/2014 | McCaffrey |
| 8,943,827 B2 | 2/2015 | Prociw et al. |
| 8,955,330 B2 | 2/2015 | Narcus et al. |
| 8,961,114 B2 | 2/2015 | Ruthemeyer |
| 8,985,540 B1 | 3/2015 | Slesinski |
| 9,039,382 B2 | 5/2015 | Stapleton |
| 9,045,991 B2 | 6/2015 | Read et al. |
| 9,079,357 B2 | 7/2015 | Ebert et al. |

(56) References Cited

U.S. PATENT DOCUMENTS

| | | |
|---|---|---|
| 9,200,855 B2 | 12/2015 | Kington et al. |
| 9,410,482 B2 | 8/2016 | Krautheim et al. |
| 9,422,063 B2 | 8/2016 | Diaz |
| 9,429,072 B2 | 8/2016 | Diaz et al. |
| 9,458,764 B2 | 10/2016 | Alecu et al. |
| 9,650,147 B2 | 5/2017 | Selechert et al. |
| 9,677,501 B2 | 6/2017 | Pierluissi et al. |
| 9,835,035 B2 | 12/2017 | Mueller et al. |
| 9,845,768 B2 | 12/2017 | Pesyna et al. |
| 9,909,505 B2 | 3/2018 | Gallagher et al. |
| 9,920,710 B2 | 3/2018 | Dawson et al. |
| 9,995,314 B2 | 6/2018 | Miller et al. |
| 10,022,790 B2 | 7/2018 | Lee et al. |
| 10,087,766 B2 | 10/2018 | Pope et al. |
| 10,100,736 B2 | 10/2018 | Niergarth et al. |
| 10,260,419 B2 | 4/2019 | Cerny et al. |
| 10,280,486 B2 | 5/2019 | Zhang et al. |
| 10,352,243 B2 | 7/2019 | Mizukami et al. |
| 10,399,270 B2 | 9/2019 | Xu et al. |
| 10,399,664 B2 | 9/2019 | Bowden et al. |
| 10,408,072 B2 | 9/2019 | Bielek et al. |
| 10,578,028 B2 | 3/2020 | Becker, Jr. |
| 10,654,579 B2 | 5/2020 | Diaz |
| 10,760,428 B2 | 9/2020 | Kray et al. |
| 10,815,886 B2 | 10/2020 | Kroger et al. |
| 10,844,725 B2 | 11/2020 | Pouzadoux et al. |
| 10,913,133 B2 | 2/2021 | Bales et al. |
| 11,131,314 B2 | 9/2021 | Welch |
| 11,351,599 B2 | 6/2022 | Deines et al. |
| 11,655,768 B2 | 5/2023 | Sibbach et al. |
| 11,725,526 B1 | 8/2023 | Sibbach et al. |
| 11,739,689 B2 | 8/2023 | Sibbach et al. |
| 2001/0024000 A1 | 9/2001 | Lee et al. |
| 2005/0109016 A1 | 5/2005 | Ullyott |
| 2005/0147497 A1 | 7/2005 | Doerffer et al. |
| 2005/0205232 A1 | 9/2005 | Wang et al. |
| 2008/0006384 A1 | 1/2008 | Memmen |
| 2008/0080979 A1 | 4/2008 | Brassfield et al. |
| 2008/0110603 A1 | 5/2008 | Fellague et al. |
| 2008/0135722 A1 | 6/2008 | Wang et al. |
| 2008/0190093 A1 | 8/2008 | Gauthier et al. |
| 2008/0310955 A1 | 12/2008 | Norris et al. |
| 2008/0314573 A1 | 12/2008 | Schwarz et al. |
| 2009/0060714 A1 | 3/2009 | Moors |
| 2009/0175718 A1 | 7/2009 | Diaz et al. |
| 2009/0188234 A1 | 7/2009 | Suciu et al. |
| 2009/0211273 A1 | 8/2009 | Klewer |
| 2009/0229812 A1 | 9/2009 | Pineo et al. |
| 2010/0003619 A1 | 1/2010 | Das et al. |
| 2010/0025001 A1 | 2/2010 | Lee et al. |
| 2010/0028645 A1 | 2/2010 | Maguire et al. |
| 2010/0068464 A1 | 3/2010 | Meyer |
| 2010/0068465 A1 | 3/2010 | Su et al. |
| 2010/0107603 A1 | 5/2010 | Smith |
| 2010/0139288 A1 | 6/2010 | Rago |
| 2010/0170262 A1 | 7/2010 | Kaslusky et al. |
| 2010/0192593 A1 | 8/2010 | Brown et al. |
| 2010/0212857 A1 | 8/2010 | Bulin et al. |
| 2011/0079683 A1 | 4/2011 | Stolte et al. |
| 2011/0088405 A1 | 4/2011 | Turco |
| 2011/0132562 A1 | 6/2011 | Merrill et al. |
| 2011/0132563 A1 | 6/2011 | Merrill et al. |
| 2011/0150634 A1 | 6/2011 | Bajusz et al. |
| 2011/0162387 A1 | 7/2011 | Chir et al. |
| 2011/0171018 A1 | 7/2011 | Garcia-Crespo |
| 2011/0302928 A1 | 12/2011 | Mudawar |
| 2011/0310370 A1 | 12/2011 | Rohner et al. |
| 2011/0314835 A1 | 12/2011 | Liu |
| 2012/0067055 A1 | 3/2012 | Held |
| 2012/0174583 A1 | 7/2012 | Lehar |
| 2012/0192578 A1 | 8/2012 | Finney |
| 2012/0243970 A1 | 9/2012 | Hellgren et al. |
| 2012/0248657 A1 | 10/2012 | Ebert et al. |
| 2012/0297789 A1 | 11/2012 | Coffinberry |
| 2013/0051996 A1 | 2/2013 | Hoeger et al. |
| 2013/0104564 A1 | 5/2013 | Arar |
| 2013/0186100 A1 | 7/2013 | Rhoden et al. |
| 2013/0195658 A1 | 8/2013 | Saito et al. |
| 2013/0224423 A1 | 8/2013 | Mikulak et al. |
| 2013/0247587 A1 | 9/2013 | Lo |
| 2013/0333855 A1 | 12/2013 | Merrill et al. |
| 2014/0079540 A1 | 3/2014 | Morris et al. |
| 2014/0112796 A1 | 4/2014 | Kray et al. |
| 2014/0169977 A1 | 6/2014 | Brettschneider et al. |
| 2014/0182264 A1 | 7/2014 | Weisgerber et al. |
| 2014/0230444 A1 | 8/2014 | Hao et al. |
| 2014/0271129 A1 | 9/2014 | Mueller et al. |
| 2014/0352315 A1 | 12/2014 | Diaz |
| 2014/0352562 A1 | 12/2014 | Raymond, Jr. |
| 2015/0000291 A1 | 1/2015 | Smith et al. |
| 2015/0037601 A1 | 2/2015 | Blackmore |
| 2015/0048209 A1 | 2/2015 | Hoyt et al. |
| 2015/0052751 A1 | 2/2015 | Hu et al. |
| 2015/0064015 A1 | 3/2015 | Perez |
| 2015/0068629 A1 | 3/2015 | Kottilingam et al. |
| 2015/0076739 A1 | 3/2015 | Batchelder |
| 2015/0090070 A1 | 4/2015 | Etter et al. |
| 2015/0100607 A1 | 4/2015 | Kobashi et al. |
| 2015/0114611 A1 | 4/2015 | Morris et al. |
| 2015/0151485 A1 | 6/2015 | Godon et al. |
| 2015/0202683 A1 | 7/2015 | Bunker |
| 2015/0209910 A1 | 7/2015 | Denney et al. |
| 2015/0306657 A1 | 10/2015 | Frank |
| 2015/0321249 A1 | 11/2015 | Shah et al. |
| 2015/0321250 A1 | 11/2015 | Xu |
| 2015/0337730 A1 | 11/2015 | Kupiszewski et al. |
| 2015/0354465 A1 | 12/2015 | Suciu et al. |
| 2016/0003061 A1* | 1/2016 | McComb ............... F01D 5/02 29/889.71 |
| 2016/0010468 A1 | 1/2016 | Kray et al. |
| 2016/0038866 A1 | 2/2016 | Gibson et al. |
| 2016/0059302 A1 | 3/2016 | McBrien et al. |
| 2016/0108734 A1 | 4/2016 | Wunderer et al. |
| 2016/0108814 A1 | 4/2016 | Schmitz |
| 2016/0186772 A1 | 6/2016 | DiPietro, Jr. et al. |
| 2016/0201684 A1 | 7/2016 | Schwarz et al. |
| 2016/0221262 A1 | 8/2016 | Das et al. |
| 2016/0298550 A1 | 10/2016 | Kupratis et al. |
| 2016/0326963 A1 | 11/2016 | Yamazaki |
| 2016/0341126 A1 | 11/2016 | Kupratis et al. |
| 2017/0022835 A1 | 1/2017 | Clark et al. |
| 2017/0030266 A1 | 2/2017 | Cerny et al. |
| 2017/0044984 A1 | 2/2017 | Pesyna et al. |
| 2017/0087630 A1 | 3/2017 | Lee et al. |
| 2017/0114721 A1 | 4/2017 | Miller et al. |
| 2017/0159563 A1 | 6/2017 | Sennoun |
| 2017/0159566 A1 | 6/2017 | Sennoun et al. |
| 2017/0167382 A1 | 6/2017 | Miller et al. |
| 2017/0184027 A1 | 6/2017 | Moniz et al. |
| 2017/0260905 A1 | 9/2017 | Schmitz |
| 2018/0029944 A1 | 2/2018 | Subramanian et al. |
| 2018/0161852 A1 | 6/2018 | McCarren et al. |
| 2018/0161853 A1 | 6/2018 | Deines et al. |
| 2018/0161854 A1 | 6/2018 | Deines et al. |
| 2018/0161855 A1 | 6/2018 | Deines et al. |
| 2018/0161856 A1 | 6/2018 | Yang et al. |
| 2018/0161857 A1 | 6/2018 | Garay et al. |
| 2018/0161858 A1 | 6/2018 | Garay et al. |
| 2018/0161859 A1 | 6/2018 | Garay et al. |
| 2018/0161866 A1 | 6/2018 | Deines et al. |
| 2018/0200967 A1 | 7/2018 | Sutter et al. |
| 2019/0218971 A1 | 7/2019 | Niergarth et al. |
| 2019/0234420 A1 | 8/2019 | Bryant, Jr. et al. |
| 2019/0359340 A1 | 11/2019 | Pachidis et al. |
| 2020/0049014 A1* | 2/2020 | Clements ............... F01D 5/284 |
| 2020/0116028 A1* | 4/2020 | Kray ..................... F01D 5/147 |
| 2021/0108572 A1 | 4/2021 | Khalid et al. |
| 2021/0199013 A1 | 7/2021 | Read et al. |
| 2021/0324751 A1 | 10/2021 | Theertham et al. |
| 2021/0388726 A1 | 12/2021 | Churcher et al. |
| 2022/0288673 A1 | 9/2022 | Deines et al. |
| 2022/0362856 A1 | 11/2022 | Suchel et al. |
| 2023/0003133 A1 | 1/2023 | Gondre et al. |
| 2023/0060010 A1 | 2/2023 | Sibbach et al. |

(56) References Cited

U.S. PATENT DOCUMENTS

| | | |
|---|---|---|
| 2023/0258134 A1 | 8/2023 | Sibbach et al. |
| 2023/0407754 A1 | 12/2023 | De Carne-Carnavalet et al. |
| 2024/0360768 A1 | 10/2024 | Kray et al. |
| 2024/0376903 A1 | 11/2024 | Kray et al. |
| 2024/0392689 A1 | 11/2024 | Kray et al. |
| 2024/0401489 A1 | 12/2024 | Kray et al. |

FOREIGN PATENT DOCUMENTS

| | | | |
|---|---|---|---|
| CN | 101576024 | A | 11/2009 |
| CN | 102052095 | A | 5/2011 |
| CN | 102078924 | A | 6/2011 |
| CN | 102251811 | A | 11/2011 |
| CN | 202291247 | U | 7/2012 |
| CN | 102802834 | A | 11/2012 |
| CN | 103008558 | A | 4/2013 |
| CN | 203441604 | U | 2/2014 |
| CN | 105579688 | A | 5/2016 |
| CN | 107035528 | A | 8/2017 |
| CN | 113123834 | B | 9/2021 |
| CN | 216009013 | U | 3/2022 |
| DE | 1937395 | U | 4/1966 |
| DE | 2135286 | A1 | 1/1973 |
| DE | 102009039255 | A1 | 3/2011 |
| EP | 0978632 | A1 | 2/2000 |
| EP | 2359959 | A1 | 8/2011 |
| EP | 2359962 | A2 | 8/2011 |
| EP | 2549061 | A2 | 1/2013 |
| EP | 2992982 | A1 | 3/2016 |
| EP | 3040512 | A1 | 7/2016 |
| EP | 3121383 | A1 | 1/2017 |
| EP | 3514349 | A1 | 7/2019 |
| FR | 3102378 | A1 | 4/2021 |
| GB | 2034822 | A | 6/1980 |
| JP | H04287802 | A | 10/1992 |
| JP | H07208200 | A | 8/1995 |
| JP | 2013/512783 | A | 4/2013 |
| JP | 2014/208373 | A | 11/2014 |
| JP | 2016/501139 | A | 1/2016 |
| JP | 2015/516591 | A | 6/2016 |
| JP | 2016/533905 | A | 11/2016 |
| WO | WO97/03281 | A1 | 1/1997 |
| WO | WO03/2331 | A1 | 6/2000 |
| WO | WO00/51761 | A1 | 9/2000 |
| WO | WO2015/021168 | A1 | 2/2015 |
| WO | WO2015/026535 | A1 | 2/2015 |
| WO | WO2015/053846 | A2 | 4/2015 |
| WO | WO2015/112885 | A1 | 7/2015 |

OTHER PUBLICATIONS

Krithivasan, Detection of Propagation of Over-Heat Sections in Supply Air Duct of Aircrafts, Honeywell Technology Solutions Lab Pvt Ltd., Dec. 6, 2011, pp. 1-6.

Kumar et al., 30 Printing of Hollow Compounds, IJRET: International Journal of Research in Engineering and Technology, vol. 4, Issue 12, 2015, pp. 18-21.

Mikro Systems, Advanced Filtration to Improve Single Crystal Casting Yield, National Energy Technology Laboratory, Aug. 2013, pp. 1-4.

Rame et al., Development of AGAT, a Third-Generation Nickel-Based Superalloy for Single Crystal Turbine Blade Applications, The Minerals, Metals & Materials Society, Superalloys 2020, pp. 31-40.

\* cited by examiner

| HPC EXIT AREA | REDLINE EGT | SLS THRUST | CST |
|---|---|---|---|
| 29.1 | 1153 | 39262 | 53.6 |
| 27.1 | 1205 | 39258 | 64.5 |
| 28.4 | 1071 | 39292 | 52.2 |
| 26.1 | 1123 | 39288 | 64.6 |
| 24.7 | 1160 | 39285 | 74.5 |
| 26.2 | 1155 | 39262 | 66.2 |
| 27.0 | 1207 | 39257 | 64.9 |
| 27.0 | 1125 | 39289 | 60.6 |
| 24.6 | 1161 | 39285 | 75.0 |
| 29.1 | 1152 | 39262 | 53.3 |
| 28.4 | 1071 | 39292 | 52.1 |
| 27.0 | 1123 | 39287 | 60.3 |

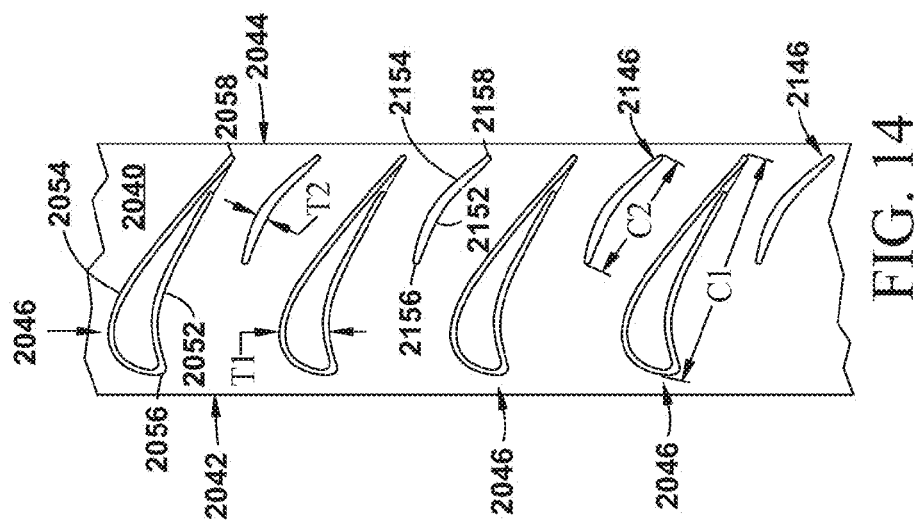
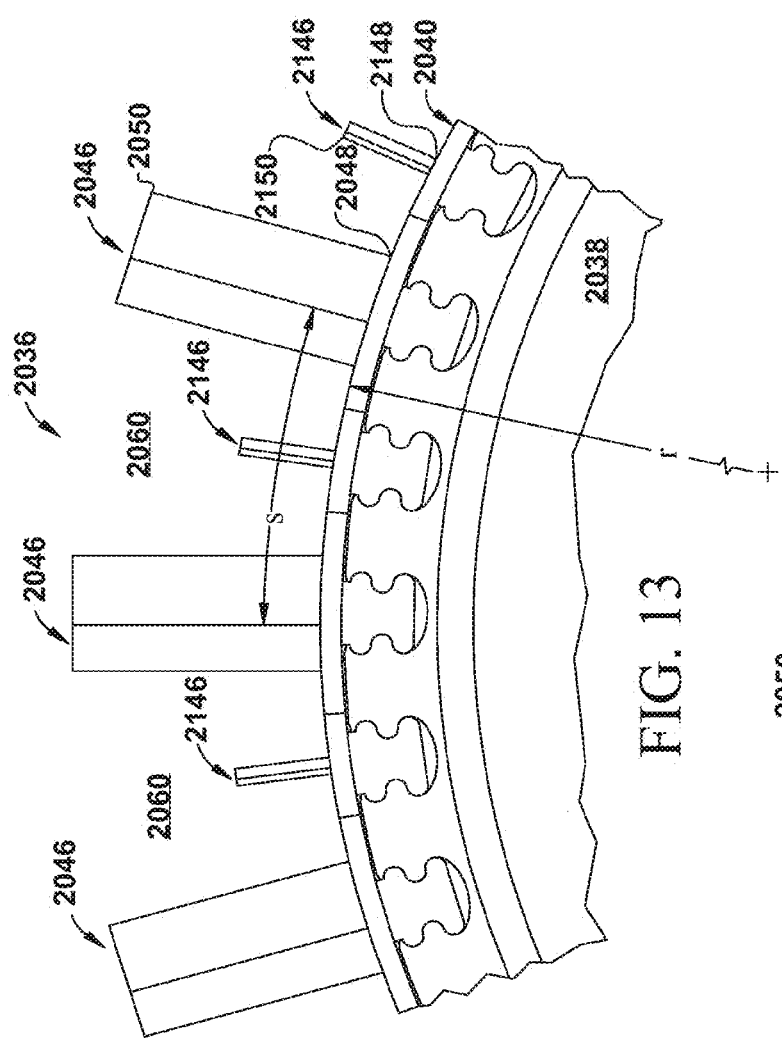
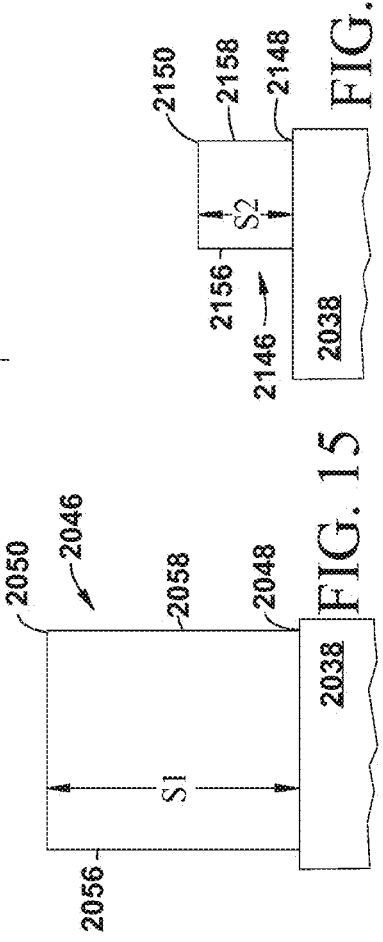

12,503,980 B2

GAS TURBINE ENGINE

CROSS-REFERENCE TO RELATED APPLICATIONS

This application is a continuation-in-part application of U.S. application Ser. No. 18/481,515 filed Oct. 5, 2023, which is a continuation-in-part application of U.S. application Ser. No. 17/978,629 filed Nov. 1, 2022, both of which are hereby incorporated by reference in their entireties.

FIELD

The present disclosure relates to a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGs., in which:

FIG. 13 is a front elevation view of a portion of a turbine rotor suitable for inclusion in an engine described herein;

FIG. 14 is a top plan view of the rotor of FIG. 13;

FIG. 15 is a side view of a turbine blade shown in FIG. 13;

FIG. 16 is a side view of a splitter blade shown in FIG. 13;

DETAILED DESCRIPTION

Figure 1:
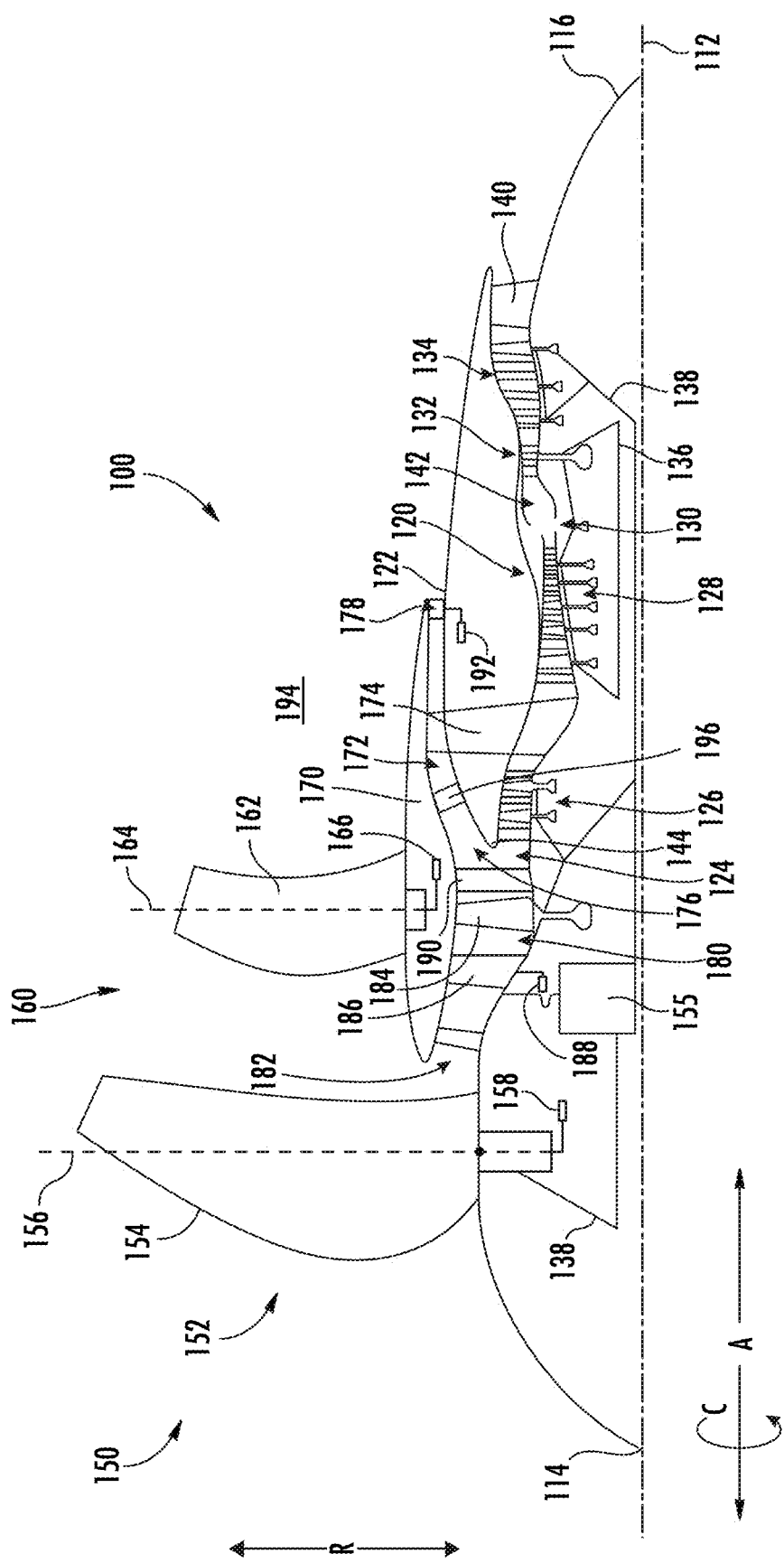
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

Figure 4:
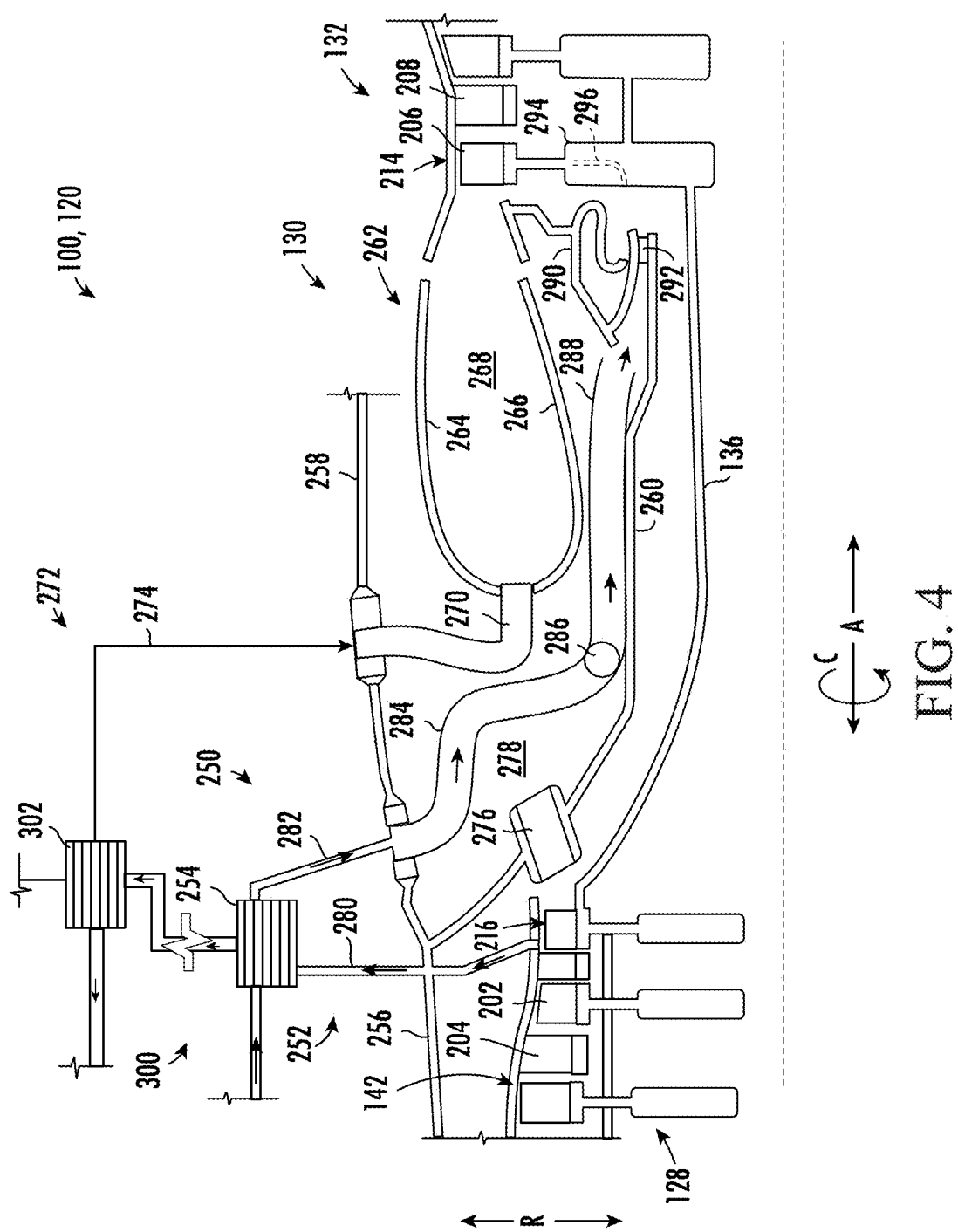
FIG. 4 is a close-up, schematic view of the exemplary three-stream engine of FIG. 1 showing the cooled cooling air system of FIG. 2.
Figure 9:
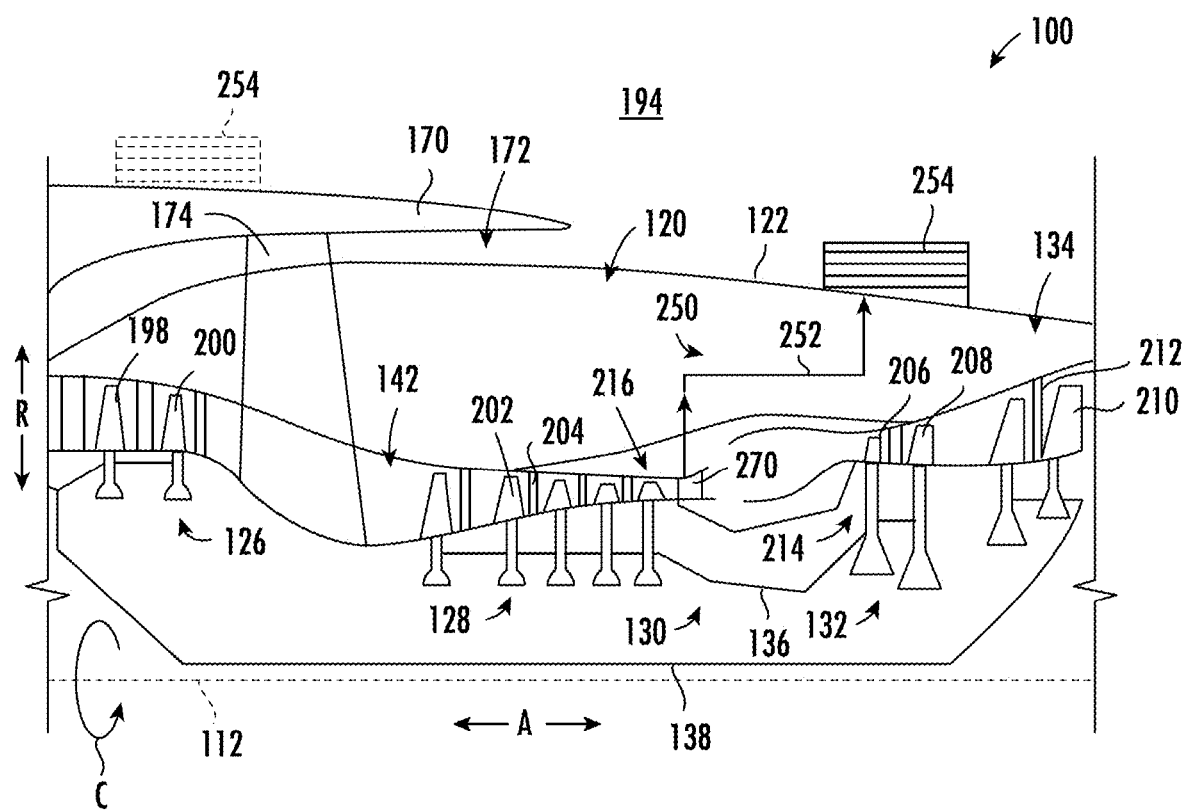
FIG. 9 is a schematic, close-up view of a gas turbine engine having a cooled cooling air system in accordance with another exemplary aspect of the present disclosure.

The cooled cooling air systems contemplated by the present disclosure may include a thermal bus cooled cooling air system (see, e.g., FIGS. 4 and 5) or a dedicated heat exchanger cooled cooling air system (i.e., a cooled cooling air system including a heat sink heat exchanger dedicated to the cooled cooling air system); a bypass heat exchanger cooled cooling air system having a heat sink heat exchanger thermally coupled to an airflow through a bypass passage (see, e.g., FIG. 9); an air-to-air cooled cooling air system (i.e., a cooled cooling air system having a heat sink heat exchanger configured to transfer heat to an airflow; see, e.g., FIG. 9); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.; see, e.g., FIG. 4); or a combination thereof.

In one or more of the exemplary cooled cooling air systems described herein, the cooled cooling air system may receive the cooling air from a downstream end of a high pressure compressor (i.e., a location closer to a last stage of the high pressure compressor), an upstream end of the high pressure compressor (i.e., a location closer to a first stage of the high pressure compressor), a downstream end of a low pressure compressor (i.e., a location closer to a last stage of the low pressure compressor), an upstream end of the low pressure compressor (i.e., a location closer to a first stage of the low pressure compressor), a location between compressors, a bypass passage, a combination thereof, or any other suitable airflow source.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. For example, with reference to the exemplary engine 100 discussed below with reference to FIG. 2, the term redline EGT refers to a maximum permitted takeoff temperature of an airflow after the first stator 208 downstream of the last stage of rotor blades 206 of the HP turbine 132 (at location 215 into the first of the plurality of LP turbine rotor blades 210). In embodiments wherein the engine is configured as a three spool engine (as compared to the two spool engine of FIG. 2; see FIG. 12), the term redline EGT refers to a maximum permitted takeoff temperature of an airflow after the first stator downstream of the last stage of rotor blades of the intermediate speed turbine (see intermediate speed turbine 516 of the engine 500 of FIG. 12). The term redline EGT is sometimes also referred to as an indicated turbine exhaust gas temperature or indicated turbine temperature.

Other aspects of the disclosure herein are directed to a plurality of composite airfoil stages. For purposes of illustration, these aspects of present disclosure will be described with respect to the plurality of composite airfoil stages within an engine being a first stage of airfoils in the form of fan blades and a second stage of airfoils immediately downstream the first stage of airfoils as an outlet guide vane (OGV). While fan blades and OGVs are illustrated, it should be understood that any consecutive sets of stages are contemplated.

The term "composite," as used herein indicates a material that does not include metal material. A composite can be a combination of at least two or more non-metallic elements or materials. Example composite materials can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, where the adhesive can require curing at elevated temperatures or other hardening techniques.

As used herein, PMC refers to a class of materials. For instance, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component. The resin is then cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, polyaryletherketones, thermoplastic polyesters, and polycarbonate resins. Specific examples of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In still another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), oxide ceramics (e.g., silicon oxycarbides, silicon oxynitrides, non-oxide carbon-based materials (e.g., carbon), aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, silicon dioxide ($SiO_2$), aluminum oxide ($Al_2O_3$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al2O_32SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Furthermore, as used herein, the term "set" or a "set" of elements can be any number of elements, including only one.

Leading length or "LL" as used herein refers to a length between a leading edge of the airfoil and a seam between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord length or "CL" as used herein refers to a length between a leading edge of the airfoil and a trailing edge of the airfoil.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. A relatively small amount of thrust may also be generated by an airflow exiting the working gas flowpath of the turbomachine through the exhaust section. In addition, certain turbofan engines may further include a third stream that contributes to a total thrust output of the turbofan engine, potentially allowing for a reduction in size of a core of the turbomachine for a given total turbofan engine thrust output.

Conventional turbofan engine design practice has limited a compressor pressure ratio based at least in part on the gas temperatures at the exit stage of a high pressure compressor. These relatively high temperatures at the exit of the high pressure compressor may also be avoided when they result in prohibitively high temperatures at an inlet to the turbine section, as well as when they result in prohibitively high exhaust gas temperatures through the exhaust section. For a desired turbofan engine thrust output produced from an increased pressure ratio across the high pressure compressor, there is an increase in the gas temperature at the compressor exit, at a combustor inlet, at the turbine section inlet, and through an exhaust section of the turbofan engine.

The inventors have recognized that there are generally three approaches to making a gas turbine engine capable of operating at higher temperatures while providing a net benefit to engine performance: reducing the temperature of a gas used to cool core components, utilizing materials capable of withstanding higher operating temperature conditions, or a combination thereof.

Referring to the case of an engine that utilizes cooled cooling air for operating at higher temperatures, the inventors of the present disclosure discovered, unexpectedly, that the costs associated with achieving a higher compression by reducing gas temperatures used to cool core components to accommodate higher core gas temperatures may indeed produce a net benefit, contrary to prior expectations in the art. The inventors discovered during the course of designing several engine architectures of varying thrust classes and mission requirements (including the engines illustrated and described in detail herein) a relationship exists among the exhaust gas passing through the exhaust section, the desired maximum thrust for the engine, and the size of the exit stage of the high pressure compressor, whereby including this technology produces a net benefit. Previously it was thought that the cost for including a technology to reduce the temperature of gas intended for cooling compressor and turbine components was too prohibitive, as compared to the benefits of increasing the core temperatures.

For example, the inventors of the present disclosure found that a cooled cooling air system may be included while maintaining or even increasing the maximum turbofan engine thrust output, based on this discovery. The cooled cooling air system may receive an airflow from the compressor section, reduce a temperature of the airflow using a heat exchanger, and provide the cooled airflow to one or more components of the turbine section, such as a first stage of high pressure turbine rotor blades. In such a manner, a first stage of high pressure turbine rotor blades may be capable of withstanding increased temperatures by using the cooled cooling air, while providing a net benefit to the turbofan engine, i.e., while taking into consideration the costs associated with accommodations made for the system used to cool the cooling air.

The inventors reached this conclusion after evaluating potentially negative impacts to engine performance brought on by introduction of a cooled cooling air system. For example, a cooled cooling air system may generally include a duct extending through a diffusion cavity between a compressor exit and a combustor within the combustion section, such that increasing the cooling capacity may concomitantly increase a size of the duct and thus increase a drag or blockage of an airflow through the diffusion cavity, potentially creating problems related to, e.g., combustor aerodynamics. Similarly, a dedicated or shared heat exchanger of the cooled cooling air system may be positioned in a bypass passage of the turbofan engine, which may create an aerodynamic drag or may increase a size of the shared heat exchanger and increase aerodynamic drag. Size and weight increases associated with maintaining certain risk tolerances were also taken into consideration. For example, a cooled cooling air system must be accompanied with adequate safeguards in the event of a burst pipe condition, which safeguards result in further increases in the overall size, complexity, and weight of the system.

With a goal of arriving at an improved turbofan engine capable of operating at higher temperatures at the compressor exit and turbine inlet, the inventors have proceeded in the manner of designing turbofan engines having an overall pressure ratio, total thrust output, redline exhaust gas temperature, and the supporting technology characteristics; checking the propulsive efficiency and qualitative turbofan engine characteristics of the designed turbofan engine; redesigning the turbofan engine to have higher or lower compression ratios based on the impact on other aspects of the architecture, total thrust output, redline exhaust gas temperature, and supporting technology characteristics; rechecking the propulsive efficiency and qualitative turbofan engine characteristics of the redesigned turbofan engine; etc. during the design of several different types of turbofan engines, including the turbofan engines described below with reference to FIGS. 1 and 4 through 8 through 11, which will now be discussed in greater detail.

Referring now to FIG. 1, a schematic cross-sectional view of an engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from a location downstream of a ducted mid-fan to a bypass passage over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees) (360° around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section 130, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor of the combustion section 130 where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustion section 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustion section 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The working gas flowpath 142 is an annular duct positioned generally inward of the core cowl 122 along the radial direction R. The working gas flowpath 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and further defines a central blade axis 156. For this embodiment, each fan blade 154 of the fan 152 is rotatable about its respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170. Notably, the engine 100 defines a bypass passage 194 over the fan cowl 170 and core cowl 122.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan 152. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan duct flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the working gas flowpath 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the working gas flowpath 142 may at least partially co-extend (generally axially) on opposite sides (e.g., opposite radial sides) of the core cowl 122. For example, the fan duct 172 and the working gas flowpath 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the working gas flowpath 142 and the fan duct 172 by the leading edge 144 of the core cowl 122. The inlet duct 180 is wider than the working gas flowpath 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3s}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, Fn3S, during one or more engine operating conditions. Further, by introducing a variability in the geometry of the inlet guide vanes 186 and the fan exhaust nozzle 178, the engine 100 may be capable of generating more efficient third stream thrust, Fn3S, across a relatively wide array of engine operating conditions, including takeoff and climb as well as cruise.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 196 may be positioned in thermal communication with the fan duct 172. For example, one or more heat exchangers 196 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 196 may be an annular heat exchanger extending substantially 360 degrees in the fan duct 172 (e.g., at least 300 degrees, such as at least 330 degrees). In such a manner, the heat exchanger 196 may effectively utilize the air passing through the fan duct 172 to cool one or more systems of the engine 100 (e.g., a cooled cooling air system (described below), lubrication oil systems, compressor bleed air, electrical components, etc.). The heat exchanger 196 uses the air passing through duct 172 as a heat sink and correspondingly increases the temperature of the air downstream of the heat exchanger 196 and exiting the fan exhaust nozzle 178.

As will be appreciated, the engine 100 defines a total sea level static thrust output FnTotal, corrected to standard day conditions, which is generally equal to a maximum total engine thrust. It will be appreciated that "sea level static thrust corrected to standard day conditions" refers to an amount of thrust an engine is capable of producing while at rest relative to the earth and the surrounding air during standard day operating conditions.

The total sea level static thrust output FnTotal may generally be equal to a sum of: a fan stream thrust FnFan (i.e., an amount of thrust generated by the fan 152 through the bypass passage 194), the third stream thrust Fn3S (i.e., an amount of thrust generated through the fan duct 172), and a turbomachine thrust FnTM (i.e., an amount of thrust generated by an airflow through the turbomachine exhaust nozzle 140), each during the static, sea level, standard day conditions. The engine 100 may define a total sea level static thrust output FnTotal greater than or equal to 15,000 pounds. For example, it will be appreciated that the engine 100 may be configured to generate at least 25,000 pounds and less than 80,000 pounds, such as between 25,000 and 50,000 pounds, such as between 35,000 and 45,000 pounds of thrust during a takeoff operating power, corrected to standard day sea level conditions.

Figure 2:
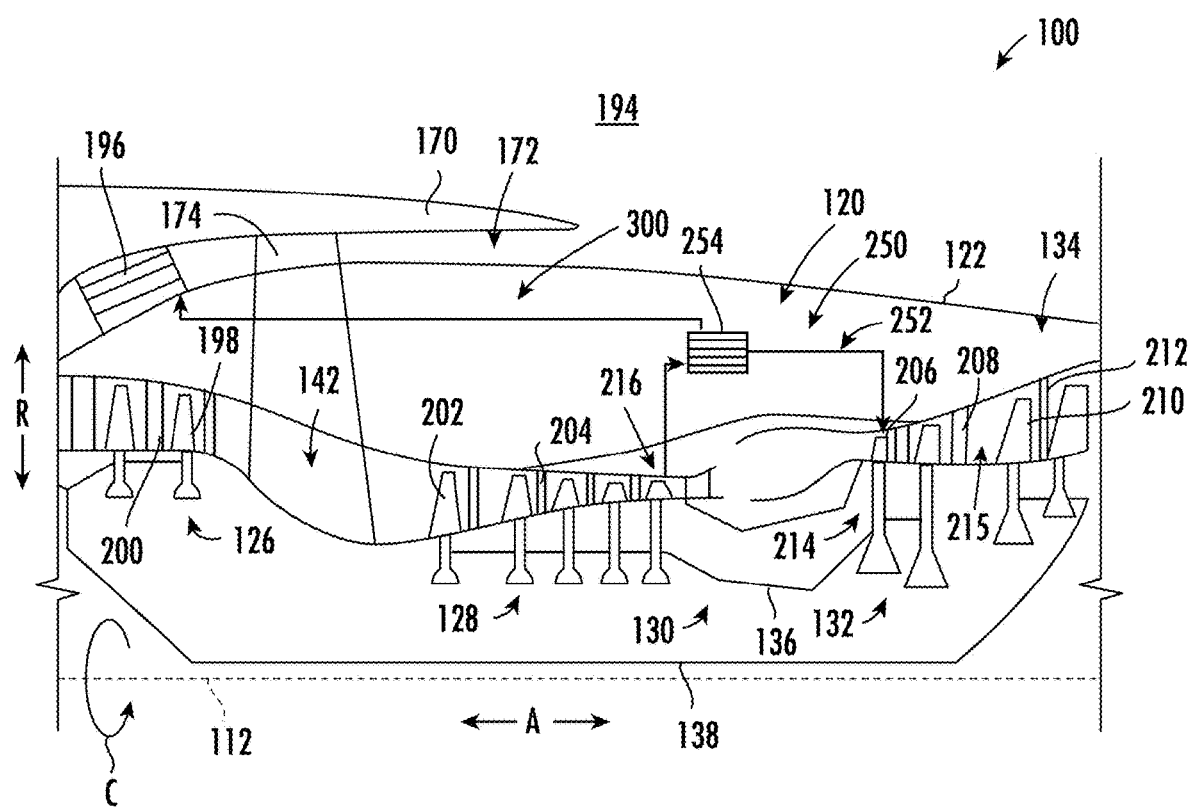
FIG. 2 is a close-up, schematic view of the exemplary three-stream engine of FIG. 1 with a cooled cooling air system in accordance with an exemplary embodiment of the present disclosure.

As will be appreciated, the engine 100 defines a redline exhaust gas temperature (referred to herein as "EGT"), which is defined above, and for the embodiment of FIG. 1 refers to a maximum permitted takeoff temperature of an airflow after the first stator 208 downstream of the last stage of rotor blades 206 of the HP turbine 132 (at location 215 into the first of the plurality of LP turbine rotor blades 210; see FIG. 2).

Referring now to FIG. 2, a close-up, simplified, schematic view of a portion of the engine 100 of FIG. 1 is provided. The engine 100, as noted above includes the turbomachine 120 having the LP compressor 126, the HP compressor 128, the combustion section 130, the HP turbine 132, and the LP turbine 134. The LP compressor 126 includes a plurality of stages of LP compressor rotor blades 198 and a plurality of stages of LP compressor stator vanes 200 alternatingly spaced with the plurality of stages of LP compressor rotor blades 198. Similarly, the HP compressor 128 includes a plurality of stages of HP compressor rotor blades 202 and a plurality of stages of HP compressor stator vanes 204 alternatingly spaced with the plurality of stages of HP compressor rotor blades 202. Moreover, within the turbine section, the HP turbine 132 includes at least one stage of HP turbine rotor blades 206 and at least one stage of HP turbine stator vanes 208, and the LP turbine 134 includes a plurality of stages of LP turbine rotor blades 210 and a plurality of stages of LP turbine stator vanes 212 alternatingly spaced with the plurality of stages of LP turbine rotor blades 210. With reference to the HP turbine 132, the HP turbine 132 includes at least a first stage 214 of HP turbine rotor blades 206.

Figure 3:
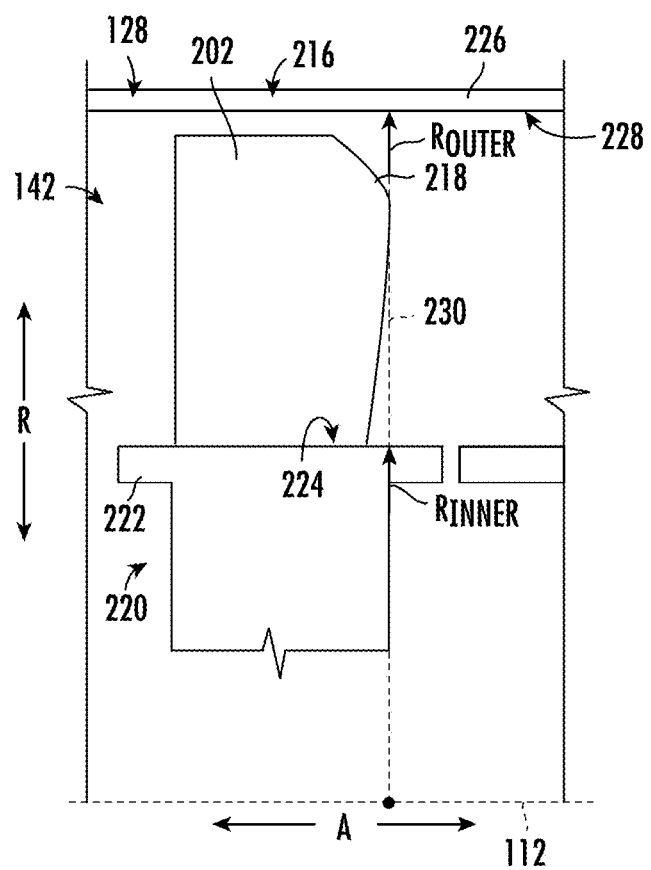
FIG. 3 is a close-up view of an aft-most stage of high pressure compressor rotor blades within the exemplary three-stream engine of FIG. 1.

Referring particularly to the HP compressor 128, the plurality of stages of HP compressor rotor blades 202 includes an aftmost stage 216 of HP compressor rotor blades 202. Referring briefly to FIG. 3, a close-up view of an HP compressor rotor blade 202 in the aftmost stage 216 of HP compressor rotor blades 202 is provided. As will be appreciated, the HP compressor rotor blade 202 includes a trailing edge 218 and the aftmost stage 216 of HP compressor rotor blades 202 includes a rotor 220 having a base 222 to which the HP compressor rotor blade 202 is coupled. The base 222 includes a flowpath surface 224 defining in part the working gas flow path 142 through the HP compressor 128. Moreover, the HP compressor 128 includes a shroud or liner 226 located outward of the HP compressor rotor blade 202 along the radial direction R. The shroud or liner 226 also includes a flowpath surface 228 defining in part the working gas flow path 142 through the HP compressor 128.

FIGS. 13-21 illustrate a portion of an exemplary turbine rotor 36 suitable for inclusion in the above described HP turbine or the LP turbine. While the concepts of the present disclosure regarding FIGS. 13-21 will be described in the context of an example engine, it will be understood that those concepts are applicable to any of the turbines in a gas turbine engine. As used herein, the term "turbine" refers to turbomachinery elements in which kinetic energy of a fluid flow is converted to rotary motion.

The rotor 2036 includes a disk 2038 including an annular flowpath surface 2040 extending between a forward end 2042 and an aft end 2044. An array of turbine blades 2046 extend from the flowpath surface 2040. As illustrated here, each turbine blade 2046 extends from a root 2048 at the flowpath surface 2040 to a tip 2050, and includes a concave pressure side 2052 joined to a convex suction side 2054 at a leading edge 2056 and a trailing edge 2058. The adjacent turbine blades 2046 define spaces 2060 therebetween.

The turbine blades 2046 are uniformly spaced apart around the periphery of the flowpath surface 2040. A mean circumferential spacing "s" (see FIG. 13) between adjacent turbine blades 2046 is defined as $s=2\pi r/Z$, where "r" is a designated radius of the turbine blades 2046 (for example at the root 2048) and "Z" is the number of turbine blades 2046. A nondimensional parameter called "solidity" is defined as c/s, where "c" is equal to the blade chord, described in detail below. In the illustrated example, the turbine blades 2046 may have a spacing which is significantly greater than a spacing that would be expected in the prior art, resulting in a blade solidity significantly less than would be expected in the prior art.

As illustrated in FIG. 15, each turbine blade 2046 has a span (or span dimension) "S1" defined as the radial distance from the root 2048 to the tip 2050. Depending on the specific design of the turbine blade 2046, its span S1 may be different at different axial locations.

For reference purposes a relevant measurement is the span S1 at the leading edge 2056. Each turbine blade 2046 has a chord (or chord dimension) "C1" (FIG. 14) defined as the length of an imaginary straight line connecting the leading edge 2056 and the trailing edge 2058. Depending on the specific design of the turbine blade 2046, its chord C1 may be different at different locations along the span S1. For purposes of this discussion, the relevant measurement is the chord C1 at the root 2048, i.e., adjacent the flowpath surface 2040.

Each turbine blade 2046 has a thickness "T1", i.e., the distance between the pressure side 2052 and the suction side 2054 (see FIG. 14). A "thickness ratio" of the turbine blade 2046 is defined as the maximum value of the thickness T1, divided by the chord length, expressed as a percentage.

An array of splitter blades 2146 (FIG. 13) extend from the flowpath surface 2040. The splitter blades constitute "splitter airfoils" for the purposes of this disclosure. One or more splitter blades 2146 may be disposed in each of the spaces 2060 between the turbine blades 2046. In the circumferential direction, the splitter blade or blades 2146 may be spaced uniformly or non-uniformly between two adjacent turbine blades 2046. Each splitter blade 2146 extends from a root 2148 at the flowpath surface 2040 to a tip 2150 and includes a concave pressure side 2152 joined to a convex suction side 2154 at a leading edge 2156 and a trailing edge 2158. As illustrated in the example shown in FIG. 13, the splitter blades 2146 are positioned so that their trailing edges 2158 are at approximately the same axial position as the trailing edges 2058 of the turbine blades 2046; however the axial position of the splitter blades 2046 may be varied to suit a particular application.

As illustrated in FIG. 16, each splitter blade 2146 has a span (or span dimension) "S2" defined as the radial distance from the root 2148 to the tip 2150. Depending on the specific design of the splitter blade 2146, its span S2 may be different at different axial locations. For reference purposes a relevant measurement is the span S2 at the leading edge 2156. Each splitter blade 2146 has a chord (or chord dimension) "C2" defined as the length of an imaginary straight line connecting the leading edge 2156 and the trailing edge 2158. Depending on the specific design of the splitter blade 2146, its chord C2 may be different at different locations along the span S2. For this discussion, the relevant measurement is the chord C2 at the root 2148, i.e. adjacent the flowpath surface 2040. Each splitter blade 2146 has a thickness "T2" (FIG. 14) defined as the distance between the pressure side 2152 and the suction side 2154. A "thickness ratio" of the splitter blade 2146 is defined as the maximum value of the thickness T2, divided by the chord length, expressed as a percentage.

The splitter blades 2146 function to locally increase the hub solidity of the rotor 2036 and thereby control undesired secondary flow around the turbine blades 2046. A similar effect could be obtained by simply increasing the number of turbine blades 2046, and therefore reducing the blade-to-blade spacing. This, however, has the undesirable side effect of increasing flow blockage and aerodynamic frictional losses which would manifest as reduced aerodynamic efficiency and increased rotor weight. Therefore, the dimensions of the splitter blades 2146 and their position may be selected to control secondary flow while minimizing their surface area.

The thickness of the splitter blades 2146 should be as small as possible consistent with structural, thermal, and aeroelastic considerations. Generally, the splitter blades 2146 should have a thickness ratio less than a thickness ratio of the turbine blades 2046. For instance, the splitter blades 2146 may have a thickness ratio of less than about 5%. As another example, the splitter blades 2146 may have a thickness ratio of about 2%. For comparison purposes, this is substantially less than the thickness of the turbine blades 2046. For example, the turbine blades 2046 may be about 30% to 40% thick. Other turbine blades within the engine may be about 5% to 10% thick.

The span S2 and/or the chord C2 of the splitter blades 2146 may be equal to the corresponding span S1 and chord C1 of the turbine blades 2046. Alternatively, the span S2 and/or the chord C2 of the splitter blades 2146 may be some fraction less than unity of the corresponding span S1 and chord C1 of the turbine blades 2046. These may be referred to as "part-span" and/or "part-chord" splitter blades. For instance, the span S2 may be equal to or less than the span S1. For reducing frictional losses, the span S2 is 50% or less of the span S1. As another example, the chord C2 may be equal to or less than the chord C1. Preferably for the least frictional losses, the chord C2 is 50% or less of the chord C1.

The disk 2038, turbine blades 2046, and splitter blades 2146 may be constructed from any material capable of withstanding the anticipated stresses and environmental conditions in operation. Non-limiting examples of known suitable alloys include nickel- and cobalt-based alloys.

The operational environment may exceed the temperature capability of metal alloys. Accordingly, the turbine blades 2046 may be actively cooled, in accordance with conventional practice, by providing them with a flow of coolant (such as compressor bleed air). The coolant is routed into internal passages of the turbine blades 2046 and used for various forms of cooling such as conduction cooling, impingement cooling, and/or film cooling. As the turbine blades 2046 generally have a significant thickness ratio, internal volume is available to incorporate active cooling features.

Because it is desirable to make the splitter blades 2146 as thin as possible, there may not be internal volume available for active cooling features; however, metal alloys may not have sufficient high-temperature capability without active cooling.

This situation may be addressed by manufacturing all or part of the splitter blades 2146 from nonmetallic high-temperature capable materials, such as ceramics, more particularly CMC. Optionally, all or part of the turbine blades 2046 or disk 2038 could be manufactured from the above-noted high-temperature materials.

In FIGS. 13-16, the disk 2038, turbine blades 2046, and splitter blades 2146 are depicted as an assembly built up from separate components. The principles of the present invention are equally applicable to a rotor with airfoils configured as an integral, unitary, or monolithic whole. This type of structure may be referred to as a "bladed disk" or "blisk".

The splitter concepts described above may also be incorporated into turbine stator elements within the engine 2010. For example, FIGS. 17-20 illustrate a portion of a turbine nozzle 2062 suitable for inclusion in HPT or LPT portions of an engine.

The turbine nozzle 2062 includes a row of airflow-shaped turbine vanes 2064 bounded at inboard and outboard ends, respectively by an inner band 2066 and an outer band 2068. The turbine vanes 2064 constitute "stator airfoils" for the purposes of this disclosure.

The inner band 2066 defines an annular inner flowpath surface 2070 extending between forward and aft ends 2072, 2074. The outer band 2068 defines an annular outer flowpath surface 2076 extending between forward and aft ends 2078, 2080. Each turbine vane 2046 extends from a root 2082 at the inner flowpath surface 2070 to a tip 2084 at the outer flowpath surface 2076 and includes a concave pressure side 2086 joined to a convex suction side 2088 at a leading edge 2090 and a trailing edge 2092. The adjacent turbine vanes 2046 define spaces 2092 therebetween.

The turbine vanes 2064 are uniformly spaced apart around the periphery of the inner flowpath surface 2070. The turbine vanes 2064 have a mean circumferential spacing "s" and a solidity defined as described above (see FIG. 17). In the illustrated example, the turbine vanes 2064 may have a spacing which is significantly greater than a spacing that would be expected, resulting in a vane solidity significantly less than would be expected.

Figures 18, 19, 20:
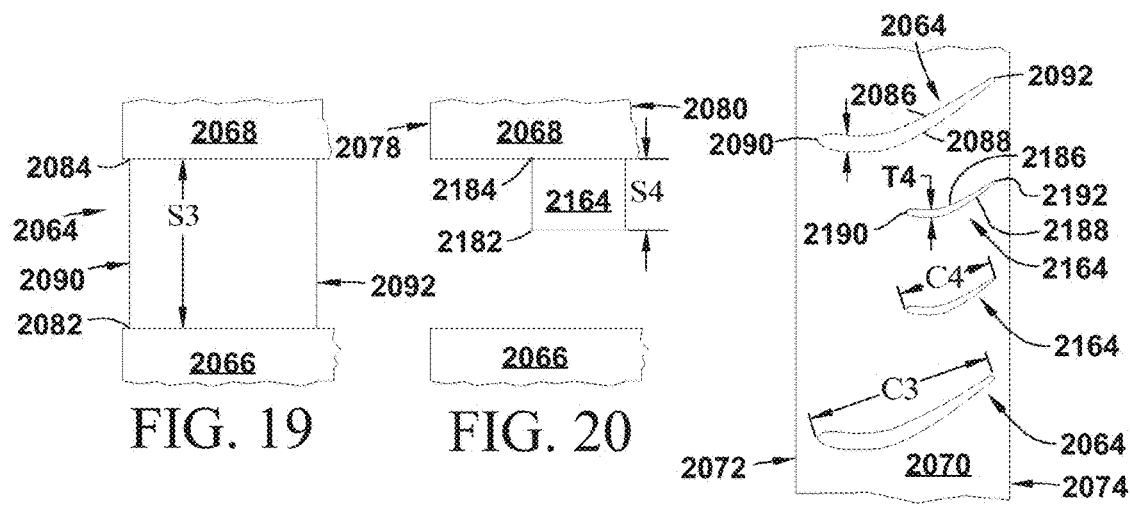
FIG. 18 is a view taken along lines 8-8 OF FIG. 17.
FIG. 19 is a side view of a stator vane shown in FIG. 17.
FIG. 20 is a side view of a splitter vane shown in FIG. 17.

As illustrated in FIG. 19, each turbine vane 2064 has a span (or span dimension) "S3" defined as the radial distance from the root 2082 to the tip 2084. Depending on the specific design of the turbine vane 2064, its span S3 may be different at different axial locations. For reference purposes a relevant measurement is the span S3 at the leading edge 2090. Each turbine vane 2064 has a chord (or chord dimension) "C3" defined as the length of an imaginary straight line connecting the leading edge 2090 and the trailing edge 2092. Depending on the specific design of the turbine vane 2064, its chord C3 may be different at different locations along the span S3. For purposes of the present discussion, the relevant measurement would be the chord C3 at the root 2082 or tip 2084, i.e., adjacent flowpath surfaces 2070 or 2076.

Each turbine vane 2064 has a thickness "T3" defined as the distance between the pressure side 2086 and the suction side 2088 A "thickness ratio" of the turbine vane 2064 is defined as the maximum value of the thickness T3, divided by the chord length, expressed as a percentage.

One or both of the inner and outer flowpath surfaces 2070, 2076 may be provided with an array of splitter vanes. In the example shown in FIG. 17, an array of splitter vanes 2164 extend radially inward from the outer flowpath surface 2076. The splitter vanes constitute "splitter airfoils" for the purposes of this discussion. One or more splitter vanes 2164 are disposed between each pair of turbine vanes 2064. In the circumferential direction, the splitter vane or vanes 2164 may be spaced uniformly or non-uniformly between two adjacent turbine vanes 2064. Each splitter vane 2164 extends from a tip 2184 at the outer flowpath surface 2076 to a root 2182, and includes a concave pressure side 2186 joined to a convex suction side 2188 at a leading edge 2190 and a trailing edge 2192. In the example shown in FIGS. 17 and 18, the splitter vanes 2164 are positioned so that their trailing edges 2192 are at approximately the same axial position as the trailing edges 2092 of the stator vanes 2064; however, the axial position of the splitter vanes 2164 may be varied to suit a particular application.

As shown in FIG. 20, each splitter vane 2164 has a span (or span dimension) "S4" defined as the radial distance from the root 2182 to the tip 2184, and a chord (or chord dimension) "C4" defined as the length of an imaginary straight line connecting the leading edge 2190 and the trailing edge 2192. Depending on the specific design of the splitter vane 2164, its chord C4 may be different at different locations along the span S4. For this portion of the discussion, the relevant measurement is the chord C4 at the tip 2184, i.e., adjacent flowpath surface 2076. Each splitter vane 2164 has a thickness "T4" defined as the distance between the pressure side 2186 and the suction side 2188. A "thickness ratio" of the splitter vane 2164 is defined as the maximum value of the thickness T2, divided by the chord length, expressed as a percentage.

The splitter vanes 2164 locally increase the solidity of the nozzle and thereby prevent the above-mentioned secondary flows. A similar effect could be obtained by simply increasing the number of turbine vanes 2064, and therefore reducing the vane-to-vane spacing. This, however, has the undesirable side effect of increasing flow blockage and aerodynamic frictional losses which would manifest as reduced aerodynamic efficiency and increased nozzle weight. Therefore, the dimensions of the splitter vanes 2164 and their position may be selected to prevent secondary flows while minimizing their surface area.

The thickness of the splitter vanes 2164 should be as small as possible consistent with structural, thermal, and aeroelastic considerations. Generally the splitter vanes 2164 should have a thickness ratio less than a thickness ratio of the turbine vane 2064. As one example, the splitter vanes 2164 may have a thickness ratio of less than about 5%. As another example, the splitter vanes 2164 may have a thickness ratio on the order of about 2%.

The span S4 and/or the chord S4 of the splitter vanes 2164 may be equal to the corresponding span S3 and chord C3 of the turbine vanes 2064. Alternatively, the span S4 and/or the chord C4 of the splitter vanes 2164 may be some fraction less than unity of the corresponding span S3 and chord C3 of the turbine vanes 2064. These may be referred to as "part-span" and/or "part-chord" splitter vanes. For example, the span S4 may be equal to or less than the span S3. For reducing frictional losses, the span S4 is 50% or less of the span S3. As another example, the chord C4 may be equal to or less than the chord C3. Preferably for the least frictional losses, the chord C4 is 50% or less of the chord C3.

All or part of the splitter vanes 2164 may comprise high-temperature capable materials such as the CMC materials discussed above.

Figure 21:
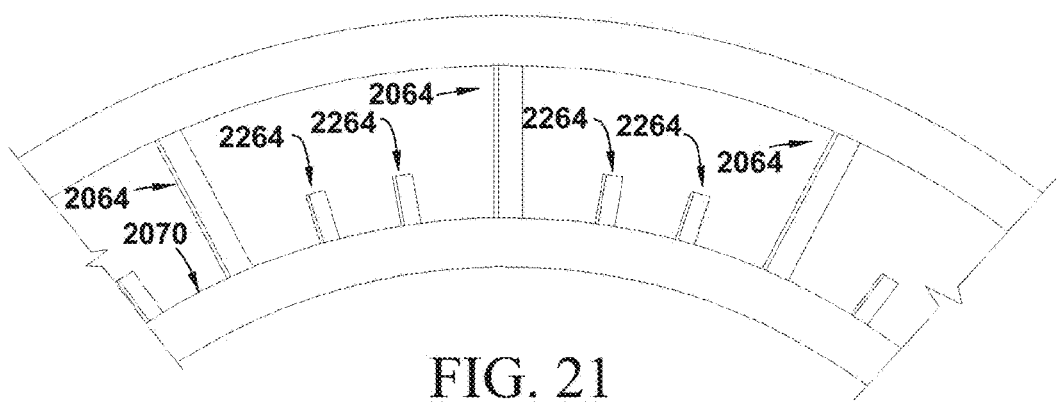
FIG. 21 is a front elevation view of a portion of an alternative turbine nozzle assembly suitable for inclusion in an engine described herein.

FIG. 21 illustrates an array of splitter vanes 2264 extending radially outward from the inner flowpath surface 2070. Other than the fact that they extend from the inner flowpath surface 2070, the splitter vanes 2264 may be identical to the splitter vanes 2164 described above, in terms of their shape, circumferential position relative to the stator vanes 2064, their thickness, span, and chord dimensions, and their material composition. As noted above, splitter vanes may optionally be incorporated at the inner flowpath surface 2070, or the outer flowpath surface 2076, or both.

The turbine apparatus described herein incorporating splitter blades and/or splitter vanes increases the endwall solidity level locally, to locally increase solidity in regions of high secondary flow without incurring the penalty from profile loss due to surface area in regions outside the region of interest.

Referring back to the engine 100 of FIG. 3, the engine 100 defines a reference plane 230 intersecting with an aft-most point of the trailing edge 218 of the HP compressor rotor blade 202 depicted, the reference plane 230 being orthogonal to the axial direction A. Further, the HP compressor 128 defines a high pressure compressor exit area (AHPCExit) within the reference plane 230. More specifically, the HP compressor 128 defines an inner radius (RINNER) extending along the radial direction R within the reference plane 230 from the longitudinal axis 112 to the flowpath surface 224 of the base 222 of the rotor 220 of the aftmost stage 216 of HP compressor rotor blades 202, as well as an outer radius (ROUTER) extending along the radial direction R within the reference plane 230 from the longitudinal axis 112 to the flowpath surface 228 of the shroud or liner 226. The HP compressor 128 exit area is defined according to Expression (1):

$$A_{HPCExit} = \pi(R_{OUTER}^2 - R_{INNER}^2).$$ Expression (1)

The inventors of the present disclosure have found that for a given total thrust output (FnTotal), a decrease in size of the high pressure compressor exit area (AHPCExit) may generally relate in an increase in a compressor exit temperature (i.e., a temperature of the airflow through the working gas flowpath 142 at the reference plane 230), a turbine inlet temperature (i.e., a temperature of the airflow through the working gas flowpath 142 provided to the first stage 214 of HP turbine rotor blades 206; see FIG. 2), and the redline exhaust gas temperature (EGT). In particular, the inventors of the present disclosure have found that the high pressure compressor exit area (AHPCExit) may generally be used as an indicator of the above temperatures to be achieved by the engine 100 during operation for a given total thrust output (FnTotal) of the engine 100.

Referring back to FIG. 2, the exemplary engine 100 depicted includes one or more technologies to accommodate the relatively small high pressure compressor exit area (AHPCExit) for the total thrust output (FnTotal) of the engine 100. In particular, for the embodiment depicted, the exemplary engine 100 includes a cooled cooling air system 250. The exemplary cooled cooling air system 250 is in fluid communication with the HP compressor 128 and the first stage 214 of HP turbine rotor blades 206. More specifically, for the embodiment depicted, the cooled cooling air system 250 includes a duct assembly 252 and a cooled cooling air (CCA) heat exchanger 254. The duct assembly 252 is in fluid communication with the HP compressor 128 for receiving an airflow from the HP compressor 128 and providing such airflow to the first stage 214 of HP turbine rotor blades 206 during operation of the engine 100. The CCA heat exchanger 254 is in thermal communication with the airflow through the duct assembly 252 for reducing a temperature of the airflow through the duct assembly 252 upstream of the first stage 214 of HP turbine rotor blades 206.

Briefly, as will be explained in more detail below, the engine 100 depicted further includes a thermal transport bus 300, with the CCA heat exchanger 254 of the cooled cooling air system 250 in thermal communication with, or integrated into, the thermal transport bus 300. For the embodiment depicted, the engine 100 further includes the heat exchanger 196 in the fan duct 172 in thermal communication with, or integrated into, the thermal transport bus 300, such that heat from the CCA heat exchanger 254 of the cooled cooling air system 250 may be transferred to the heat exchanger 196 in the fan duct 172 using the thermal transport bus 300.

Referring now to FIG. 4, a close-up, schematic view of the turbomachine 120 of the engine 100 of FIG. 2, including the cooled cooling air system 250, is provided.

As is shown, the turbine section includes a compressor casing 256, and the combustion section 130 of the turbomachine 120 generally includes an outer combustor casing 258, an inner combustor casing 260, and a combustor 262. The combustor 262 generally includes an outer combustion chamber liner 264 and an inner combustion chamber liner 266, together defining at least in part a combustion chamber 268. The combustor 262 further includes a fuel nozzle 270 configured to provide a mixture of fuel and air to the combustion chamber 268 to generate combustion gases.

The engine 100 further includes a fuel delivery system 272 including at least a fuel line 274 in fluid communication with the fuel nozzle 270 for providing fuel to the fuel nozzle 270.

The turbomachine 120 includes a diffuser nozzle 276 located downstream of the aftmost stage 216 of HP compressor rotor blades 202 of the HP compressor 128, within the working gas flowpath 142. In the embodiment depicted, the diffuser nozzle 276 is coupled to, or integrated with the inner combustor casing 260, the outer combustor casing 258, or both. The diffuser nozzle 276 is configured to receive compressed airflow from the HP compressor 128 and straighten such compressed air prior to such compressed air being provided to the combustion section 130. The combustion section 130 defines a diffusion cavity 278 downstream of the diffuser nozzle 276 and upstream of the combustion chamber 268.

As noted above, the exemplary engine 100 further includes the cooled cooling air system 250. The cooled cooling air system 250 includes the duct assembly 252 and the CCA heat exchanger 254. More specifically, the duct assembly 252 includes a first duct 280 in fluid communication with the HP compressor 128 and the CCA heat exchanger 254. The first duct 280 more specifically extends from the HP compressor 128, through the compressor casing 256, to the CCA heat exchanger 254. For the embodiment depicted, the first duct 280 is in fluid communication with the HP compressor 128 at a location in between the last two stages of HP compressor rotor blades 202. In such a manner, the first duct 280 is configured to receive a cooling airflow from the HP compressor 128 and to provide the cooling airflow to the CCA heat exchanger 254.

It will be appreciated, however, that in other embodiments, the first duct 280 may additionally or alternatively be in fluid communication with the HP compressor 128 at any other suitable location, such as at any other location closer to a downstream end of the HP compressor 128 than an upstream end of the HP compressor 128, or alternatively at a location closer to the upstream end of the HP compressor 128 than the downstream end of the HP compressor 128.

The duct assembly 252 further includes a second duct 282 extending from the CCA heat exchanger 254 to the outer combustor casing 258 and a third duct 284 extending from the outer combustor casing 258 inwardly generally along the radial direction R. The CCA heat exchanger 254 may be configured to receive the cooling airflow and to extract heat from the cooling airflow to reduce a temperature of the cooling airflow. The second duct 282 may be configured to receive cooling airflow from the CCA heat exchanger 254 and provide the cooling airflow to the third duct 284. The third duct 284 extends through the diffusion cavity generally along the radial direction R.

Moreover, for the embodiment depicted, the duct assembly 252 further includes a manifold 286 in fluid communication with the third duct 284 and a fourth duct 288. The manifold 286 extends generally along the circumferential direction C of the engine 100, and the fourth duct 288 is more specifically a plurality of fourth ducts 288 extending from the manifold 286 at various locations along the circumferential direction C forward generally along the axial direction A towards the turbine section. In such a manner, the duct assembly 252 of the cooled cooling air system 250 may be configured to provide cooling airflow to the turbine section at a variety of locations along the circumferential direction C.

Notably, referring still to FIG. 4, the combustion section 130 includes an inner stator assembly 290 located at a downstream end of the inner combustion chamber liner 266, and coupled to the inner combustor casing 260. The inner stator assembly 290 includes a nozzle 292. The fourth duct 288, or rather, the plurality of fourth ducts 288, are configured to provide the cooling airflow to the nozzle 292. The nozzle 292 may include a plurality of vanes spaced along the circumferential direction C configured to impart a circumferential swirl to the cooling airflow provided through the plurality of fourth ducts 288 to assist with such airflow being provided to the first stage 214 of HP turbine rotor blades 206.

In particular, for the embodiment depicted, the HP turbine 132 further includes a first stage HP turbine rotor 294, with the plurality of HP turbine rotor blades 206 of the first stage 214 coupled to the first stage HP turbine rotor 294. The first stage HP turbine rotor 294 defines an internal cavity 296 configured to receive the cooling airflow from the nozzle 292 and provide the cooling airflow to the plurality of HP turbine rotor blades 206 of the first stage 214. In such a manner, the cooled cooling air system 250 may provide cooling airflow to the HP turbine rotor blades 206 to reduce a temperature of the plurality HP turbine rotor blades 206 at the first stage 214 during operation of the engine 100.

For example, in certain exemplary aspects, the cooled cooling air system 250 may be configured to provide a temperature reduction of the cooling airflow equal to at least 15% of the EGT and up to 45% of the EGT. Further, in certain exemplary aspects, the cooled cooling air system 250 may be configured to receive between 2.5% and 35% of an airflow through the working gas flowpath 142 at an inlet to the HP compressor 128, such as between 3% and 20%, such as between 4% and 15%.

In addition, as briefly mentioned above, the cooled cooling air system 250 may utilize the thermal transport bus 300 to reject heat from the cooling air extracted from the compressor section of the turbomachine 120. In particular, for the embodiment shown the CCA heat exchanger 254 is in thermal communication with or integrated into the thermal transport bus 300. Notably, the thermal transport bus 300 further includes a fuel heat exchanger 302 in thermal communication with the fuel line 274. In such a manner, the thermal transport bus 300 may extract heat from the cooling air extracted from the compressor section through the cooled cooling air system 250 and provide such heat to a fuel flow through the fuel line 274 upstream of the fuel nozzle 270.

For the embodiment depicted, the thermal transport bus 300 includes a conduit having a flow of thermal transport fluid therethrough. More specifically, referring now briefly to FIG. 5, a schematic view of a thermal transport bus 300 as may be utilized with the exemplary engine 100 described above with reference to FIGS. 1 through 4 is provided.

The thermal transport bus 300 includes an intermediary heat exchange fluid flowing therethrough and is formed of one or more suitable fluid conduits 304. The heat exchange fluid may be an incompressible fluid having a high temperature operating range. Additionally, or alternatively, the heat exchange fluid may be a single phase fluid, or alternatively, may be a phase change fluid. In certain exemplary embodiments, the heat exchange fluid may be a supercritical fluid, such as a supercritical $CO_2$.

The exemplary thermal transport bus 300 includes a pump 306 in fluid communication with the heat exchange fluid in the thermal transport bus 300 for generating a flow of the heat exchange fluid in/through the thermal transport bus 300.

Moreover, the exemplary thermal transport bus 300 includes one or more heat source exchangers 308 in thermal communication with the heat exchange fluid in the thermal transport bus 300. Specifically, the thermal transport bus 300 depicted includes a plurality of heat source exchangers 308. The plurality of heat source exchangers 308 are configured to transfer heat from one or more of the accessory systems of an engine within which the thermal transport bus 300 is installed (e.g., engine 100 of FIGS. 1 through 4) to the heat exchange fluid in the thermal transport bus 300. For example, in certain exemplary embodiments, the plurality of heat source exchangers 308 may include one or more of: a CCA heat source exchanger (such as CCA heat exchanger 254 in FIGS. 2 and 4); a main lubrication system heat source exchanger for transferring heat from a main lubrication system; an advanced clearance control (ACC) system heat source exchanger for transferring heat from an ACC system; a generator lubrication system heat source exchanger for transferring heat from the generator lubrication system; an environmental control system (ECS) heat exchanger for transferring heat from an ECS; an electronics cooling system heat exchanger for transferring heat from the electronics cooling system; a vapor compression system heat source exchanger; an air cycle system heat source exchanger; and an auxiliary system(s) heat source exchanger.

For the embodiment depicted, there are three heat source exchangers 308. The heat source exchangers 308 are each arranged in series flow along the thermal transport bus 300. However, in other exemplary embodiments, any other suitable number of heat source exchangers 308 may be included and one or more of the heat source exchangers 308 may be arranged in parallel flow along the thermal transport bus 300 (in addition to, or in the alternative to the serial flow arrangement depicted). For example, in other embodiments there may be a single heat source exchanger 308 in thermal communication with the heat exchange fluid in the thermal transport bus 300, or alternatively, there may be at least two heat source exchangers 308, at least four heat source exchangers 308, at least five heat source exchangers 308, or at least six heat source exchangers 308, and up to twenty heat source exchangers 308 in thermal communication with heat exchange fluid in the thermal transport bus 300.

Figure 5:
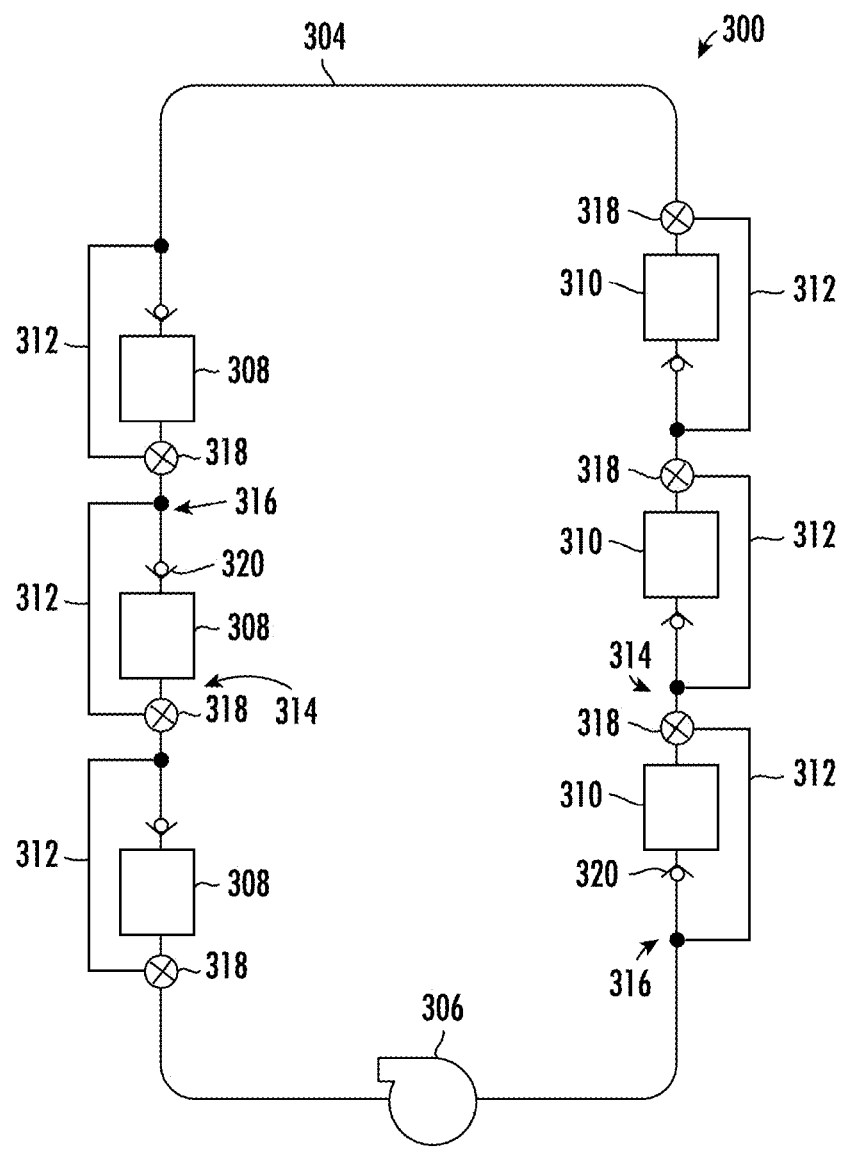
FIG. 5 is a schematic view of a thermal transport bus of the present disclosure.

Additionally, the exemplary thermal transport bus 300 of FIG. 5 further includes one or more heat sink exchangers 310 permanently or selectively in thermal communication with the heat exchange fluid in the thermal transport bus 300. The one or more heat sink exchangers 310 are located downstream of the plurality of heat source exchangers 308 and are configured for transferring heat from the heat exchange fluid in the thermal transport bus 300, e.g., to atmosphere, to fuel, to a fan stream, etc. For example, in certain embodiments the one or more heat sink exchangers 310 may include at least one of a RAM heat sink exchanger, a fuel heat sink exchanger, a fan stream heat sink exchanger, a bleed air heat sink exchanger, an engine intercooler heat sink exchanger, a bypass passage heat sink exchanger, or a cold air output heat sink exchanger of an air cycle system. The fuel heat sink exchanger is a "fluid to heat exchange fluid" heat exchanger wherein heat from the heat exchange fluid is transferred to a stream of liquid fuel (see, e.g., fuel heat exchanger 302 of the engine 100 of FIG. 4). Moreover, the fan stream heat sink exchanger is generally an "air to heat exchange fluid" heat exchanger which transfers heat from the heat exchange fluid to an airflow through the fan stream (see, e.g., heat exchanger 196 of FIGS. 1 and 2). Further, the bleed air heat sink exchanger is generally an "air to heat exchange fluid" heat exchanger which flows, e.g., bleed air from the LP compressor 126 over the heat exchange fluid to remove heat from the heat exchange fluid.

For the embodiment of FIG. 5, the one or more heat sink exchangers 310 of the thermal transport bus 300 depicted includes a plurality of individual heat sink exchangers 310. More particularly, for the embodiment of FIG. 5, the one or more heat sink exchangers 310 include three heat sink exchangers 310 arranged in series. The three heat sink exchangers 310 are configured as a bypass passage heat sink exchanger, a fuel heat sink exchanger, and a fan stream heat sink exchanger. However, in other exemplary embodiments, the one or more heat sink exchangers 310 may include any other suitable number and/or type of heat sink exchangers 310. For example, in other exemplary embodiments, a single heat sink exchanger 310 may be provided, at least two heat sink exchangers 310 may be provided, at least four heat sink exchangers 310 may be provided, at least five heat sink exchangers 310 may be provided, or up to twenty heat sink exchangers 310 may be provided. Additionally, in still other exemplary embodiments, two or more of the one or more heat sink exchangers 310 may alternatively be arranged in parallel flow with one another.

Referring still to the exemplary embodiment depicted in FIG. 5, one or more of the plurality of heat sink exchangers 310 and one or more of the plurality of heat source exchangers 308 are selectively in thermal communication with the heat exchange fluid in the thermal transport bus 300. More particularly, the thermal transport bus 300 depicted includes a plurality of bypass lines 312 for selectively bypassing each heat source exchanger 308 and each heat sink exchanger 310 in the plurality of heat sink exchangers 310. Each bypass line 312 extends between an upstream juncture 314 and a downstream juncture 316—the upstream juncture 314 located just upstream of a respective heat source exchanger 308 or heat sink exchanger 310, and the downstream juncture 316 located just downstream of the respective heat source exchanger 308 or heat sink exchanger 310.

Additionally, each bypass line 312 meets at the respective upstream juncture 314 with the thermal transport bus 300 via a three-way valve 318. The three-way valves 318 each include an inlet fluidly connected with the thermal transport bus 300, a first outlet fluidly connected with the thermal transport bus 300, and a second outlet fluidly connected with the bypass line 312. The three-way valves 318 may each be a variable throughput three-way valve, such that the three-way valves 318 may vary a throughput from the inlet to the first and/or second outlets. For example, the three-way valves 318 may be configured for providing anywhere between zero percent (0%) and one hundred percent (100%) of the heat exchange fluid from the inlet to the first outlet, and similarly, the three-way valves 318 may be configured for providing anywhere between zero percent (0%) and one hundred percent (100%) of the heat exchange fluid from the inlet to the second outlet.

Notably, the three-way valves 318 may be in operable communication with a controller of an engine including the thermal transport bus 300 (e.g., engine 100 of FIGS. 1 through 4).

Further, each bypass line 312 also meets at the respective downstream juncture 316 with the thermal transport bus 300. Between each heat source exchanger 308 or heat sink exchanger 310 and downstream juncture 316, the thermal transport bus 300 includes a check valve 320 for ensuring a proper flow direction of the heat exchange fluid. More particularly, the check valve 320 prevents a flow of heat exchange fluid from the downstream juncture 316 towards the respective heat source exchanger 308 or heat sink exchanger 310.

As alluded to earlier, the inventors discovered, unexpectedly during the course of gas turbine engine design—i.e., designing gas turbine engines having a variety of different high pressure compressor exit areas, total thrust outputs, redline exhaust gas temperatures, and supporting technology characteristics and evaluating an overall engine performance and other qualitative turbofan engine characteristics—a significant relationship between a total sea level static thrust output, a compressor exit area, and a redline exhaust gas temperature that enables increased engine core operating temperatures and overall engine propulsive efficiency. The relationship can be thought of as an indicator of the ability of a turbofan engine to have a reduced weight or volume as represented by a high pressure compressor exit area, while maintaining or even improving upon an overall thrust output, and without overly detrimentally affecting overall engine performance and other qualitative turbofan engine characteristics. The relationship applies to an engine that incorporates a cooled cooling air system, builds portions of the core using material capable of operating at higher temperatures, or a combination of the two. Significantly, the relationship ties the core size (as represented by the exit area of the higher pressure compressor) to the desired thrust and exhaust gas temperature associated with the desired propulsive efficiency and practical limitations of the engine design, as described below.

Referring to the case of an engine that utilizes cooled cooling air for operating at higher temperatures, the inventors discovered, unexpectedly, that the costs associated with achieving a higher compression, enabled by reducing gas temperatures used to cool core components to accommodate higher core gas temperatures, may indeed produce a net benefit, contrary to expectations in the art. Referring to the case of utilizing more temperature-resistant material, such as a Carbon Matrix Composite (CMC), it was found that certain aspects of the engine size, weight and operating characteristics can be positively affected while taking into account the complexities and/or drawbacks associated with such material. In either case, the relationship now described can apply to identify the interrelated operating conditions and core size—i.e., total sea level static thrust, redline exhaust gas temperature, and compressor exit area, respectively.

The inventors of the present disclosure discovered bounding the relationship between a product of total thrust output and redline exhaust gas temperature at a takeoff power level and the high pressure compressor exit area squared (corrected specific thrust) can result in a higher power density core. This bounded relationship, as described herein, takes into due account the amount of overall complexity and cost, and/or a low amount of reliability associated with implementing the technologies required to achieve the operating temperatures and exhaust gas temperature associated with the desired thrust levels. The amount of overall complexity and cost may be prohibitively high for gas turbine engines outside the bounds of the relationship as described herein, and/or the reliability may prohibitively low outside the bounds of the relationship as described herein. The relationship discovered, infra, can therefore identify an improved engine configuration suited for a particular mission requirement, one that takes into account efficiency, weight, cost, complexity, reliability, and other factors influencing the optimal choice for an engine configuration.

In addition to yielding an improved gas turbine engine, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as:

$$CST = Fn_{Total} \times EGT / (A_{HPCExit}^2 \times 1000), \qquad \text{Expression (2)}$$

where CST is corrected specific thrust; $Fn_{Total}$ is a total sea level static thrust output of the gas turbine engine in pounds; EGT is redline exhaust gas temperature in degrees Celsius; and $A_{HPCExit}$ is a high pressure compressor exit area in square inches.

CST values of an engine defined by Expression (2) in accordance with various embodiments of the present disclosure are from 42 to 90, such as from 45 to 80, such as from 50 to 80. The units of the CST values may be pounds-degrees Celsius over square inches.

Figures 6, 7:
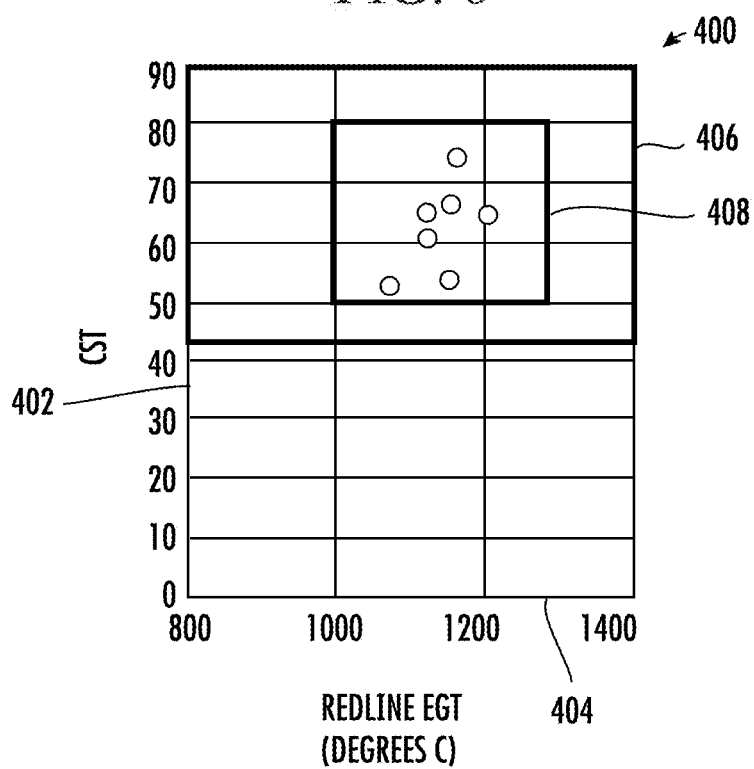
FIG. 6 is a table depicting numerical values showing the relationships between various parameters in accordance with various example embodiments of the present disclosure.
FIG. 7 is a graph depicting a range of corrected specific thrust values and redline exhaust gas temperature values of gas turbine engines in accordance with various example embodiments of the present disclosure.

Referring now to FIGS. 6 and 7, various exemplary gas turbine engines are illustrated in accordance with one or more exemplary embodiments of the present disclosure. In particular, FIG. 6 provides a table including numerical values corresponding to several of the plotted gas turbine engines in FIG. 7. FIG. 7 is a plot 400 of gas turbine engines in accordance with one or more exemplary embodiments of the present disclosure, showing the CST on a Y-axis 402 and the EGT on an X-axis 404.

As shown, the plot 400 in FIG. 7 depicts a first range 406, with the CST values between 42 and 90 and EGT values from 800 degrees Celsius to 1400 degrees Celsius. FIG. 7 additionally depicts a second range 408, with the CST values between 50 and 80 and EGT values from 1000 degrees Celsius to 1300 degrees Celsius. It will be appreciated that in other embodiments, the EGT value may be greater than 1100 degree Celsius and less than 1250 degrees Celsius, such as greater than 1150 degree Celsius and less than 1250 degrees Celsius, such as greater than 1000 degree Celsius and less than 1300 degrees Celsius.

It will be appreciated that although the discussion above is generally related to an open rotor engine having a particular cooled cooling air system 250 (FIG. 2), in various embodiments of the present disclosure, the relationship outlined above with respect to Expression (2) may be applied to any other suitable engine architecture, including any other suitable technology(ies) to allow the gas turbine engine to accommodate higher temperatures to allow for a reduction in the high pressure compressor exit area, while maintaining or even increasing the maximum turbofan engine thrust output without, e.g., prematurely wearing various components within the turbomachine exposed the working gas flowpath.

Figure 8:
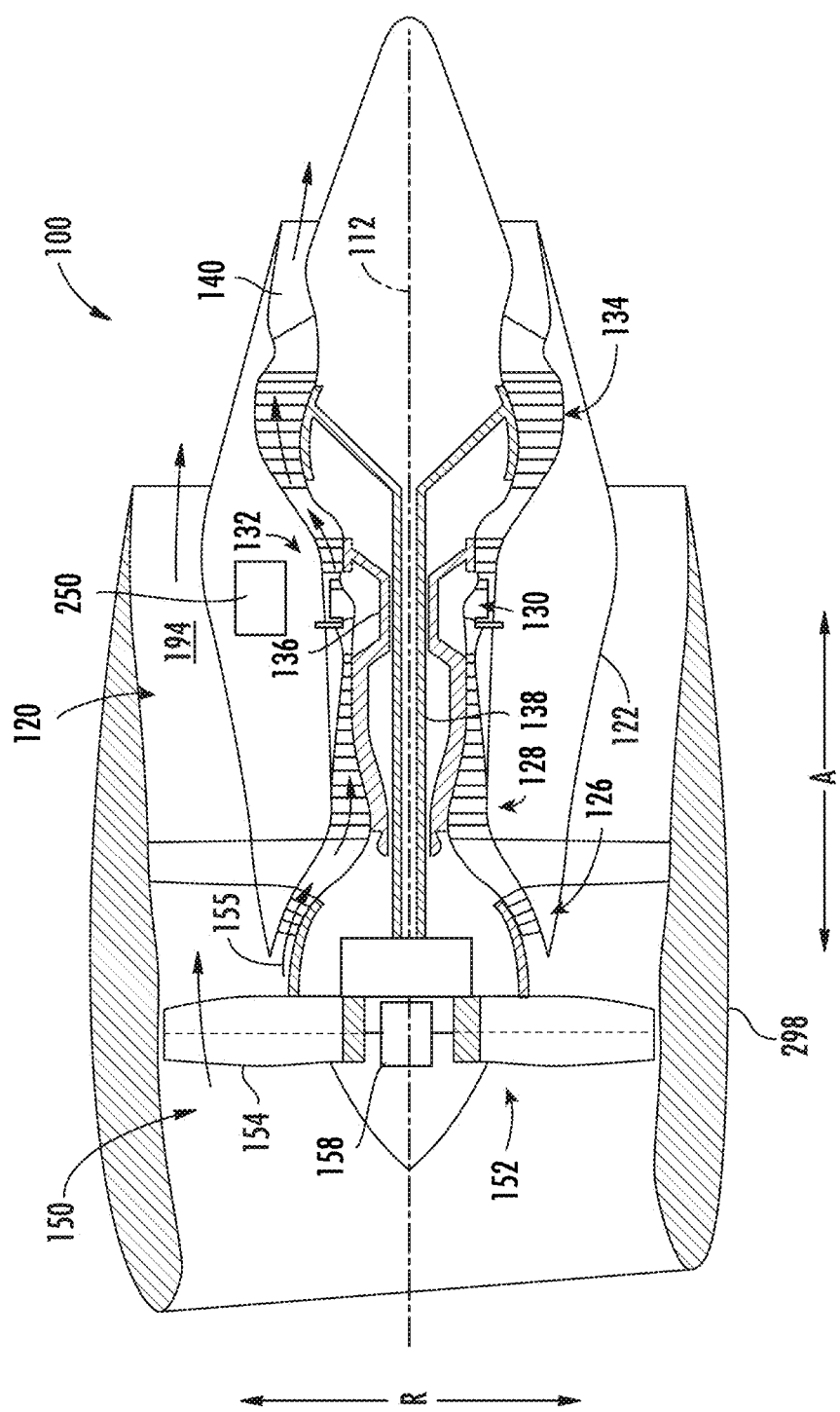
FIG. 8 is a schematic view of a ducted turbofan engine in accordance with an exemplary aspect of the present disclosure.

For example, reference will now be made to FIG. 8. FIG. 8 provides a schematic view of an engine 100 in accordance with another exemplary embodiment of the present disclosure. The exemplary embodiment of FIG. 8 may be configured in substantially the same manner as the exemplary engine 100 described above with respect to FIGS. 1 through 4, and the same or similar reference numerals may refer to the same or similar parts. However, as will be appreciated, for the embodiment shown, the engine 100 further includes an outer housing or nacelle 298 circumferentially surrounding at least in part a fan section 150 and a turbomachine 120. The nacelle 298 defines a bypass passage 194 between the nacelle 298 and the turbomachine 120.

Briefly, it will be appreciated that the exemplary engine 100 of FIG. 8 is configured as a two-stream engine, i.e., an engine without a third stream (e.g., fan stream 172 in the exemplary engine 100 of FIG. 2). With such a configuration, a total sea level static thrust output FnTotal of the engine 100 may generally be equal to a sum of: a fan stream thrust FnFan (i.e., an amount of thrust generated by a fan 152 through a bypass passage 194) and a turbomachine thrust FnTM (i.e., an amount of thrust generated by an airflow through a turbomachine exhaust nozzle 140), each during the static, sea level, standard day conditions.

Further, for the exemplary embodiment of FIG. 8, the engine 100 additionally includes a cooled cooling air system 250 configured to provide a turbine section with cooled cooling air during operation of the engine 100, to allow the engine 100 to accommodate higher temperatures to allow for a reduction in a high pressure compressor exit area, while maintaining or even increasing a maximum turbofan engine thrust output.

It will be appreciated that in other exemplary embodiments of the present disclosure, the cooled cooling air system 250 of the engine 100 may be configured in any other suitable manner. For example, the exemplary cooled cooling air system 250 described above with reference to FIGS. 2 and 3 is generally configured as a thermal bus cooled cooling air system. However, in other embodiments, the cooled cooling air system 250 may instead be a dedicated heat exchanger cooled cooling air system (i.e., a cooled cooling air system including a heat exchanger that transfers heat directly to a cooling medium). Additionally, in other embodiments, the cooled cooling air system 250 may be a bypass heat exchanger cooled cooling air system having a heat sink heat exchanger thermally coupled to an airflow through a bypass passage (see, e.g., FIG. 9, discussed below). Additionally, or alternatively, in other embodiments, the cooled cooling air system 250 may be one of an air-to-air cooled cooling air system (a cooled cooling air system having a heat sink heat exchanger configured to transfer heat to an airflow; see, e.g., FIG. 9, discussed below); an oil-to-air cooled cooling air system (a cooled cooling air system having a heat sink heat exchanger configured to transfer heat to an oil flow); or a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4).

Figure 10:
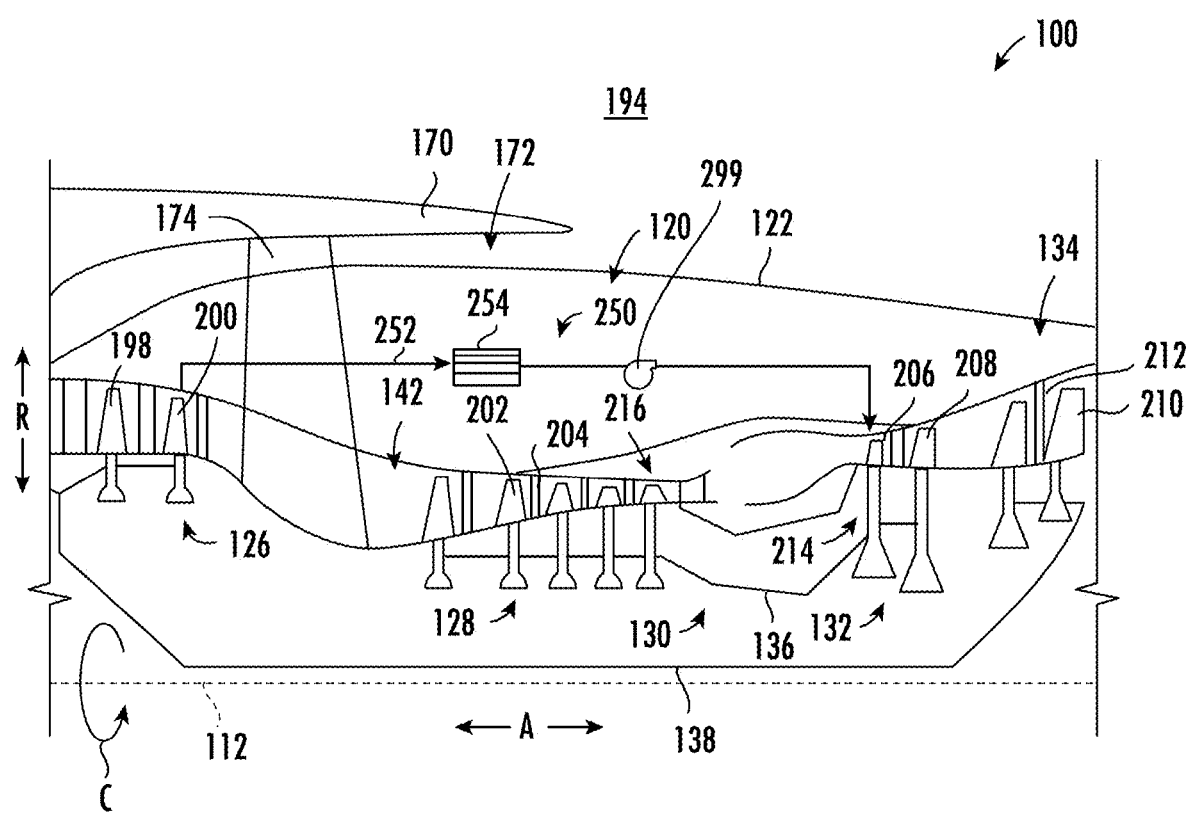
FIG. 10 is a schematic, close-up view of a gas turbine engine having a cooled cooling air system in accordance with yet another exemplary aspect of the present disclosure.
Figure 11:
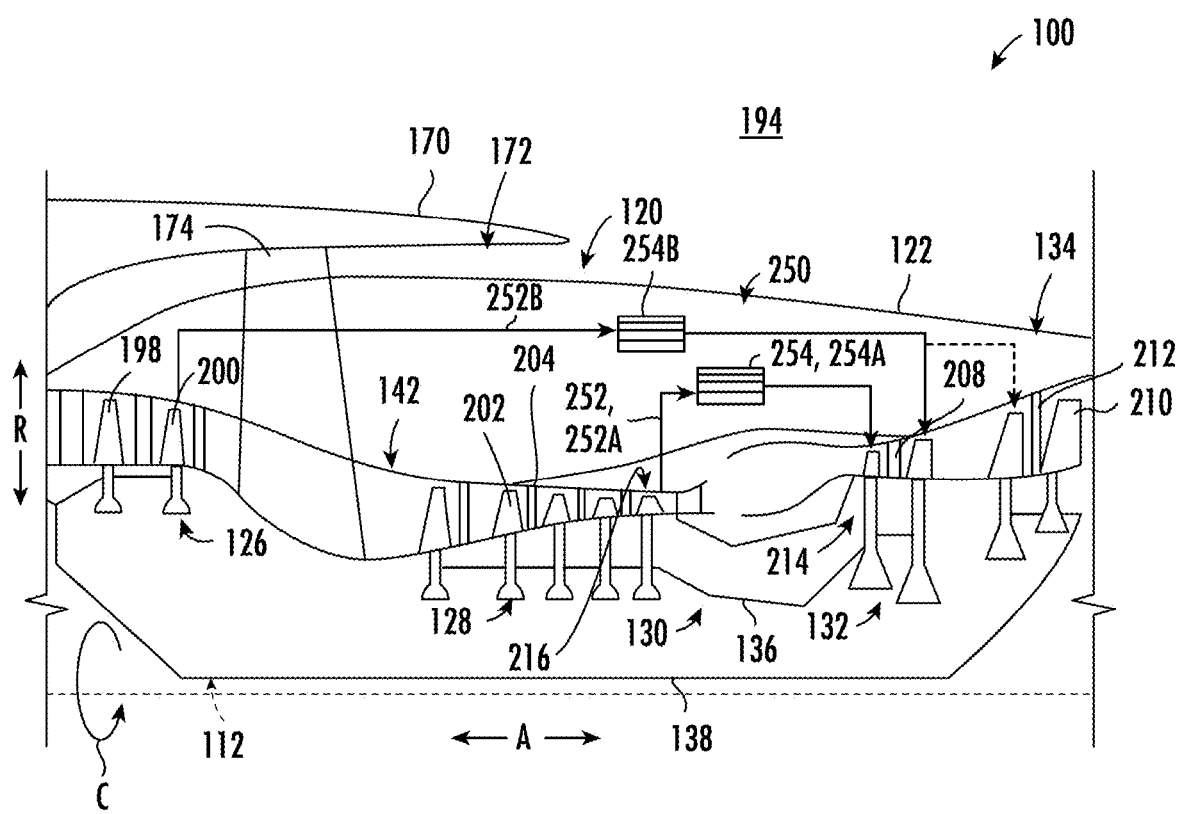
FIG. 11 is a schematic, close-up view of a gas turbine engine having a cooled cooling air system in accordance with still another exemplary aspect of the present disclosure.

More particularly, referring generally to FIGS. 9 through 11, in other exemplary embodiments, the cooled cooling air system 250 of the engine 100 may be configured in any other suitable manner. The exemplary engines 100 depicted in FIGS. 9 through 11 may be configured in a similar manner as exemplary engine 100 described above with reference to FIGS. 1 through 4, and the same or similar numbers may refer to the same or similar parts.

For example, each of the exemplary engines 100 depicted in FIGS. 9 through 11 generally includes a turbomachine 120 having an LP compressor 126, an HP compressor 128, a combustion section 130, an HP turbine 132, and an LP turbine 134 collectively defining at least in part a working gas flowpath 142 and arranged in serial flow order. The exemplary turbomachine 120 depicted additionally includes a core cowl 122, and the engine 100 includes a fan cowl 170. The engine 100 includes or defines a fan duct 172 positioned partially between the core cowl 122 and the fan cowl 170. Moreover, a bypass passage 194 is defined at least in part by the core cowl 122, the fan cowl 170, or both and extends over the turbomachine 120.

Moreover, the exemplary engines 100 depicted in FIGS. 9 to 11 additionally include a cooled cooling air system 250. The cooled cooling air system 250 generally includes a duct assembly 252 and a CCA heat exchanger 254.

However, referring particular to FIG. 9, it will be appreciated that for the exemplary embodiment depicted, the CCA heat exchanger 254 is positioned in thermal communication with the bypass passage 194, and more specifically, it is exposed to an airflow through or over the bypass passage 194. For the embodiment of FIG. 9, the CCA heat exchanger 254 is positioned on the core cowl 122. In such a manner, the CCA heat exchanger 254 may be an air-to-air CCA heat exchanger configured to exchange heat between an airflow extracted from the HP compressor 128 and the airflow through the bypass passage 194.

As is depicted in phantom, the cooled cooling air system 250 may additionally or alternatively be positioned at any other suitable location along the bypass passage 194, such as on the fan cowl 170. Further, although depicted in FIG. 9 as being positioned on the core cowl 122, in other embodiments, the CCA heat exchanger 254 may be embedded into the core cowl 122, and airflow through the bypass passage 194 may be redirected from the bypass passage 194 to the CCA heat exchanger 254.

As will be appreciated, a size of the CCA heat exchanger 254 may affect the amount of drag generated by the CCA heat exchanger 254 being positioned within or exposed to the bypass passage 194. Accordingly, sizing the cooled cooling air system 250 in accordance with the present disclosure may allow for a desired reduction in a HP compressor 128 exit area, while maintaining or even increasing a total thrust output for the engine 100, without creating an excess amount of drag on the engine 100 in the process.

Referring now particular to FIG. 10, it will be appreciated that for the exemplary embodiment depicted, the cooled cooling air system 250 is configured to receive the cooling airflow from an air source upstream of a downstream half of the HP compressor 128. In particular, for the exemplary embodiment of FIG. 10, the exemplary cooled cooling air system 250 is configured to receive the cooling airflow from a location upstream of the HP compressor 128, and more specifically, still, from the LP compressor 126. In order to allow for a relatively low pressure cooling airflow to be provided to a first stage 214 of HP turbine rotor blades 206 of the HP turbine 132, the cooled cooling air system 250 further includes a pump 299 in airflow communication with the duct assembly 252 to increase a pressure of the cooling airflow through the duct assembly 252. For the exemplary aspect depicted, the pump 299 is positioned downstream of the CCA heat exchanger 254. In such a manner, the pump 299 may be configured to increase the pressure of the cooling airflow through the duct assembly 252 after the cooling airflow has been reduced in temperature by the CCA heat exchanger 254. Such may allow for a reduction in wear on the pump 299.

Referring now particularly to FIG. 11, it will be appreciated that the cooled cooling air system 250 includes a high-pressure portion and a low-pressure portion operable in parallel. In particular, the duct assembly 252 includes a high-pressure duct assembly 252A and a low-pressure duct assembly 252B, and the CCA heat exchanger 254 includes a high-pressure CCA heat exchanger 254A and a low-pressure CCA heat exchanger 254B.

The high-pressure duct assembly 252A is in fluid communication with the HP compressor 128 at a downstream half of the high-pressure compressor and is further in fluid communication with a first stage 214 of HP turbine rotor blades 206. The high-pressure duct assembly 252A may be configured to receive a high-pressure cooling airflow from the HP compressor 128 through the high-pressure duct assembly 252A and provide such high-pressure cooling airflow to the first stage 214 of HP turbine rotor blades 206. The high-pressure CCA heat exchanger 254A may be configured to reduce a temperature of the high-pressure cooling airflow through the high-pressure duct assembly 252A at a location upstream of the first stage 214 of HP turbine rotor blades 206.

The low-pressure duct assembly 252B is in fluid communication with a location upstream of the downstream half of the high-pressure compressor 128 and is further in fluid communication with the HP turbine 132 and a location downstream of the first stage 214 of HP turbine rotor blades 206. In particular, for the embodiment depicted, the low-pressure duct assembly 252B is in fluid communication with the LP compressor 126 and a second stage (not labeled) of HP turbine rotor blades 206. The low-pressure duct assembly 252B may be configured to receive a low-pressure cooling airflow from the LP compressor 126 through the low-pressure duct assembly 252B and provide such low-pressure cooling airflow to the second stage of HP turbine rotor blades 206. The low-pressure CCA heat exchanger 254B may be configured to reduce a temperature of the low-pressure cooling airflow through the low-pressure duct assembly 252B upstream of the second stage of HP turbine rotor blades 206.

Inclusion of the exemplary cooled cooling air system 250 of FIG. 11 may reduce an amount of resources utilized by the cooled cooling air system 250 to provide a desired amount of cooling for the turbomachine 120.

Further, for the exemplary embodiment of FIG. 11, it will be appreciated that the cooled cooling air system 250 may further be configured to provide cooling to one or more stages of LP turbine rotor blades 210, and in particular to a first stage (i.e., upstream-most stage) of LP turbine rotor blades 210. Such may further allow for, e.g., the higher operating temperatures described herein.

Figure 12:
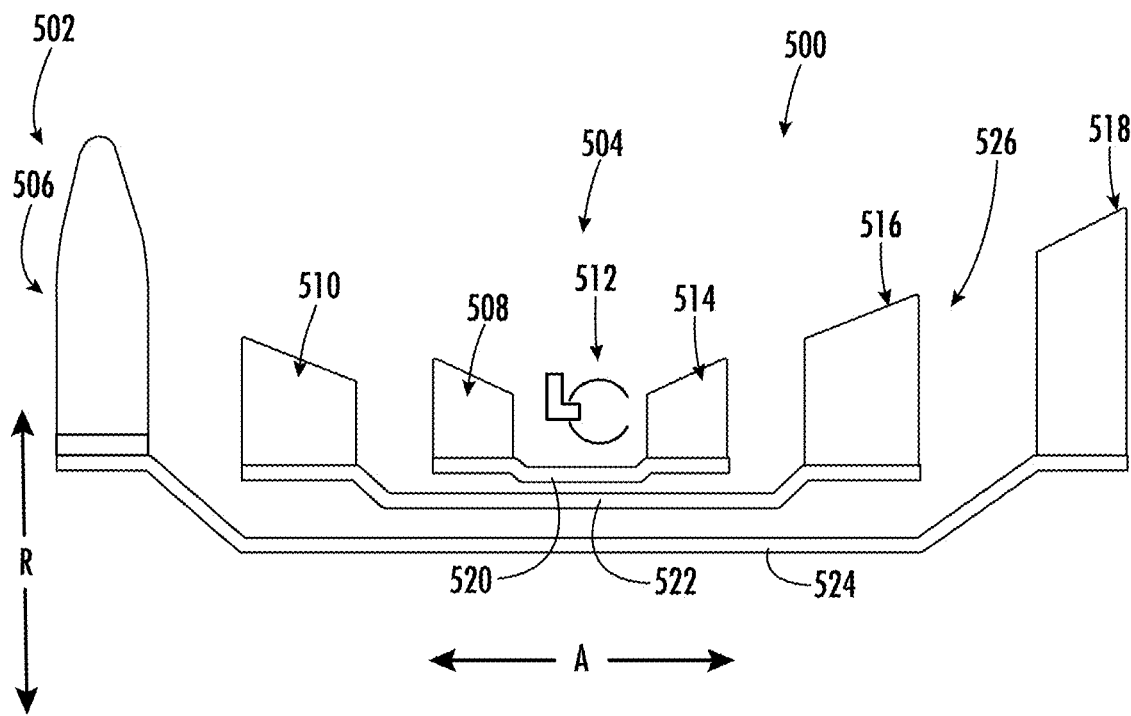
FIG. 12 is a schematic view of a turbofan engine in accordance with another exemplary aspect of the present disclosure.
Figure 17:
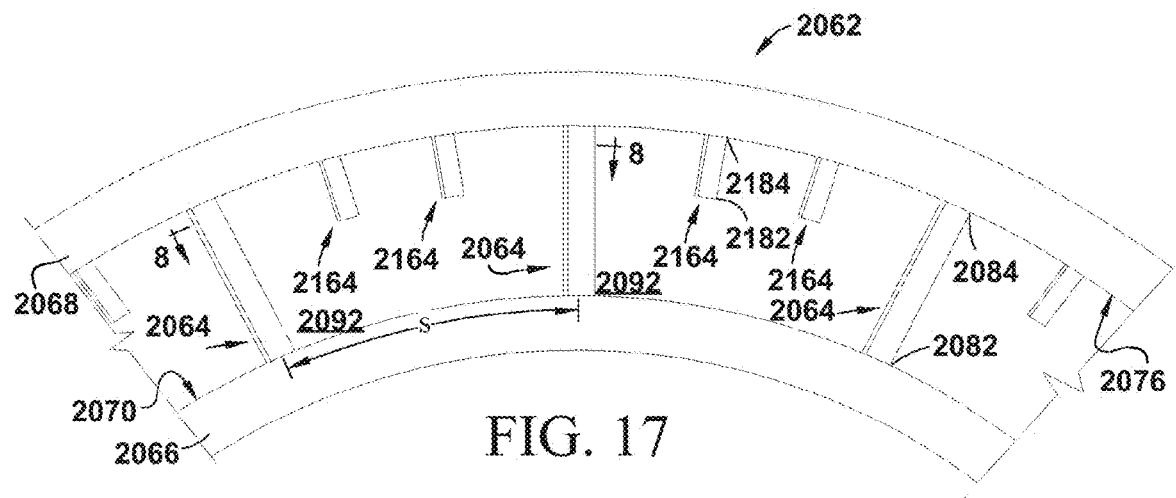
FIG. 17 is a front elevation view of a portion of a turbine nozzle assembly suitable for inclusion in an engine described herein.

Reference will now be made briefly to FIG. 12. FIG. 12 provides a schematic view of an engine 500 in accordance with another exemplary embodiment of the present disclosure. The exemplary embodiment of FIG. 12 may be configured in substantially the same manner as the exemplary engine 100 described above with respect to FIGS. 1 through 4, and the same or similar reference numerals may refer to the same or similar parts. However, as will be appreciated, for the embodiment shown, the engine 500 is configured as a three-spool engine, instead of a two-spool engine.

For example, the exemplary engine 500 includes a fan section 502 and a turbomachine 504. The fan section includes a fan 506. The turbomachine includes a first compressor 508, a second compressor 510, a combustion section 512, a first turbine 514, a second turbine 516, and a third turbine 518. The first compressor 508 may be a high pressure compressor, the second compressor 510 may be a medium pressure compressor (or intermediate pressure compressor), the first turbine 514 may be a high pressure turbine, the second turbine 516 may be a medium pressure turbine (or intermediate pressure turbine), and the third turbine 518 may be a low pressure turbine. Further, the engine 500 includes a first shaft 520 extending between, and rotatable with both of, the first compressor 508 and first turbine 514; a second shaft 522 extending between, and rotatable with both of, the second compressor 510 and second turbine 516; and a third shaft 524 extending between, and rotatable with both of, the third turbine 518 and fan 506. In such a manner, it will be appreciated that the engine 500 may be referred to as a three-spool engine.

For the embodiment of FIG. 12, the term redline EGT refers to a maximum temperature of an airflow after the first stator downstream of the last stage of rotor blades of the intermediate speed turbine, e.g., at location 526 in FIG. 12 (assuming the intermediate speed turbine 516 includes a stage of stator vanes downstream of the last stage of rotor blades).

It will further be appreciated that the exemplary cooled cooling air systems 250 described hereinabove are provided by way of example only. In other exemplary embodiments, aspects of one or more of the exemplary cooled cooling air systems 250 depicted may be combined to generate still other exemplary embodiments. For example, in still other exemplary embodiments, the exemplary cooled cooling air system 250 of FIGS. 2 through 4 may not be utilized with a thermal transport bus (e.g., thermal transport bus 300), and instead may directly utilize a CCA heat exchanger 254 positioned within the fan duct 172. Similarly, in other example embodiment, the exemplary cooled cooling air systems 250 of FIGS. 9 through 11 may be utilized with a thermal transport bus (e.g., thermal transport bus 300 of FIG. 2, 4 or 5) to reject heat for the CCA heat exchanger 254. Additionally, although the exemplary cooled cooling air systems 250 depicted schematically in FIGS. 9 through 11 depict the duct assembly 252 as positioned outward of the working gas flow path 142 along the radial direction R, in other exemplary embodiments, the duct assemblies 252 may extend at least partially inward of the working gas flow path 142 along the radial direction R (see, e.g., FIG. 4). In still other exemplary embodiments, the cooled cooling air system 250 may include duct assemblies 252 positioned outward of the working gas flow path 142 along the radial direction R and inward of the working gas flow path 142 along the radial direction R (e.g., in FIG. 11, the high-pressure duct assembly 252A may be positioned inwardly of the working gas flow path 142 along the radial direction R and the low-pressure duct assembly 252B may be positioned outwardly of the working gas flow path 142 along the radial direction R).

Moreover, it will be appreciated that in still other exemplary aspects, the gas turbine engine may include additional or alternative technologies to allow the gas turbine engine to accommodate higher temperatures while maintaining or even increasing the maximum turbofan engine thrust output, as may be indicated by a reduction in the high pressure compressor exit area, without, e.g., prematurely wearing on various components within the turbomachine exposed to the working gas flowpath.

For example, in additional or alternative embodiments, a gas turbine engine may incorporate advanced materials capable of withstanding the relatively high temperatures at downstream stages of a high pressure compressor exit (e.g., at a last stage of high pressure compressor rotor blades), and downstream of the high pressure compressor (e.g., a first stage of an HP turbine, downstream stages of the HP turbine, an LP turbine, an exhaust section, etc.).

In particular, in at least certain exemplary embodiments, a gas turbine engine of the present disclosure may include an airfoil (e.g., rotor blade or stator vane) in one or more of the HP compressor, the first stage of the HP turbine, downstream stages of the HP turbine, the LP turbine, the exhaust section, or a combination thereof formed of a composite material, for example, a ceramic-matrix-composite or "CMC" as defined above.

One or more of an engine's components used in higher temperature sections of the engine, such as airfoils (e.g., turbines, and vanes), combustors, shrouds and other like components, formed of a CMC material may include an environmental-barrier-coating or "EBC." The term EBC refers to a coating system including one or more layers of ceramic materials, each of which provides specific or multifunctional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., including barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

In such a manner, it will be appreciated that the EBCs may generally be suitable for application to "components" found in the relatively high temperature environments noted above. Examples of such components can include, for example, combustor components, turbine blades, shrouds, nozzles, heat shields, and vanes.

Additionally, or alternatively still, in other exemplary embodiments, a gas turbine engine of the present disclosure may include an airfoil (e.g., rotor blade or stator vane) in one or more of an HP compressor, a first stage of an HP turbine, downstream stages of the HP turbine, an LP turbine, an exhaust section, or a combination thereof formed in part, in whole, or in some combination of materials including but not limited to titanium, nickel, and/or cobalt based superalloys (e.g., those available under the name Inconel® available from Special Metals Corporation). One or more of these materials are examples of materials suitable for use in an additive manufacturing processes.

Turning again to composite materials, certain advantages are achieved when incorporating the following described features of using composite materials to form portions of the airfoils described above. In particular, the strength provided by using composite materials in portions of the airfoils improves the reliability and fatigue life of a fan blade. Composite fan blades offer a higher strength to weight ratio, which is desirable. Various such applications are described below.

As generally described above, and in certain exemplary embodiments of the present disclosure, a turbine engine defining a centerline and a circumferential direction is provided. The turbine engine may generally include a turbomachine and a rotor assembly. The rotor assembly may be driven by the turbomachine. The turbomachine, the rotor assembly, or both may define a substantially annular flow path relative to the centerline of the turbine engine. In certain aspects of the present disclosure, an unducted or open rotor turbine engine includes a set of circumferentially spaced fan blades, which extend, exteriorly, beyond a nacelle encasing or engine core.

The turbine engine includes airfoils in the form of blades and vanes. The airfoils described herein can be a plurality of airfoils provided circumferentially about the centerline or be partially provided about a portion of the centerline. At least one airfoil in the plurality of airfoils includes a protective covering on a leading edge of the airfoil. The protective covering can be a metal covering. The protective covering is referred to herein as leading edge protector.

The leading edge protector can be designed for various flight conditions, including take off, descent, and idle. The objective, when designing an airfoil, specifically a composite fan blade and a composite outlet guide vane can be generally stated as balancing an added weight component from the protective covering, or sheath, on the leading edge with an acceptable amount of protection of the leading edge. The balancing of efficient weight designs can be particularly important in large turbofan applications of traditional direct drive, gear-reduction designs, and open-rotor designs. Key factors to consider include that the ratio of the leading edge chord to the blade chord is a balance between the leading edge dominating the response to a bird ingestion or similar event, and the PMC airfoil dominating the characteristics of the blade aerodynamics in normal operation.

There is a tradeoff between the percent of the airfoil chord that is covered by the leading edge protector, and the performance of the airfoil. The protective covering provides a stiffness to the airfoil for bird ingestion, but the remainder of the blade is desirable to be flexible for aerodynamic purposes. Because the fan blade rotates and the OGV is stationary the dynamics of a bird ingestion event differs for the two airfoils.

It has been determined that the leading edge protector must overlap with enough of the composite airfoil in order to provide a strong enough bond, but it is desirable to minimize the overlap in order for the composite blade to flex. The leading edge protector also provides erosion protection to a composite airfoil for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the OGV is not rotating and experiences a different stress when impacted by a bird after it has passed through the fan. Multiple simulations and analyses depending on how the bird strikes the fan, whether it hits directly centered on a leading edge protector or hits between two adjacent blades where it is more likely to pass through without being cut into smaller pieces. The relationship between the percent chord of a rotating and non-rotating blade that is covered by the leading edge protector is not obvious due to the difference in the forces acting upon the airfoils when struck by a bird or similar object.

As such, development proceeded in the manner of designing airfoil stages, modifying the airfoil stages with the addition of the leading edge protector, and redesigning the airfoil stages with the leading edge protector meeting protection requirements associated with the airfoil stages. After calculating and checking an amount of protection provided and an amount of weight increase or decreases associated with the leading edge protector, the process is repeated for other stages of during the design of several different types of turbomachines, such as those shown in FIG. 22. In other words, an airfoil design can meet performance requirements for one location in the engine, but not necessarily for another location.

Figure 22:
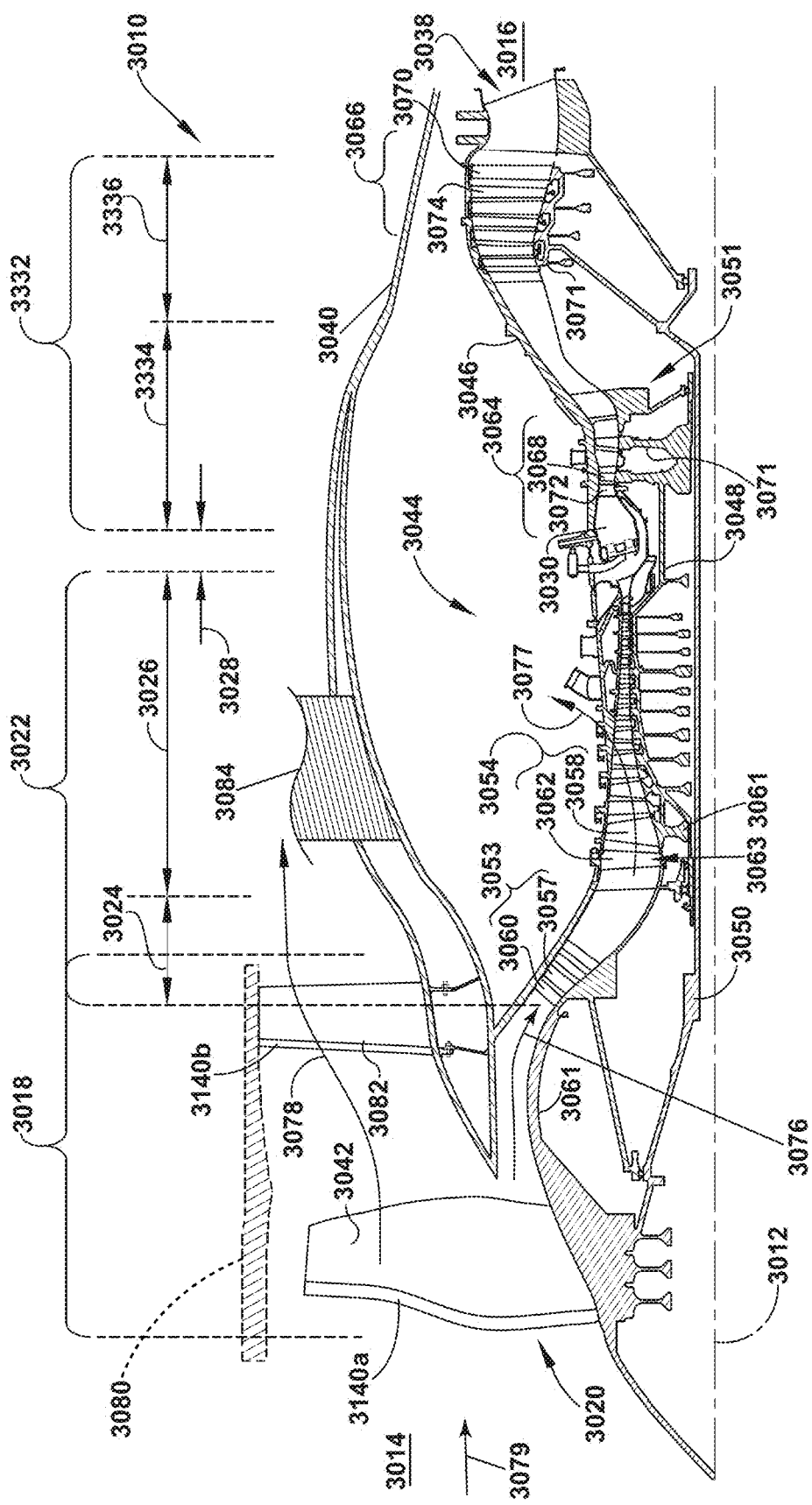
FIG. 22 is a schematic cross-sectional view of a turbine engine.

FIG. 22 is a schematic cross-sectional diagram of a turbine engine 3010 for an aircraft. By way of non-limiting example the turbine engine 3010 is illustrated as an open rotor turbine engine. The turbine engine 3010 has a generally longitudinally extending axis or engine centerline 3012 extending from a forward end 3014 to an aft end 3016. The turbine engine 3010 includes, in downstream serial flow relationship, a set of circumferentially spaced blades or propellers defining a fan section 3018 including a fan 3020, a compressor section 3022 including a booster or LP compressor 3024 and a HP compressor 3026, a combustion section 3028 including a combustor 3030, a turbine section 3032 including a HP turbine 3034, and a LP turbine 3036, and an exhaust section 3038. The turbine engine 3010 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 3040, of the turbine engine 3010 extends from the forward end 3014 of the turbine engine 3010 toward the aft end 3016 of the turbine engine 3010 and covers at least a portion of the compressor section 3022, the combustion section 3028, the turbine section 3032, and the exhaust section 3038. The fan section 3018 can be positioned at a forward portion of the nacelle 3040 and extend radially outward from the nacelle 3040 of the turbine engine 3010. More specifically, the fan section 3018 extends radially outward from the nacelle 3040. The fan section 3018 includes a set of fan blades 3042 and a set of outlet guide vanes (OGV) 3082 downstream the set of fan blades 3042, both disposed radially about the engine centerline 3012. The turbine engine 3010 includes any number of one or more sets of rotating blades or propellers (e.g., the set of fan blades 3042) disposed upstream of a set of stationary fan vanes (e.g., the set of OGVs 3082). As a non-limiting example, the turbine engine 3010 can include multiple sets of rotating blades and stationary vanes. The set of fan blades 3042 can include a first leading edge protector 3140a, and the set of OGVs 3082 can include a second leading edge protector 3140b. As such, the turbine engine 3010 is further defined as an unducted single-fan turbine engine. The turbine engine 3010 is further defined by the location of the fan section 3018 with respect to the combustion section 3028. The fan section 3018 can be upstream, downstream, or in-line with the axial positioning of the combustion section 3028. In some aspects of the disclosure herein, the turbine engine can include a fan casing 3080 (shown in dotted line) surrounding the fan 3020 to define a ducted turbine engine.

The compressor section 3022, the combustion section 3028, and the turbine section 3032 are collectively referred to as an engine core 3044, which generates combustion gases. The engine core 3044 is surrounded by an engine casing 3046, which is operatively coupled with a portion of the nacelle 3040 of the turbine engine 3010.

A HP shaft or spool 3048 disposed coaxially about the engine centerline 3012 of the turbine engine 3010 drivingly connects the HP turbine 3034 to the HP compressor 3026. A LP shaft or spool 3050, which is disposed coaxially about the engine centerline 3012 of the turbine engine 3010 within the larger diameter annular HP spool 3048, drivingly connects the LP turbine 3036 to the LP compressor 3024 and fan 3020. The HP spools 3048 and the LP spool 3050 are rotatable about the engine centerline 3012 and couple to a set of rotatable elements, which collectively define a rotor 3051.

The turbine engine 3010 is either a direct drive or an integral drive engine utilizing a reduction gearbox coupling the LP shaft or spool 3050 to the fan 3020.

The LP compressor 3024 and the HP compressor 3026, respectively, include a set of compressor stages 3053, 3054, in which a set of compressor blades 3057, 3058 rotate relative to a corresponding set of static compressor vanes 3060, 3062 (also called a nozzle) to compress or pressurize the stream of fluid passing through the stage. In a single compressor stage 3053, 3054, multiple compressor blades 3057, 3058 are provided in a ring and extend radially outward relative to the engine centerline 3012, from a blade platform to a blade tip. The corresponding static compressor vanes 3060, 3062 are positioned upstream of and adjacent to the compressor blades 3057, 3058. The number of blades, vanes, and compressor stages shown in FIG. 22 were selected for illustrative purposes only such that other numbers are possible.

The compressor blades 3057, 3058 for a stage of the compressor are mounted to a disk 3061, which is mounted to the corresponding one of the HP and LP spools 3048, 3050, with each stage having its own disk 3061. The static compressor vanes 3060, 3062 for a stage of the compressor are mounted to the engine casing 3046 in a circumferential arrangement.

The HP turbine 3034 and the LP turbine 3036, respectively, include a set of turbine stages 3064, 3066, in which a set of turbine blades 3068, 3070 are rotated relative to a corresponding set of static turbine vanes 3072, 3074 (also called a nozzle) to extract energy from the stream of fluid passing through the stage. In a single turbine stage 3064, 3066, multiple turbine blades 3068, 3070 are provided in a ring and the ring extends radially outward relative to the engine centerline 3012, from a blade platform to a blade tip, while the corresponding static turbine vanes 3072, 3074 are positioned upstream of and adjacent to the turbine blades 3068, 3070. The number of blades, vanes, and turbine stages shown in FIG. 22 were selected for illustrative purposes only, and that other numbers are possible.

The turbine blades 3068, 3070 for a stage of the turbine are mounted to a disk 3071, which is mounted to the corresponding one of the HP and LP spools 3048, 3050, with each stage having a dedicated disk 3071. The static turbine vanes 3072, 3074 for a stage of the compressor are be mounted to the engine casing 3046 in a circumferential arrangement. In addition, the compressor blades 3057, 3058 and the turbine blades 3068, 3070 described herein can be part of a blisk, rather than being mounted to a disk.

Complementary to the rotor portion, the stationary portions of the turbine engine 3010, such as the static vanes 3060, 3062, 3072, 3074 among the compressor section 3022 and the turbine section 3032 are also referred to individually or collectively as a stator 3063. As such, the stator 3063 refers to the combination of non-rotating elements throughout the turbine engine 3010.

The nacelle 3040 is operatively coupled to the turbine engine 3010 and covers at least a portion of the engine core 3044, the engine casing 3046, or the exhaust section 3038. At least a portion of the nacelle 3040 extends axially forward or upstream the illustrated portion. For example, the nacelle 3040 extends axially forward such that a portion of the nacelle 3040 overlays or covers a portion of the fan section 3018 or a booster section (not illustrated) of the turbine engine 3010. A pylon 3084 mounts the turbine engine 3010 to an exterior structure (e.g., a fuselage of an aircraft, a wing, a tail wing, etc.).

During operation of the turbine engine 3010, a freestream airflow 3079 flows against a forward portion of the turbine engine 3010. A portion of the freestream airflow 3079 becomes an inlet airflow 3078 that flows through the set of fan blades 3042 and over the nacelle 3040 of the turbine engine 3010. Subsequently, the inlet airflow 3078 flows over at least a portion of the set of OGVs 3082, which directs the inlet airflow 3078 to be transverse toward the engine centerline 3012. The inlet airflow 3078 then flows past the set of OGVs 3082, following the curvature of the nacelle 3040 and toward the exhaust section 3038.

A portion of the freestream airflow 3079 enters the engine core 3044 after flowing through the set of fan blades 3042 and is described as a working airflow 3076, which is used for combustion within the engine core 3044. More specifically, the working airflow 3076 flows into the LP compressor 3024, which then pressurizes the working airflow 3076 thus defining a pressurized airflow that is supplied to the HP compressor 3026, which further pressurizes the air. The working airflow 3076, or the pressurized airflow, from the HP compressor 3026 is mixed with fuel in the combustor 3030 and ignited, thereby generating combustion gases. Some work is extracted from these gases by the HP turbine 3034, which drives the HP compressor 3026. The combustion gases are discharged into the LP turbine 3036, which extracts additional work to drive the LP compressor 3024, and the working airflow 3076, or exhaust gas, is ultimately discharged from the turbine engine 3010 via the exhaust section 3038. The driving of the LP turbine 3036 drives the LP spool 3050 to rotate the fan 3020 and the LP compressor 3024. The working airflow 3076, including the pressurized airflow and the combustion gases, defines a working airflow that flows through the compressor section 3022, the combustion section 3028, and the turbine section 3032 of the turbine engine 3010.

The working airflow 3076 and at least some of the inlet airflow 3078 merge downstream of the exhaust section 3038 of the turbine engine 3010. The working airflow 3076 and the inlet airflow 3078, together, form an overall thrust of the turbine engine 3010.

It is contemplated that a portion of the working airflow 3076 is drawn as bleed 3077 air (e.g., from the compressor section 3022). The bleed air 3077 provides an airflow to engine components requiring cooling. The temperature of the working airflow 3076 exiting the combustor 3030 is significantly increased with respect to the working airflow 3076 within the compressor section 3022. As such, cooling provided by the bleed air 3077 is necessary for operating of such engine components in the heightened temperature environments or a hot portion of the turbine engine 3010. In the context of a turbine engine, the hot portions of the engine are normally downstream of the combustor 3030, especially the turbine section 3032, with the HP turbine 3034 being the hottest portion as it is directly downstream of the combustion section 3028. Other sources of cooling fluid are, but are not limited to, fluid discharged from the LP compressor 3024 or the HP compressor 3026. Cooling strategies such as those described herein may also be incorporated.

Figure 23:
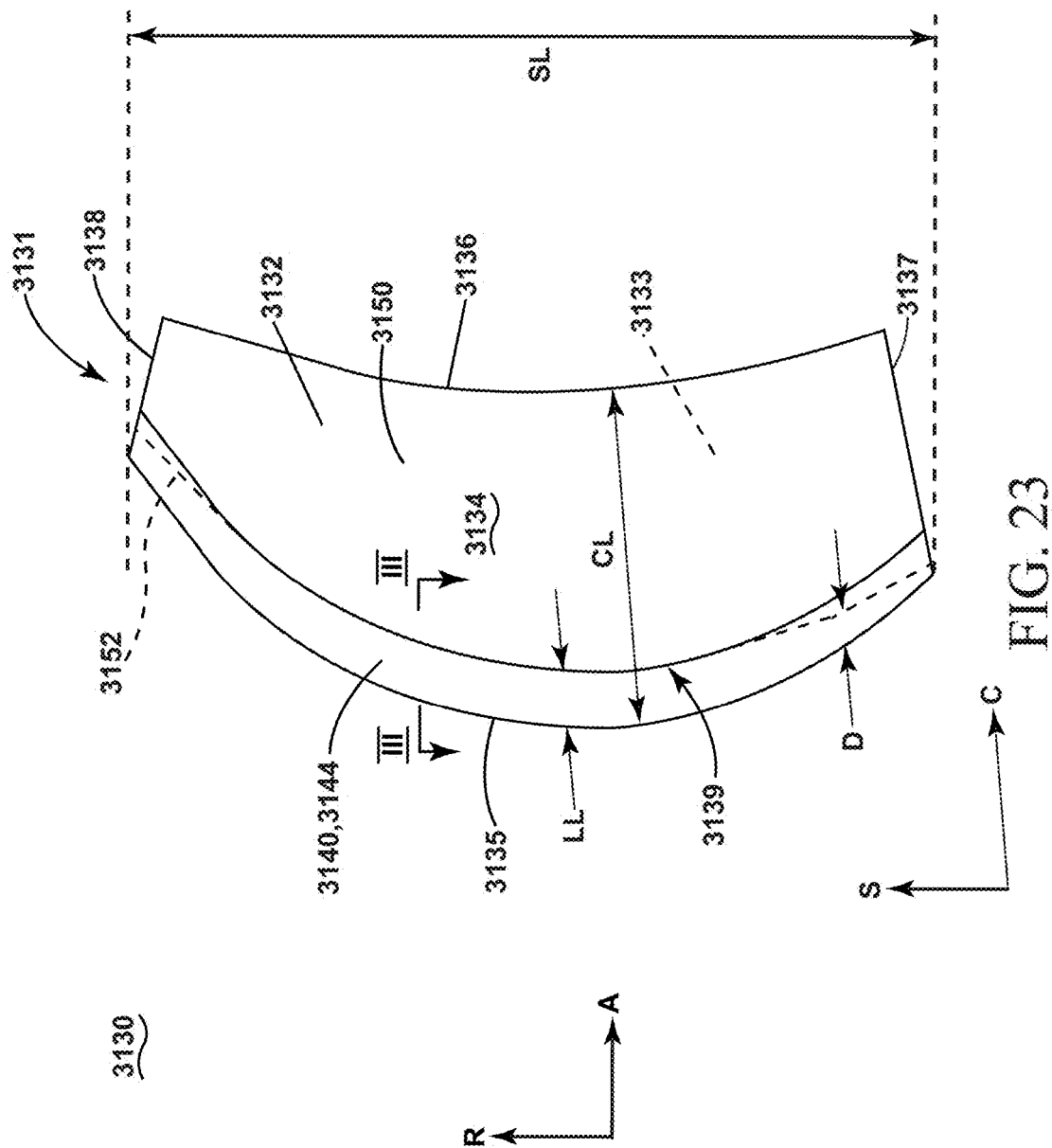
FIG. 23 is a schematic illustration of a composite airfoil in the form of a fan blade.

FIG. 23 is schematic illustration of a composite airfoil 3130 in the form of, by way of non-limiting example, a fan blade 3131. The fan blade 3131 can be, by way of non-limiting example, a blade of the set of fan blades 3042 or a blade from the compressor blades 3057, 3058 or the turbine blades 3068, 3070. Further, the composite airfoil 3130 can be a vane of the set of OGVs 3082 or a vane of the static vanes 3060, 3062, 3072, 3074. It is contemplated that the composite airfoil 3130 can be a blade, vane, airfoil, or other component of any turbine engine, such as, but not limited to, a gas turbine engine, a turboprop engine, a turboshaft engine, or a turbofan engine.

The composite airfoil 3130 can include a wall 3132 bounding an interior 3133. The wall 3132 can define an exterior surface 3134 extending radially between a leading edge 3135 and a trailing edge 3136 to define a chordwise direction (denoted "C"). The composite airfoil 3130 has a chord length (denoted "CL") measured along the chordwise direction C between the leading edge 3135 and the trailing edge 3136. The exterior surface 3134 can further extend between a root 3137 and a tip 3138 to define a spanwise direction (denoted "S"). The composite airfoil 3130 has a span length (denoted "SL") measured along the spanwise direction S between the root 3137 and the tip 3138 where the root is considered 0% of the span length SL and the tip 3138 is considered 100% of the span length SL. The span length SL is the maximum distance between the root 3137 and the tip 3138 of the composite airfoil 3130. It will be understood that the composite airfoil 3130 can take any suitable shape, profile, or form including that the leading edge 3135 need not be curved.

An axial direction (denoted "A") extends generally across the page from right to left. The axial direction A is parallel to the engine centerline 3012 (FIG. 22). A radial direction R extends perpendicularly away from the axial direction A. It should be understood that the spanwise direction S is parallel to the radial direction R. The chordwise direction C can extend generally along the axial direction A, however with more bend in the composite airfoil 3130, it should be understood that the chordwise direction C can extend both into and out of the page and across the page from left to right.

The exterior surface 3134 is defined by a leading edge protector 3140 and a composite portion 3150. A seam 3139, separates the leading edge protector 3140 from the composite portion 3150 along the exterior surface 3134. The leading edge protector 3140 extends along the chordwise direction C between the leading edge 3135 and the seam 3139 to define a leading length (denoted "LL").

The leading edge protector 3140 is typically a metallic leading edge protector and can be made of, but is not limited to, steel, aluminum, refractory metals such as titanium, or superalloys based on nickel, cobalt, or iron. It should be understood that the leading edge protector 3140 for the fan blade 3131 can be a metallic leading edge protector while a set of stationary vanes downstream from the fan blade 3131, by way of non-limiting example the set of OGVs 3082 (FIG. 22), have the second leading edge protector 3140b (FIG. 22) made of a polyurethane material. Further, the leading edge protectors 3140, 3140a, 3140b described herein can be any suitable material such as metal, thermoplastic, or polyurethane, where both are the same, or different.

The composite portion 3150 can include a composite leading edge 3152 spaced a distance (denoted "D") from the leading edge 3135. The composite leading edge 3152 can define at least a portion of, or all of the seam 3139. It is further contemplated that at least a part of the leading edge protector 3140 overlaps the composite portion 3150 such that at least a portion of, illustrated in dashed line, or all of the composite leading edge 3152 is located upstream from the seam 3139. In other words, the leading edge protector 3140 can define a sheath 3144 on the composite leading edge 3152.

The composite portion 3150 can be made of one or more layers of material. The one or more layers of material can be applied during the same stage or different stages of the manufacturing of the composite airfoil 3130. By way of non-limiting example, composite portion 3150 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 3140 and the composite portion 3150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF". In other words, for any given composite airfoil 3130 having a predetermined chord length CL, an amount of coverage provided by the leading edge protector 3140 increases, so does the leading length LL and in turn the APF.

Figure 24:
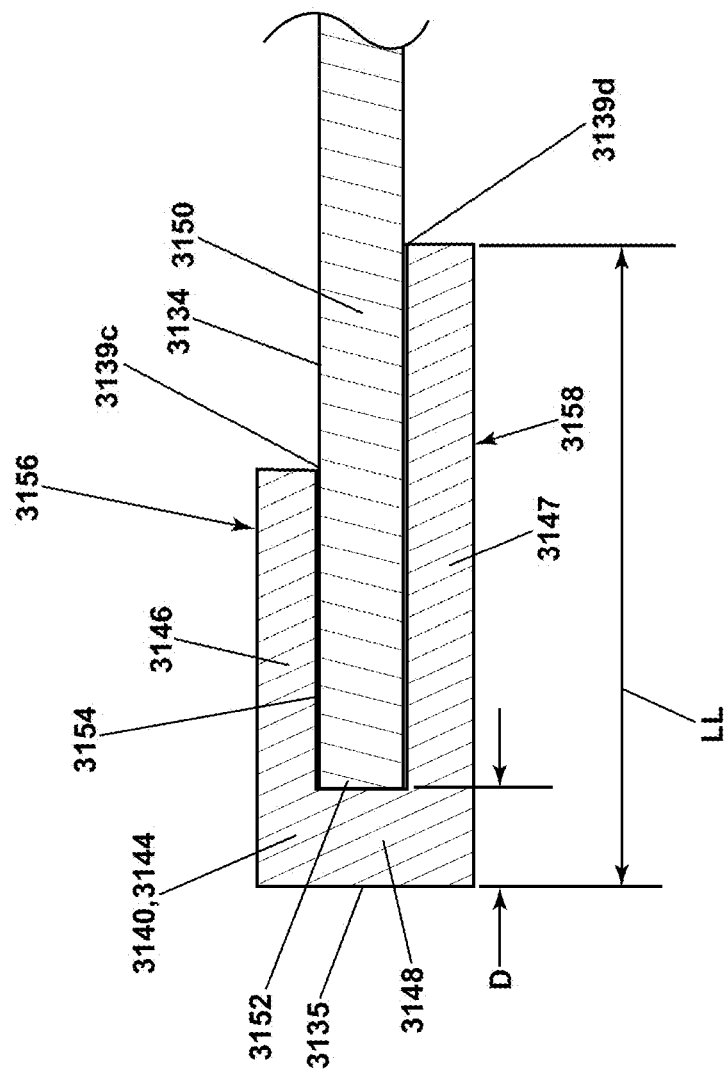
FIG. 24 is a schematic cross-section taken along line III-III of FIG. 23.

FIG. 24 is a schematic cross-section taken along line III-III of FIG. 23. The leading edge protector 3140 is the sheath 3144 with a first wall 3146, a second wall 3147, and a third wall 3148 interconnecting the first wall 3146 and the second wall 3147. The first wall 3146, second wall 3147, and third wall 3148 of the leading edge protector 3140 are oriented and shaped such that they define a generally U-shaped (or C-shaped) channel 3154 therebetween. As shown in FIG. 24 and as will be discussed below, the channel 3154 is sized and shaped to receive the composite leading edge 3152 of the composite portion 3150. Notably, the shape of the channel 3154 is shown by way of example only and the channel 3154 is not limited to this specific shape and is not drawn to scale.

The composite airfoil 3130 can extend between a first side 3156 and a second side 3158. The seam 3139 can be two seams 3139c, 3139d at corresponding ends of the channel 3154. The leading length LL is measured from the leading edge 3135 to the seam 3139d furthest from the leading edge 3135. While illustrated at two different locations, it should be understood that the seams 3139c, 3139d can be located at the same leading length LL. While illustrated as rectangular blunt ends at the seam 3139, the leading edge protector 3140 can taper such that the leading edge protector 3140 and the composite portion 3150 are flush to define the exterior surface 3134.

Figure 25:
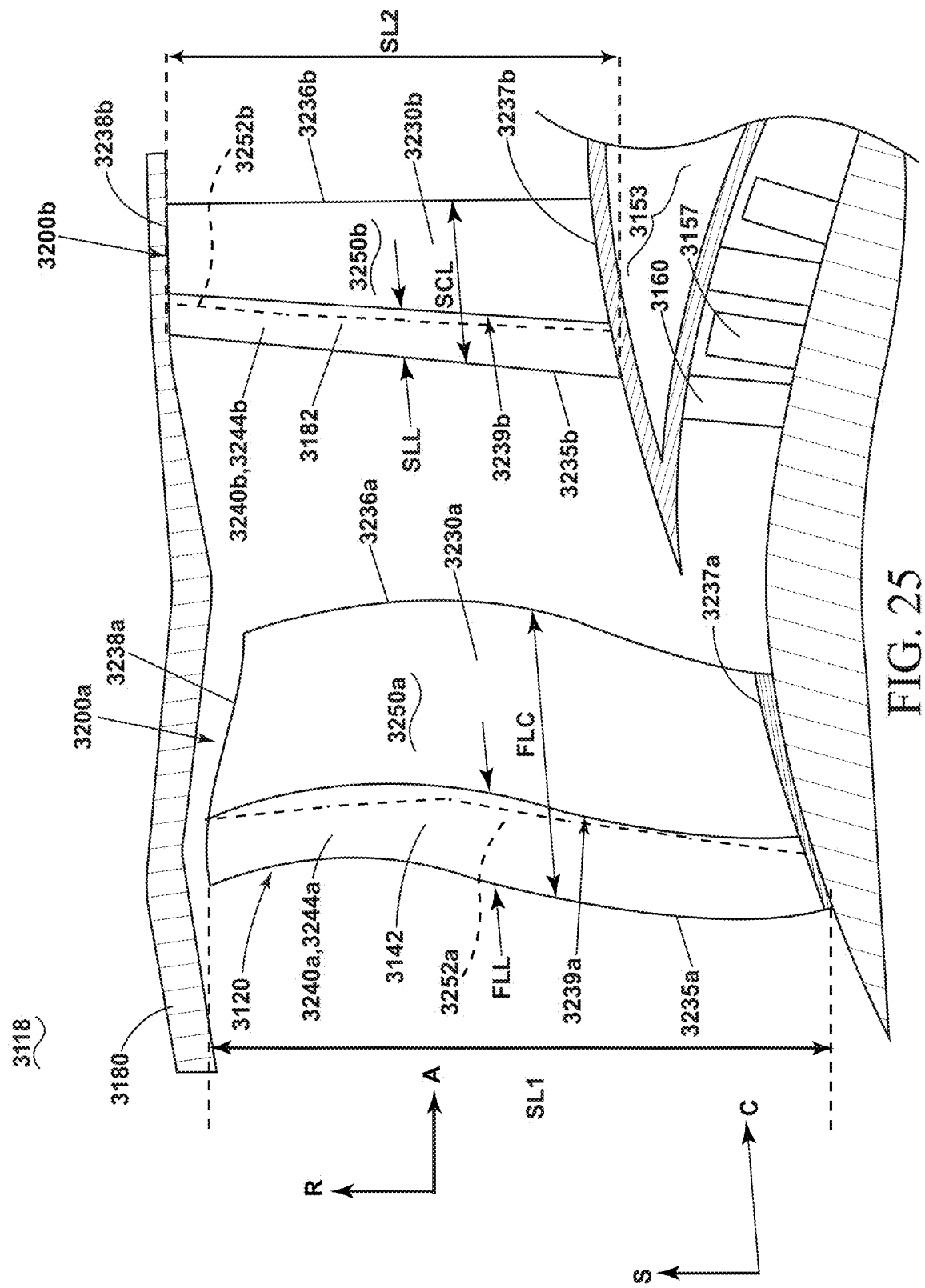
FIG. 25 is a schematic enlarged view of an exemplary fan section for the turbine engine of FIG. 22.

FIG. 25 is schematic enlarged view of a fan section 3118 similar to fan section 3018 therefore, like parts of the fan section 3118 (FIG. 22) will be identified with like numerals increased by 100, with it being understood that the description of the like parts of the fan section 3018 applies to the fan section 3118, except where noted.

A set of compressor stages 3153 include a set of compressor blades 3157 rotating relative to a corresponding set of static compressor vanes 3160. A set of fan blades 3142 define a fan section 3118 including a fan 3120. The turbine engine can include a fan casing 3180 surrounding the fan 3120.

The set of fan blades 3142 defines a first stage of airfoils 3200a within the fan section 3118 (FIG. 22). A first airfoil 3230a in the first stage of airfoils 3200a is similar to the previously described airfoil 3130. Accordingly, like parts of the first airfoil 3230a will be identified with like numerals increased by 100 and having a notation "a" with it being understood that the description of the like parts of the airfoil 3130 applies to the first airfoil 3230a, except where noted. While only a single fan blade is shown in the cross-section it will be understood that that the set of fan blades 3142 are included and spaced about the fan section 3118.

The first airfoil 3230a has a first span length (denoted "SL1") measured along the spanwise direction S between a first root 3237a and a first tip 3238a where the first root 3237a is considered 0% of the first span length SL1 and the first tip 3238a is considered 100% of the first span length SL1. The first span length SL1 is the maximum distance between the first root 3237a and the first tip 3238a of the first airfoil 3230a.

A first leading edge protector 3240a extends along the chordwise direction C between a first leading edge 3235a and a first seam 3239a to define a first leading length (denoted "FLL"). The first airfoil 3230a has a first chord length (denoted "FCL") measured along the chordwise direction C between the first leading edge 3235a and the first trailing edge 3236a.

A relationship between the first leading length (FLL) and the first chord length (FCL) is denoted herein with a first expression of the APF:

$$APF1 = \frac{FLL}{FCL} \qquad \text{Expression (3)}$$

OGVs 3182 define a second stage of airfoils 3200b downstream from the first stage of airfoils 3200a. A second airfoil 3230b in the second stage of airfoils 3200b is similar to the previously described airfoil 3130, therefore like parts of the second airfoil 3230b will be identified with like numerals increased by 100 and having a notation "b" with it being understood that the description of the like parts of the airfoil 3130 applies to the second airfoil 3230b, except where noted. The second airfoil 3230b is located downstream from the first airfoil 3230a. While only a single outlet guide vane 3182 is shown in the cross-section it will be understood that the OGVs 3182 are multiple OGVs spaced about the fan section 3118.

A second leading edge protector 3240b extends along the chordwise direction C between a second leading edge 3235b and a second seam 3239b to define a second leading length (denoted "SLL"). The second airfoil 3230b has a second chord length (denoted "SCL") measured along the chordwise direction C between the second leading edge 3235b and second trailing edge 3236b.

The second airfoil 3230b has a second span length (denoted "SL2") measured along the spanwise direction S between a second root 3237b and a second tip 3238b where the second root 3237b is considered 0% of the second span length SL2 and the second tip 3238b is considered 100% of the second span length SL2. The second span length SL2 is the maximum distance between the second root 3237b and the second tip 3238b of the second airfoil 3230b.

The first and second leading edge protectors 3240a, 3240b can each define first and second sheaths 3244a, 3244b. An exterior surface of each airfoil 3230a, 3230b is defined by the corresponding leading edge protectors 3240a, 3240b and a corresponding composite portion 3250a, 3250b. The composite portions 3250a, 3250b can each include a corresponding composite leading edge 3252a, 3252b which can define at least a portion of, or all of the corresponding seams 3239a, 3239b. A relationship between the second leading length (SLL) and the second chord length (SCL) is denoted herein with a second expression of the APF:

$$APF2 = \frac{SLL}{SCL} \qquad \text{Expression (4)}$$

As will be further discussed herein, the APF describes an amount of protection coverage by the leading edge protector of any of the airfoils 3130, 3230a, 3230b described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 3200a has a first number of airfoils and the second stage of composite airfoils 3200b has a second number of airfoils different than the second number. Put another way, the consecutive stages of airfoils can vary in size and number of airfoils. Further, the first stage of composite airfoils 3200a and the second stage of composite airfoils 3200b can both be configured to rotate.

The number, size, and configuration of the composite airfoils described herein are provided by way of example only. In other exemplary embodiments, the composite airfoils may have any other suitable configuration including that the plurality of airfoils may be in multiple rotor stages, etc.

As described earlier, finding a workable solution that balances the amount of protective covering for the composite airfoil as described herein whilst maintaining a weight requirement is a labor-intensive and time-intensive process, because the process is iterative and involves the selection of multiple composite airfoils with various protector edge lengths and chord lengths. Design procedures require placing said composite airfoil 3130 (FIG. 23) into a turbine engine designed for a first flight operating condition and embodying a protection effectiveness with acceptable weight gain/losses for that first flight operating condition. Evaluating whether in a second, third, or other flight operating condition, the same selected composite airfoil 3130 maintains a heat effectiveness with acceptable protection effectiveness for the other operating conditions is time-intensive and necessitates re-design of the composite airfoil and even the turbine engine in the event the conditions are not met. It is desirable to have an ability to arrive at an optimal composite airfoil, like the composite airfoil(s) described herein, rather than relying on chance. It would be desirable to have a limited or narrowed range of possible composite airfoil configurations for satisfying mission requirements. Such requirements can include protection, weight restrictions, heat transfer, pressure ratio, and noise transmission level requirements, in addition to the ability to survive bird strikes at the time a composite airfoil 3130 is selected and located within an engine.

The investigation sought to find the trade-off balance between leading edge protection and weight gain/loss while satisfying all design requirements because this would yield a more desired composite airfoil suited for specific needs of the engine, as described above. Knowing these trade-offs is also a desirable time saver.

TABLE 1 below illustrates some composite airfoil configurations that yielded workable solutions to the trade-off balance problem.

TABLE 1

| Example: | 1 | 2 | 3 | 4 | 5 | 6 |
|---|---|---|---|---|---|---|
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

It was discovered, unexpectedly, during the course of engine design and the time-consuming iterative process previously described, that a relationship exists between the ratio of the leading length LL to the chord length CL. It has been found that the optimal amount of protective covering of the composite airfoil lies within a specific range based on the leading length LL of the protective covering and the chord length CL of the composite airfoil.

TABLE 2 below illustrates some consecutive composite airfoil stages with workable solutions to the trade-off balance problem. Different span percentages are shown in TABLE 2. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determined APF2.

TABLE 2

| Fan Blade | | | Outlet Guide Vane | | |
|---|---|---|---|---|---|
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | | | |
| | | | 26 | 30.6 | 3.18 |
| 28 | 50.5 | 13.6 | | | |
| 32 | 52.4 | 14.2 | 32 | 30.0 | 3.18 |
| 36 | 54.5 | 14.6 | | | |
| | | | 38 | 29.3 | 3.18 |
| 40 | 56.5 | 15.0 | | | |
| 44 | 58.2 | 15.3 | 44 | 28.7 | 3.18 |
| 48 | 59.4 | 15.5 | | | |
| | | | 50 | 28.1 | 3.18 |
| 52 | 60.1 | 15.7 | | | |
| 56 | 60.6 | 15.6 | 56 | 27.5 | 3.18 |
| 60 | 61.0 | 15.7 | | | |
| | | | 62 | 26.9 | 3.18 |
| 64 | 61.5 | 15.5 | | | |
| 68 | 61.9 | 15.4 | 68 | 26.6 | 3.18 |
| 72 | 65.0 | 15.4 | | | |
| | | | 74 | 26.7 | 3.18 |
| 76 | 63.2 | 15.5 | | | |
| 80 | 64.4 | 15.7 | 80 | 27.4 | 3.18 |

Moreover, utilizing this relationship, it was found that the number of suitable or feasible composite airfoil possibilities for placement in a turbine engine that are capable of meeting the design requirements could be greatly reduced, thereby facilitating a more rapid down-selection of composite airfoils to consider as an engine is being developed. Such benefit provides more insight to the requirements for a given engine, and to the requirements for particular composite airfoil locations within the engine, long before specific technologies, integration, or system requirements are developed fully. The discovered relationship also avoids or prevents late-stage redesign while also providing the composite airfoil with a required protection effectiveness within given weight parameters.

More specifically, a relationship was found between the first expression of the APF, APF1, and the second expression of the APF, APF2, optimizes the protection amount for successive stages of airfoils. This relationship was an unexpected discovery during the course of engine design—i.e., designing multistage airfoil sections such as by way of non-limiting examples fan sections, fan blades, and outlet guide vanes and evaluating the impact that an amount of protection on the fan blade has on a needed amount of protection on the outlet guide vane, or vice versa. Narrowing the options down based on surrounding stages of airfoils can significantly decrease both material and time costs.

In other words, an amount of protection provided by the first leading edge protector 3240a on the first airfoil 3230a can affect an amount of protection necessary for the second airfoil 3230*b* downstream of the first airfoil 3230*a*. This relationship between the multistage airfoils or successive airfoils, such as 3230*a* and 3230*b*, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \quad \text{Expression (5)}$$

More specifically, it was found that for any position between 20% and 80%, inclusive of end points of the span length SL, a desired SPF value is greater than or equal to 0.70 and less than or equal to 4 (0.7≤SPF≤4). The specific range of the span length was chosen because the airfoil may have different properties, profiles, etc. at its distal ends. Conversely, at any position between 20% and 80%, inclusive of end points the airfoil is more uniform and therefore the determined ratios are applicable. Because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

Utilizing this relationship, a better performing airfoil is found in terms of protection amount with acceptable weight increase. The SPF for a set first set of airfoils and a second set of airfoils downstream from the first set of airfoils could be narrowed to an SPF range of greater than or equal to 0.95 and less than or equal to 2.5 (0.95≤SPF≤2.5). Narrowing the SPF range provides more insight to the requirements for a given engine well before specific technologies, integration, and system requirements are fully developed. For instance, as the fan speed is reduced, coverage on the first leading edge 3235*a* by the first leading edge protector can decrease such that the APF1 also decreases. Also, knowing a range for the SPF can prevent or minimize late-stage redesign, decrease material cost, and save time.

The SPF value represents how an amount of protection on a first stage of airfoils, like the first stage of airfoils 3200*a*, impacts an amount of protection necessary for any downstream airfoil stages with respect to the first set of airfoil stages.

In one example, the set of fan blades 3142 illustrated in FIG. 25 can have dimensions of the Fan Blade at 20% from TABLE 2 and the set of outlet guide vanes 182 can have dimensions of the Outlet Guide Vane at 20% from TABLE 2. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 3142 illustrated in FIG. 25 can have dimensions of the Fan Blade at 68% from TABLE 2 and the set of outlet guide vanes 3182 can have dimensions of the Outlet Guide Vane at 68% from TABLE 2. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (5) are provided below in TABLE 3:

TABLE 3

| Parameter | Lower Bound | | Upper Bound | |
|---|---|---|---|---|
| SL (%) | 20 | 80 | 20 | 80 |
| First Airfoil | | | | |
| FCL (cm) | 24 | 32 | 56 | 77 |
| FLL (cm) | 6 | 8 | 13 | 19 |
| Second Airfoil | | | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in TABLE 4 below fit into the composite airfoil dimensions previously described herein. These ranges enable a minimum weight gain for a compact and adequately protected composite airfoils in succession.

TABLE 4

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils downstream of the first airfoils within the ranges provided can be assembled to conform with any fan section, or other downstream stage relationship for blades/vanes and blades/blades. This can include any number of engine designs including ducted and unducted engines as well as a direct-drive configuration and an indirect-drive configuration such as a speed reduction device or a geared-drive configuration.

Figure 26:
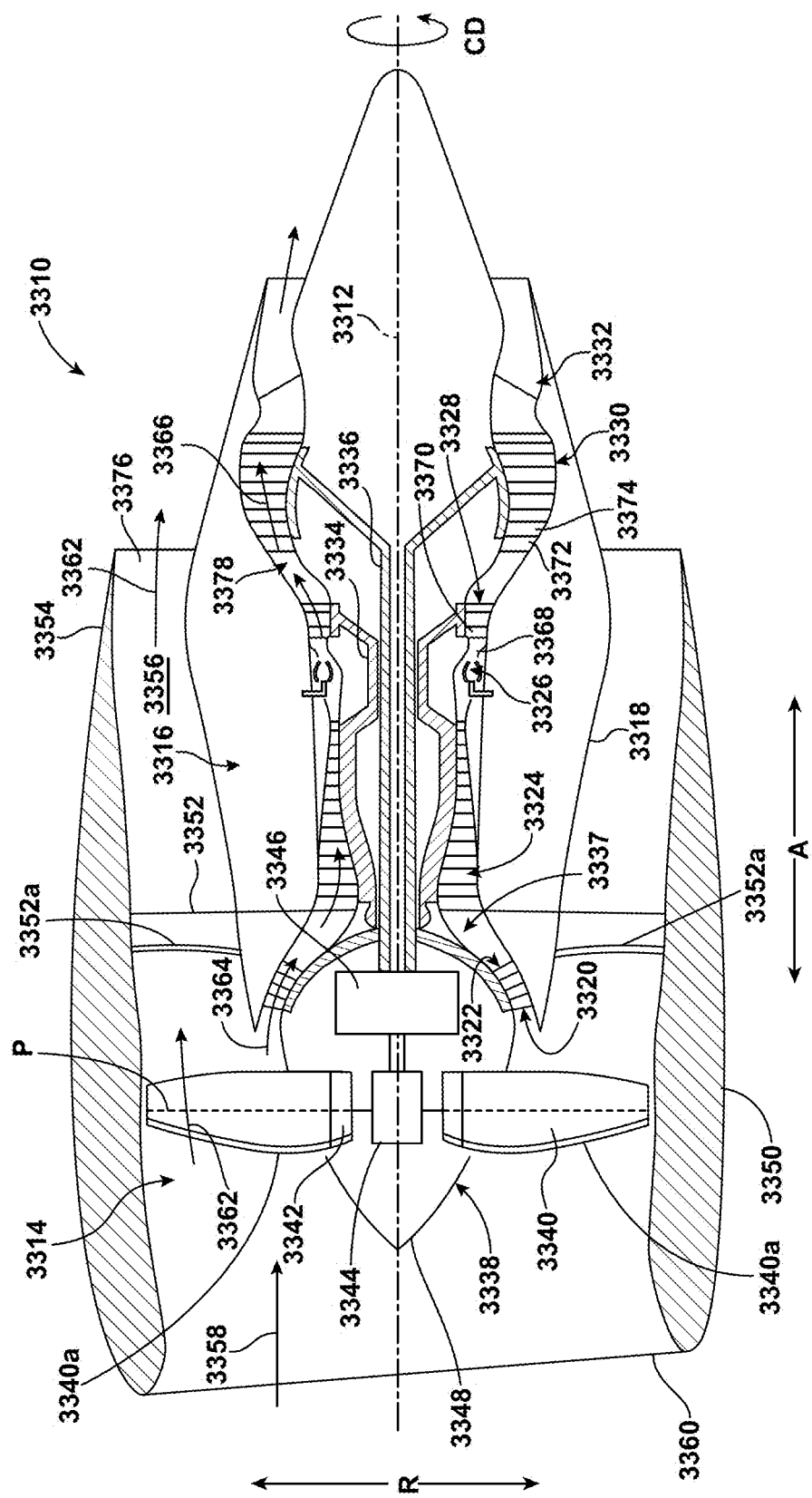
FIG. 26 is a schematic cross-sectional view of a gas turbine engine in accordance with another exemplary embodiment of the present disclosure.

For example, FIG. 26 shows a gas turbine engine 3310 as a high-bypass turbofan jet engine, sometimes also referred to as a turbofan engine, which can include the set of composite airfoils or first and second stages of composite airfoils as described herein. The gas turbine engine 3310 defines an axial direction A (extending parallel to a longitudinal centerline 3312 provided for reference), a radial direction R, and a circumferential direction CD extending about the longitudinal centerline 3312. In general, the gas turbine engine 3310 includes a fan section 3314 and a turbomachine 3316 disposed downstream from the fan section 3314.

The example turbomachine 3316 depicted generally includes a substantially tubular outer casing 3318 that defines an annular inlet 3320. The outer casing 3318 encases, in serial flow relationship, a compressor section including a booster or LP compressor 3322 and a HP compressor 3324, a combustion section 3326, a turbine section including a high pressure (HP) turbine 3328 and a low pressure (LP) turbine 3330, and a jet exhaust nozzle section 3332. A high pressure (HP) shaft 3334, which may additionally or alternatively be a spool, drivingly connects the HP turbine 3328 to the HP compressor 3324. A low pressure (LP) shaft 3336, which may additionally or alternatively be a spool, drivingly connects the LP turbine 3330 to the LP compressor 3322. The compressor section, combustion section 3326, turbine section, and jet exhaust nozzle section 3332 together define a working gas flow path 3337.

In the illustrated non-limiting example, the fan section 3314 includes a fan 3338 having a plurality of fan blades 3340 coupled to a disk 3342 in a spaced apart manner. As depicted, the fan blades 3340 extend outwardly from disk 3342 generally along the radial direction R.

Each fan blade 3340 is rotatable relative to the disk 3342 about a pitch axis P by virtue of the fan blades 3340 being operatively coupled to a suitable pitch change mechanism 3344 configured to collectively vary the pitch of the fan blades 3340, e.g., in unison. The gas turbine engine 3310 further includes a speed reduction device in the form of a power gearbox 3346, and the fan blades 3340, disk 3342, and pitch change mechanism 3344 are together rotatable about the longitudinal centerline 3312 by LP shaft 3336 across the power gearbox 3346. The power gearbox 3346 includes a plurality of gears for adjusting a rotational speed of the fan 3338 relative to a rotational speed of the LP shaft 3336, such that the fan 3338 may rotate at a more efficient fan speed. It will be understood that any suitable speed reduction device configured to adjust the rotation of the fan 3338 relative to the LP shaft 3336 can be utilized and that a power gearbox is merely one example thereof.

A rotatable front hub 3348 of the fan section 3314 covers the disk 3342. The front hub 3348 is also sometimes referred to as a spinner and is aerodynamically contoured to promote an airflow through the plurality of fan blades 3340.

Additionally, the exemplary fan section 3314 includes an annular fan casing or outer nacelle 3350 that circumferentially surrounds the fan 3338, circumferentially surrounds at least a portion of the turbomachine 3316, or a combination thereof. It should be appreciated that the nacelle 3350 is supported relative to the turbomachine 3316 by a plurality of outlet guide vanes 3352, which can be a second stage of airfoils in the non-limiting example. Moreover, a downstream section 3354 of the nacelle 3350 extends over an outer portion of the turbomachine 3316 so as to define a bypass airflow passage 3356 therebetween.

Each fan blade of the plurality of fan blades 3340 may form a composite airfoil and that the plurality of fan blades 3340 can form a first stage of airfoils as described above. More specifically, each of the plurality of fan blades 3340 can include a first leading edge protector 3340a. It will be understood that the plurality of fan blades forming the first stage of airfoils are similar to the previously described airfoils 3130 and 3230a with it being understood that the description of like parts applies to the plurality of fan blades unless otherwise noted.

Further still, each outlet guide vane of the plurality of outlet guide vanes 3352 may form a composite airfoil. Further still, in the illustrated example, the plurality of outlet guide vanes 3352 can form a second stage of airfoils as described above. More specifically, each of the plurality of outlet guide vanes 3352 can include a second leading edge protector 3352a. It will be understood that an outlet guide vane of the plurality of outlet guide vanes 3352 forming the second stage of airfoils is similar to the previously described airfoils 3130 and 3230b with it being understood that the description of like parts applies to the outlet guide vane of the plurality of outlet guide vanes 3352 unless otherwise noted.

It will be understood that the plurality of fan blades 3340 and the plurality of outlet guide vanes 3352 are similar to the previously described first and second airfoil pairs with dimensions fitting in the ranges set out in TABLE 4 above.

During operation of the gas turbine engine 3310, a volume of air 3358 enters the gas turbine engine 3310 through an associated inlet 3360 of the nacelle 3350 and fan section 3314. As the volume of air 3358 passes across the fan blades 3340, a first portion of air 3362 is directed or routed into the bypass airflow passage 3356 and a second portion of air 3364 as indicated by arrow 3364 is directed or routed into the working gas flow path 3337, or more specifically into the LP compressor 3322. The ratio between the first portion of air 3362 and the second portion of air 3364 is commonly known as a bypass ratio. A pressure of the second portion of air 3364 is then increased as it is routed through the HP compressor 3324 and into the combustion section 3326, where it is mixed with fuel and burned to provide combustion gases 3366.

The combustion gases 3366 are routed through the HP turbine 3328 where a portion of thermal and/or kinetic energy from the combustion gases 3366 is extracted via sequential stages of HP turbine stator vanes 3368 that are coupled to the outer casing 3318 and HP turbine rotor blades 3370 that are coupled to the HP shaft 3334, thus causing the HP shaft 3334 to rotate, which supports operation of the HP compressor 3324. The combustion gases 3366 are then routed through the LP turbine 3330 where a second portion of thermal and kinetic energy is extracted from the combustion gases 3366 via sequential stages of LP turbine stator vanes 3372 that are coupled to the outer casing 3318 and LP turbine rotor blades 3374 that are coupled to the LP shaft 3336, thus causing the LP shaft 3336 to rotate, which supports operation of the LP compressor 3322, rotation of the fan 3338, or a combination thereof.

The combustion gases 3366 are subsequently routed through the jet exhaust nozzle section 3332 of the turbomachine 3316 to provide propulsive thrust. Simultaneously, the pressure of the first portion of air 3362 is substantially increased as the first portion of air 3362 is routed through the bypass airflow passage 3356 before it is exhausted from a fan nozzle exhaust section 3376 of the gas turbine engine 3310, also providing propulsive thrust. The HP turbine 3328, the LP turbine 3330, and the jet exhaust nozzle section 3332 at least partially define a hot gas path 3378 for routing the combustion gases 3366 through the turbomachine 3316.

As previously described, the stages of airfoils exemplary gas turbine engine 3310 depicted in FIG. 26 is by example only, and that in other exemplary embodiments, the gas turbine engine 3310 may have other configurations. For instance, although the gas turbine engine 3310 depicted is configured as a ducted gas turbine engine (i.e., including the outer nacelle 3350, also referred to herein as a turbofan engine), in other embodiments, the gas turbine engine 3310 may be an unducted gas turbine engine (such that the fan 3338 is an unducted fan, and the outlet guide vanes 3352 are cantilevered from the outer casing 3318; see, e.g., FIG. 27; also referred to herein as an open rotor engine). Additionally, or alternatively, although the gas turbine engine 3310 depicted is configured as a variable pitch gas turbine engine (i.e., including a fan 3338 configured as a variable pitch fan), in other embodiments, the gas turbine engine 3310 may alternatively be configured as a fixed pitch gas turbine engine (such that the fan 3338 includes fan blades 3340 that are not rotatable about a pitch axis P).

Figure 27:
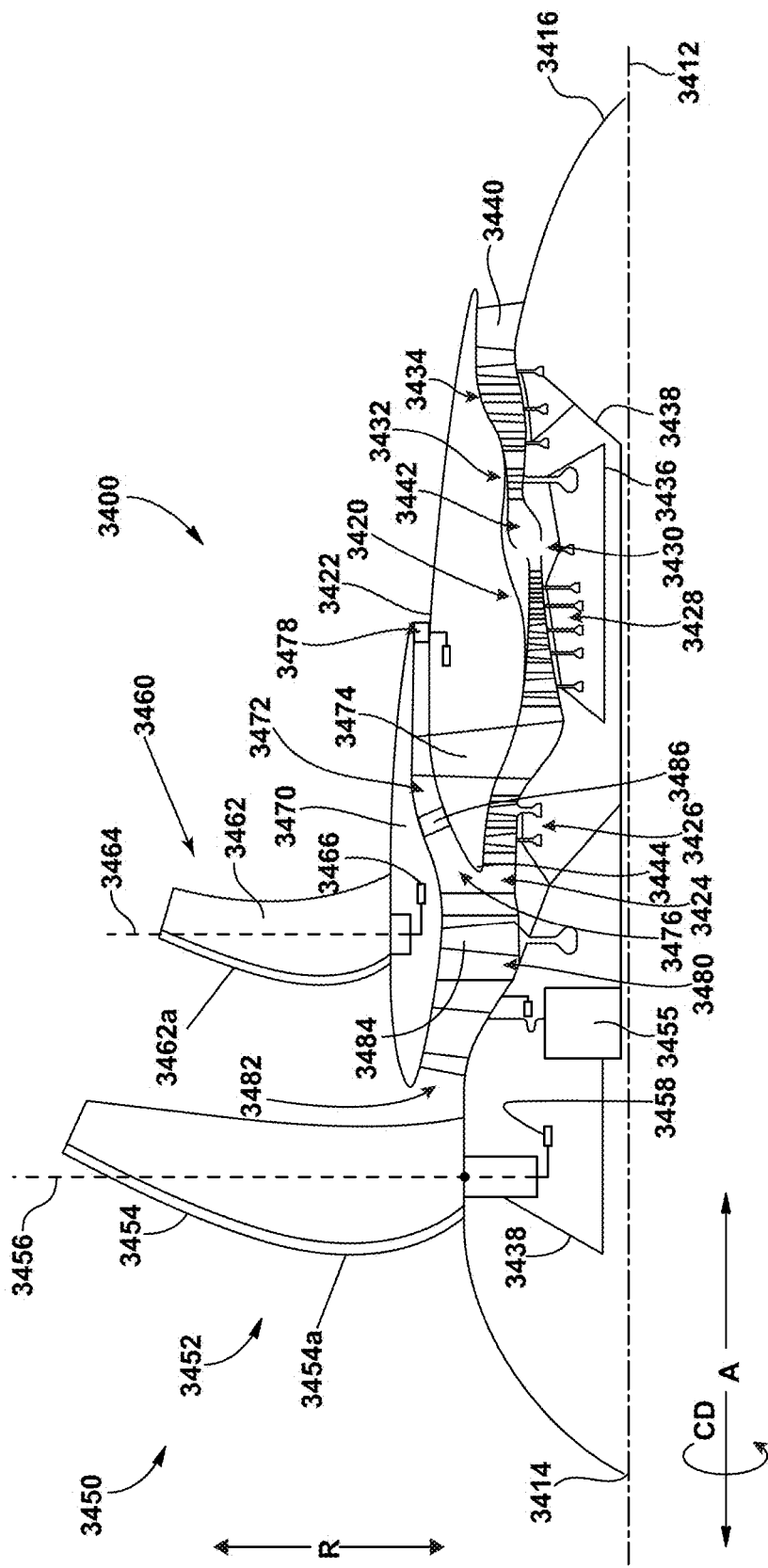
FIG. 27 is a schematic cross-sectional view of a gas turbine engine in accordance with another exemplary embodiment of the present disclosure.

FIG. 27, illustrates another non-limiting example of a gas turbine engine 3400, which can include the set of composite airfoils or first and second stages of composite airfoils as described herein. The exemplary gas turbine engine 3400 of FIG. 27 may be configured in substantially the same manner as the exemplary gas turbine engine 3310 described above with reference to FIG. 26.

For example, the exemplary gas turbine engine 3400 defines an axial direction A, a radial direction R, and a circumferential direction CD. Moreover, the engine 3400 defines an axial centerline, longitudinal axis or engine centerline 3412 that extends along the axial direction A. In general, the axial direction A extends parallel to the engine centerline 3412, the radial direction R extends outward from and inward to the engine centerline 3412 in a direction orthogonal to the axial direction A, and the circumferential direction CD extends three hundred sixty degrees (360°) around the engine centerline 3412. The engine 3400 extends between a forward end 3414 and an aft end 3416, e.g., along the axial direction A.

Further, the exemplary gas turbine engine 3400 generally includes a fan section 3450 and a turbomachine 3420. Generally, the turbomachine 3420 includes, in serial flow order, a compressor section, a combustion section, a turbine section, and an exhaust section. In a non-limiting example, the turbomachine 3420 includes a core cowl 3422 that defines a core inlet 3424 that is annular. The core cowl 3422 further encloses at least in part a low pressure system and a high pressure system. For example, the core cowl 3422 depicted encloses and supports at least in part a booster or low pressure ("LP") compressor 3426, a high pressure ("HP") compressor 3428, a combustor 3430, a high pressure turbine 3432, and a low pressure turbine 3434. The high pressure turbine 3432 drives the high pressure compressor 3428 through a high pressure shaft 3436. The low pressure turbine 3434 drives the low pressure compressor 3426 and components of the fan section 3450 through a low pressure shaft 3438. After driving each of the high pressure turbine 3432 and the low pressure turbine 3434, combustion products exit the turbomachine 3420 through a turbomachine exhaust nozzle 3440.

In this manner, the turbomachine 3420 defines a working gas flow path or core duct 3442 that extends between the core inlet 3424 and the turbomachine exhaust nozzle 3440. The core duct 3442 is an annular duct positioned generally inward of the core cowl 3422 along the radial direction R. The core duct 3442 may be referred to as a second stream.

The fan section 3450 includes a fan 3452, which is the primary fan in non-limiting example. One difference is that the fan 3452 is an open rotor or unducted fan. In such a manner, the gas turbine engine 3400 may be referred to as an open rotor engine. The fan 3452 includes fan blades 3454, while only a single flan blade is illustrated in FIG. 27 it will be understood that an array of fan blades are included. Moreover, the fan blades 3454 can be arranged in equal spacing around the engine centerline 3412. Each fan blade 3454 has a root and a tip and a span defined therebetween. Each fan blade 3454 defines a central blade axis 3456. For this embodiment, each fan blade 3454 of the fan 3452 is rotatable about its central blade axis 3456, e.g., in unison with one another. One or more actuators 3458 are provided to facilitate such rotation and therefore may be used to change a pitch of the fan blades 3454.

The fan blades 3454 are rotatable about the engine centerline 3412. As noted above, the fan 3452 is drivingly coupled with the low pressure turbine 3434 via the LP shaft 3438. In a non-limiting example, the fan 3452 is coupled with the LP shaft 3438 via a speed reduction device, which can include by way of non-limiting examples a power gearbox or a speed reduction gearbox 3455, e.g., in an indirect-drive or geared-drive configuration.

The fan section 3450 further includes a fan guide vane array 3460 that includes fan guide vanes 3462, again while only one fan guide vane is shown in FIG. 27 it will be understood that the fan guide vanes 3462 are disposed around the engine centerline 3412. The fan guide vanes 3462 are mounted to the fan cowl 3470. In a non-limiting example, the fan guide vanes 3462 are not rotatable about the engine centerline 3412. Each of the fan guide vanes 3462 has a root and a tip and a span defined therebetween. The fan guide vanes 3462 may be unshrouded as shown in FIG. 27 or, alternatively, may be shrouded, e.g., by an annular shroud spaced outward from the tips of the fan guide vanes 3462 along the radial direction R or attached to the fan guide vanes 3462.

Each fan guide vane 3462 defines a central blade axis 3464. For example, each of the fan guide vanes 3462 of the fan guide vane array 3460 is rotatable about its respective central blade axis 3464, e.g., in unison with one another. One or more actuators 3466 are provided to facilitate such rotation and therefore may be used to change a pitch of the fan guide vane 3462 about its respective central blade axis 3464. However, in other embodiments, each of the fan guide vanes 3462 may be fixed or unable to be pitched about its central blade axis 3464.

Each of the fan blades 3454 may form a composite airfoil and that the fan blades 3454 can form a first stage of airfoils as described above. More specifically, each of the fan blades 3454 can include a first leading edge protector 3454a. It will be understood that the fan blades 3454 forming the first stage of airfoils are similar to the previously described airfoils 3130, 3230a, and 3340 with it being understood that the description of like parts applies to the fan blades unless otherwise noted.

Further still, it will be understood that each of the fan guide vanes 3462 may form a composite airfoil. Further still, in the illustrated example, the fan guide vanes 3462 can form a second stage of airfoils as described above. More specifically, each of the fan guide vanes 3462 can include a second leading edge protector 3462a. It will be understood that the fan guide vanes 3462 forming the second stage of airfoils is similar to the previously described airfoils 3130, 3230b, and 3352 with it being understood that the description of like parts applies to the fan guide vanes 3462 unless otherwise noted.

It will be understood that the fan blades 3454 and the fan guide vanes 3462 are similar to the previously described first and second airfoil pairs with dimensions fitting in the ranges set out in TABLE 4 above.

Another difference is that the illustrated example in FIG. 27, in addition to the unducted fan 3452, shows a ducted fan 3484 included aft of the fan 3452. In this manner, the engine 3400 includes both a ducted fan 3484 and an unducted fan 3452, which both serve to generate thrust through the movement of air without passage through at least a portion of the turbomachine 3420 (e.g., without passage through the HP compressor 3428 and combustion section for the embodiment depicted). The ducted fan 3484 is rotatable about the engine centerline 3412. The ducted fan 3484 is, by way of non-limiting example, driven by the low pressure turbine 3434 (e.g. coupled to the LP shaft 3438). The fan 3452 may be referred to as the primary fan, and the ducted fan 3484 may be referred to as a secondary fan. It will be appreciated that these terms "primary" and "secondary" are terms of convenience, and do not imply any particular importance, power, or the like.

The ducted fan 3484 includes a plurality of fan blades (not separately labeled in FIG. 27) arranged in a single stage, such that the ducted fan 3484 may be referred to as a single stage fan. The fan blades of the ducted fan 3484 can be arranged in equal spacing around the engine centerline 3412. Each blade of the ducted fan 3484 has a root and a tip and a span defined therebetween.

The fan cowl 3470 annularly encases at least a portion of the core cowl 3422 and is generally positioned outward of at least a portion of the core cowl 3422 along the radial direction R. Particularly, a downstream section of the fan cowl 3470 extends over a forward portion of the core cowl 3422 to define a fan duct flowpath, or simply a fan duct 3472. The fan flowpath or fan duct 3472 may be understood as forming at least a portion of the third stream of the engine 3400.

Incoming air may enter through the fan duct 3472 through a fan duct inlet 3476 and may exit through a fan exhaust nozzle 3478 to produce propulsive thrust. The fan duct 3472 is an annular duct positioned generally outward of the core duct 3442 along the radial direction R. The fan cowl 3470 and the core cowl 3422 are connected together and supported by a plurality of substantially radially extending, circumferentially-spaced stationary struts 3474 (only one of which is shown in FIG. 27). The stationary struts 3474 may each be aerodynamically contoured to direct air flowing thereby. Other struts in addition to the stationary struts 3474 may be used to connect and support the fan cowl 3470, the core cowl 3422, or a combination thereof. In many embodiments, the fan duct 3472 and the core duct 3442 may at least partially co-extend axially on opposite radial sides of the core cowl 3422. For example, the fan duct 3472 and the core duct 3442 may each extend directly from a leading edge 3444 of the core cowl 3422 and may partially co-extend generally axially on opposite radial sides of the core cowl 3422.

The engine 3400 also defines or includes an inlet duct 3480. The inlet duct 3480 extends between the engine inlet 3482 and the core inlet 3424, the fan duct inlet 3476, or a combination thereof. The engine inlet 3482 is defined generally at the forward end of the fan cowl 3470 and is positioned between the fan 3452 and the fan guide vane array 3460 along the axial direction A. The inlet duct 3480 is an annular duct that is positioned inward of the fan cowl 3470 along the radial direction R. Air flowing downstream along the inlet duct 3480 is split, not necessarily evenly, into the core duct 3442 and the fan duct 3472 by a fan duct splitter or leading edge 3444 of the core cowl 3422. In the illustrated example, the inlet duct 3480 is wider than the core duct 3442 along the radial direction R. The inlet duct 3480 is also wider than the fan duct 3472 along the radial direction R.

Air passing through the fan duct 3472 may be relatively cooler than one or more fluids utilized in the turbomachine 3420. In this way, one or more heat exchangers 3486 may be positioned in thermal communication with the fan duct 3472. For example, one or more heat exchangers 3486 may be disposed within the fan duct 3472 and utilized to cool one or more fluids from the core engine with the air passing through the fan duct 3472, as a resource for removing heat from a fluid, e.g., compressor bleed air, oil or fuel. The heat exchanger 3486 may be an annular heat exchanger.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

Benefits associated with the SPF described herein include a quick assessment of design parameters in terms of composite airfoils in downstream relationship. Further, the SPF described herein enables a quick visualization of tradeoffs in terms of geometry that are bounded by the constraints imposed by the materials used, the available space in which the composite airfoils are located, the type of turbine engine or system enclosures and the configuration of surrounding components, or any other design constraint. The SPF enables the manufacturing of a high performing composite airfoil with peak performance with the factors available. While narrowing these multiple factors to a region of possibilities saves time, money, and resources, the largest benefit is at the system level, where the composite airfoils described herein enable improved system performance. Previously developed composite airfoils may peak in one area of performance by design but lose efficiency or lifetime benefits in another area of performance. In other words, the stage performance factor enables the development and production of higher performing composite airfoils across multiple performance metrics within a given set of constraints.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 4 and 8 through 11. The method includes operating the gas turbine engine at a takeoff power level, the gas turbine engine having a turbomachine with a high pressure compressor defining a high pressure compressor exit area (AHPCExit) in square inches. The gas turbine engine further defines a redline exhaust gas temperature (EGT) in degrees Celsius, a total sea level static thrust output (FnTotal) in pounds, and a corrected specific thrust. The corrected specific thrust is greater than or equal to 42 and less than or equal to 90, the corrected specific thrust determined as follows: FnTotal×EGT/(AHPCExit2×1000).

In certain exemplary aspects, operating the gas turbine engine at the takeoff power level further includes reducing a temperature of a cooling airflow provided to a high pressure turbine of the gas turbine engine with a cooled cooling air system. For example, in certain exemplary aspects, reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

As will be appreciated from the description herein, various embodiments of a gas turbine engine are provided. Certain of these embodiments may be an unducted, single rotor gas turbine engine (see FIG. 1), a turboprop engine, or a ducted turbofan engine (see FIG. 8). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the FIGS.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft2) or greater at cruise altitude during a cruise operating mode. In particular embodiments of the engine, structures and methods provided herein generate power loading between 80 hp/ft2 and 160 hp/ft2 or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio $R1/R2$ may be between 1 and 10, or 2 and 7, or at least 3.3, at least 3.5, at least 4 and less than or equal to 7, where $R1$ is the radius of the primary fan and $R2$ is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 3.2 to 12 or within a range of 4.5 to 11.0. Similarly, in some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 6 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the compressor section having a high pressure compressor defining a high pressure compressor exit area (AHPCExit) in square inches; wherein the gas turbine engine defines a redline exhaust gas temperature (EGT) in degrees Celsius, a total sea level static thrust output (FnTotal) in pounds, and a corrected specific thrust, wherein the corrected specific thrust is greater than or equal to 42 and less than or equal to 90, the corrected specific determined as follows: FnTotal×EGT/(AHPCExit2×1000).

The gas turbine engine of the preceding clauses wherein the turbine section comprises a set of airfoils comprising a set of fan blades and a set of outlet guide vanes downstream from the set of fan blades and wherein the set of fan blades includes composite fan blades; or wherein the turbine section comprises a plurality of splitter airfoils extending from a flowpath surface of a portion of the turbine section.

The gas turbine engine of the preceding clauses wherein the corrected specific thrust is from 42 to 90, such as from 45 to 80, such as from 50 to 80.

The gas turbine engine of the preceding clauses, wherein the EGT is greater than 1000 degrees Celsius and less than 1300 degrees Celsius.

The gas turbine engine of any preceding clause, wherein the EGT is greater than 1100 degree Celsius and less than 1250 degrees Celsius.

The gas turbine engine of any preceding clause, wherein the EGT is greater than 1150 degree Celsius and less than 1250 degrees Celsius.

The gas turbine engine of any preceding clause, wherein the EGT is greater than 1000 degree Celsius and less than 1300 degrees Celsius, and wherein the corrected specific thrust is greater than or equal to 45.

The gas turbine engine of any preceding clause, wherein the EGT is greater than 1000 degree Celsius and less than 1300 degrees Celsius, and wherein the corrected specific thrust is greater than or equal to 50 and less than or equal to 90.

The gas turbine engine of any preceding clause, wherein the turbine section comprises a high pressure turbine having a first stage of high pressure turbine rotor blades, and wherein the gas turbine engine further comprises: a cooled cooling air system in fluid communication with the first stage of high pressure turbine rotor blades.

The gas turbine engine of one or more of the preceding clauses, wherein the cooled cooling air system is further in fluid communication with the high pressure compressor for receiving an airflow from the high pressure compressor, and wherein the cooled cooling air system further comprises a heat exchanger in thermal communication with the airflow for cooling the airflow.

The gas turbine engine of any preceding clause, wherein when the gas turbine engine is operated at a takeoff power level, the cooled cooling air system is configured to provide a temperature reduction of a cooling airflow equal to at least 15% of the EGT and up to 45% of the EGT.

The gas turbine engine of any preceding clause, wherein when the gas turbine engine is operated at a takeoff power level, the cooled cooling air system is configured to receive between 2.5% and 35% of an airflow through a working gas flowpath of the turbomachine at an inlet to a compressor of the compressor section.

The gas turbine engine of any preceding clause, further comprising a primary fan driven by the turbomachine.

The gas turbine engine of any preceding clause, further comprising an inlet duct downstream of the primary fan and upstream of the compressor section of the turbomachine; and a secondary fan located within the inlet duct.

The gas turbine engine of any preceding clause, wherein the gas turbine engine defines a bypass passage over the turbomachine, and wherein the gas turbine engine defines a third stream extending from a location downstream of the secondary fan to the bypass passage.

The gas turbine engine of any preceding clause, wherein the secondary fan is a single stage secondary fan.

The gas turbine engine of any preceding clause, further comprising: an engine core defining an engine centerline and comprising a rotor and a stator; a first stage of composite airfoils circumferentially arranged about the engine centerline and defining at least a portion of the rotor. A first airfoil of the first stage of composite airfoils comprises a first composite portion extending chordwise between a first composite leading edge and a first trailing edge; a first leading edge protector receiving at least a portion of the first composite leading edge of the first composite portion, the first leading edge protector extending chordwise from a first leading edge towards the first composite portion for a first leading length (FLL); and the first composite portion and the first leading edge protector together defining an exterior surface of the first airfoil and extending chordwise between the first leading edge and the first trailing edge to define a first chord length (FCL). A second stage of composite airfoils located downstream of the first stage of composite airfoils and circumferentially arranged about the engine centerline. A second airfoil of the second stage of composite airfoils comprises a second composite portion extending chordwise between a second composite leading edge and a second trailing edge; a second leading edge protector receiving at least a portion of the second composite leading edge of the second composite portion, the second leading edge protector extending chordwise from a second leading edge towards the second composite portion for a second leading length (SLL); and the second composite portion and the second leading edge protector together defining an exterior surface of the second airfoil and extending chordwise between the second leading edge and the second trailing edge to define a second chord length (SCL); wherein the first leading length (FLL) and the first chord length (FCL) are related to the second leading length (SLL) and the second chord length (SCL) by a stage protection factor (SPF), wherein $$SPF = \frac{(FLL/FCL)}{(SLL/SCL)}$$

and SPF is greater than or equal to 0.7 and less than or equal to 4 ($0.7 \leq SPF \leq 4$).

The gas turbine engine of any preceding clause wherein the first airfoil extends spanwise between a first root and a first tip to define a first span length and the second airfoil extends spanwise between a second root and a second tip to define a second span length less than the first span length.

The gas turbine engine of any preceding clause, wherein the SPF is determined at a location between 20% and 80% of the first span length and the second span length, inclusive of endpoints.

The gas turbine engine of any preceding clause, wherein the SPF is greater than or equal to 0.95 and less than or equal to 2.5 ($0.95 \leq SPF \leq 2.5$).

The gas turbine engine of any preceding clause, wherein the first leading length (FLL) ranges from 6 cm to 19 cm and the second leading length (SLL) ranges from 1.5 cm to 4 cm.

The gas turbine engine of any preceding clause, wherein the first chord length (FCL) ranges from 24 cm to 77 cm and the second chord length (SCL) ranges from 9.3 cm to 31 cm.

The gas turbine engine of any preceding clause, further comprising: an engine core defining an engine centerline and comprising a rotor and a stator; a set of composite airfoils comprising a set of fan blades and a set of outlet guide vanes downstream from the set of fan blades, the set of composite airfoils circumferentially arranged about the engine centerline and defining at least a portion of the rotor. An airfoil of the set of composite airfoils comprises a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) is related to the chord length (CL) by an airfoil protection factor (APF)=(LL)/(CL) and a first APF (APF1) for the set of fan blades is greater than or equal to 0.2 and less than or equal to 0.30 ($0.2 \leq APF1 \leq 0.3$) and a second APF (APF2) for the set of outlet guide vanes is greater than or equal to 0.08 and less than or equal to 0.17 ($0.08 \leq APF2 \leq 0.17$).

The gas turbine engine of any preceding clause, wherein the first airfoil protection factor (APF1) relates to the second airfoil protection factor (APF2) by an expression: APF1/APF2 to define a stage protection factor (SPF), wherein the SPF is greater than or equal to 0.95 and less than or equal to 2.5 ($0.95 < SPF < 2.5$).

The gas turbine engine of any preceding clause, wherein the composite airfoils in the set of composite airfoils extend spanwise between a root and a tip to define a span length and the APF is determined at a location between 20% and 80% of the span length.

The gas turbine engine of any preceding clause, wherein the leading length ranges from 6 cm to 19 cm for the set of fan blades and from 1.5 cm to 4 cm for the set of outlet guide vanes.

The gas turbine engine of any preceding clause, wherein the chord length ranges from 24 cm to 77 cm for the set of fan blades and from 9.3 cm to 31 cm for the set of outlet guide vanes.

The gas turbine engine of any preceding clause, wherein the turbine section includes: a turbine component defining an arcuate flowpath surface; an array of axial-flow turbine airfoils extending from the flowpath surface, the turbine airfoils defining spaces therebetween; and a plurality of splitter airfoils extending from the flowpath surface in the spaces between the turbine airfoils, wherein each of the plurality of splitter airfoils has opposed pressure and suction sides extending between a leading edge and a trailing edge, wherein the splitter airfoils have a thickness ratio less than a thickness ratio of the turbine airfoils.

The gas turbine engine of any preceding clause, wherein each of the plurality of splitter airfoils only extends partially in a radial direction between an outer band and an inner band of the turbine component so as to form a radial gap between a radial tip of each of the splitter airfoils and the inner band or the outer band.

The gas turbine engine of any preceding clause, wherein each of the splitter airfoils only extends partially in a radial direction between an outer band and an inner band of the turbine rotor stage or the turbine nozzle stage so as to form a radial gap between a radial tip of each of the splitter airfoils and the inner band or the outer band.

A method of operating a gas turbine engine, comprising: operating the gas turbine engine at a takeoff power level, the gas turbine engine having a turbomachine with a high pressure compressor defining a high pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust; wherein the corrected specific thrust is greater than or equal to 42 and less than or equal to 90, the corrected specific determined as follows: $Fn_{Total} \times EGT/(A_{HPCExit}^2 \times 1000)$.

The method of any preceding clause, wherein the EGT defined by the gas turbine engine is greater than 1000 degree Celsius and less than 1300 degrees Celsius.

The method of any preceding clause, wherein the EGT defined by the gas turbine engine is greater than 1100 degree Celsius and less than 1300 degrees Celsius.

The method of any preceding clause, wherein the EGT defined by the gas turbine engine is greater than 1000 degree Celsius and less than 1300 degrees Celsius, and wherein the corrected specific thrust defined by the gas turbine engine is greater than or equal to 45.

The method of any preceding clause, wherein operating the gas turbine engine at the takeoff power level further comprises reducing a temperature of a cooling airflow provided to a high pressure turbine of the gas turbine engine with a cooled cooling air system.

The method of any preceding clause, wherein reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

The gas turbine engine of any preceding clause, wherein the cooled cooling air systems includes a thermal bus cooled cooling air system (see, e.g., FIGS. 4 and 5).

The gas turbine engine of any preceding clause, wherein the cooled cooling air systems includes a dedicated heat exchanger cooled cooling air system (i.e., a cooled cooling air system including a heat exchanger dedicated to the cooled cooling air system).

The gas turbine engine of any preceding clause, wherein the cooled cooling air systems includes a bypass heat exchanger cooled cooling air system having a heat sink heat exchanger thermally coupled to an airflow through a bypass passage (see, e.g., FIG. 9).

The gas turbine engine of any preceding clause, wherein the cooled cooling air systems includes an air-to-air cooled cooling air system (a cooled cooling air system having a heat sink heat exchanger configured to transfer heat to an airflow; see, e.g., FIG. 9).

The gas turbine engine of any preceding clause, wherein the cooled cooling air systems includes an oil-to-air cooled cooling air system (a cooled cooling air system having a heat sink heat exchanger configured to transfer heat to an oil flow).

The gas turbine engine of any preceding clause, wherein the cooled cooling air systems includes a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4). or a combination thereof. In one or more of the exemplary cooled cooling air systems described herein, the The gas turbine engine of any preceding clause, wherein the cooled cooling air systems is configured to receive the cooling air from a downstream end of a high pressure compressor.

The gas turbine engine of any preceding clause, wherein the cooled cooling air systems is configured to receive the cooling air from an upstream end of the high pressure compressor.

The gas turbine engine of any preceding clause, wherein the cooled cooling air systems is configured to receive the cooling air from a downstream end of a low pressure compressor.

The gas turbine engine of any preceding clause, wherein the cooled cooling air systems is configured to receive the cooling air from an upstream end of the low pressure compressor.

The gas turbine engine of any preceding clause, wherein the cooled cooling air systems is configured to receive the cooling air from a location between compressors.

The gas turbine engine of any preceding clause, wherein the cooled cooling air systems is configured to receive the cooling air from a bypass passage.

We claim:

1. A gas turbine engine comprising:
  a turbomachine comprising a compressor section, a combustion section, and a turbine section arranged in serial flow order, the compressor section having a high pressure compressor defining a high pressure compressor exit area ($A_{HPCExit}$) in square inches;
  a set of airfoils comprising a set of fan blades and a set of outlet guide vanes downstream from the set of fan blades;
  wherein the set of fan blades includes composite fan blades;
  wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$.

2. The gas turbine engine of claim 1, wherein the EGT is greater than 1150 degree Celsius and less than 1250 degrees Celsius.

3. The gas turbine engine of claim 1, wherein the EGT is greater than 1000 degree Celsius and less than 1300 degrees Celsius, and wherein the corrected specific thrust is greater than or equal to 50 and less than or equal to 90.

4. The gas turbine engine of claim 1, wherein the turbine section comprises a high pressure turbine having a first stage of high pressure turbine rotor blades comprising composite rotor blades, and wherein the gas turbine engine further comprises:
  a cooled cooling air system in fluid communication with the first stage of high pressure turbine rotor blades.

5. The gas turbine engine of claim 4, wherein when the gas turbine engine is operated at a takeoff power level, the cooled cooling air system is configured to provide a temperature reduction of a cooling airflow equal to at least 15% of the EGT and up to 45% of the EGT.

6. The gas turbine engine of claim 4, wherein when the gas turbine engine is operated at a takeoff power level, the cooled cooling air system is configured to receive between 2.5% and 35% of an airflow through a working gas flowpath of the turbomachine at an inlet to a compressor of the compressor section.

7. The gas turbine engine of claim 1, wherein the turbine section includes:
a turbine component defining an arcuate flowpath surface;
an array of axial-flow turbine airfoils extending from the flowpath surface, the turbine airfoils defining spaces therebetween; and
a plurality of splitter airfoils extending from the flowpath surface in the spaces between the turbine airfoils,
wherein each of the plurality of splitter airfoils has opposed pressure and suction sides extending between a leading edge and a trailing edge,
wherein the splitter airfoils have a thickness ratio less than a thickness ratio of the turbine airfoils.

8. The gas turbine engine of claim 7 wherein each of the plurality of splitter airfoils only extends partially in a radial direction between an outer band and an inner band of the turbine component so as to form a radial gap between a radial tip of each of the splitter airfoils and the inner band or the outer band.

9. The gas turbine engine of claim 7 wherein each of the splitter airfoils only extends partially in a radial direction between an outer band and an inner band of a turbine rotor stage or a turbine nozzle stage so as to form a radial gap between a radial tip of each of the splitter airfoils and the inner band or the outer band.

10. A gas turbine engine comprising:
a turbomachine comprising a compressor section, a combustion section, and a turbine section arranged in serial flow order, the compressor section having a high pressure compressor defining a high pressure compressor exit area ($A_{HPCExit}$) in square inches, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows:
$Fn_{Total} \times EGT/(A_{HPCExit}^2 \times 1000)$;
an engine core defining an engine centerline and comprising a rotor and a stator;
a first stage of composite airfoils circumferentially arranged about the engine centerline and defining at least a portion of the rotor, a first airfoil of the first stage of composite airfoils comprising:
a first composite portion extending chordwise between a first composite leading edge and a first trailing edge;
a first leading edge protector receiving at least a portion of the first composite leading edge of the first composite portion, the first leading edge protector extending chordwise from a first leading edge towards the first composite portion for a first leading length (FLL); and
the first composite portion and the first leading edge protector together defining an exterior surface of the first airfoil and extending chordwise between the first leading edge and the first trailing edge to define a first chord length (FCL);
a second stage of composite airfoils located downstream of the first stage of composite airfoils and circumferentially arranged about the engine centerline, a second airfoil of the second stage of composite airfoils comprising:
a second composite portion extending chordwise between a second composite leading edge and a second trailing edge;
a second leading edge protector receiving at least a portion of the second composite leading edge of the second composite portion, the second leading edge protector extending chordwise from a second leading edge towards the second composite portion for a second leading length (SLL); and
the second composite portion and the second leading edge protector together defining an exterior surface of the second airfoil and extending chordwise between the second leading edge and the second trailing edge to define a second chord length (SCL);
wherein the first leading length (FLL) and the first chord length (FCL) are related to the second leading length (SLL) and the second chord length (SCL) by a stage protection factor (SPF),
wherein $$SPF = \frac{(FLL/FCL)}{(SLL/SCL)}$$

and SPF is greater than or equal to 0.7 and less than or equal to 4 (0.7≤SPF≤4).

11. The turbine engine of claim 10, wherein the SPF is determined at a location between 20% and 80% of the first span length and the second span length, inclusive of endpoints.

12. The turbine engine of claim 10, wherein the SPF is greater than or equal to 0.95 and less than or equal to 2.5 (0.95≤SPF≤2.5).

13. The turbine engine of claim 10, wherein the first leading length (FLL) ranges from 6 cm to 19 cm and the second leading length (SLL) ranges from 1.5 cm to 4 cm.

14. The turbine engine of claim 10, wherein the first chord length (FCL) ranges from 24 cm to 77 cm and the second chord length (SCL) ranges from 9.3 cm to 31 cm.

15. A gas turbine engine comprising:
a turbomachine comprising a compressor section, a combustion section, and a turbine section arranged in serial flow order, the compressor section having a high pressure compressor defining a high pressure compressor exit area ($A_{HPCExit}$) in square inches, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows:
$Fn_{Total} \times EGT/(A_{HPCExit}^2 \times 1000)$;
an engine core defining an engine centerline and comprising a rotor and a stator;
a set of composite airfoils comprising a set of fan blades and a set of outlet guide vanes downstream from the set of fan blades, the set of composite airfoils circumferentially arranged about the engine centerline and defining at least a portion of the rotor, an airfoil of the set of composite airfoils comprising:
a composite portion extending chordwise between a composite leading edge and a trailing edge;
a leading edge protector coupled to the composite portion at the composite leading edge to define a seam, and extending chordwise between a leading edge and the seam to define a leading length (LL); and
the composite portion and the leading edge protector together defining an exterior surface of the airfoil and extending chordwise between the leading edge and the trailing edge to define a chord length (CL);
wherein the leading length (LL) is related to the chord length (CL) by an airfoil protection factor (APF)=(LL)/(CL) and a first APF (APF1) for the set of fan blades is greater than or equal to 0.2 and less than or equal to 0.30 ($0.2 \leq APF1 \leq 0.3$) and a second APF (APF2) for the set of outlet guide vanes is greater than or equal to 0.08 and less than or equal to 0.17 ($0.08 \leq APF2 \leq 0.17$).

16. The turbine engine of claim 15 wherein the first airfoil protection factor (APF1) relates to the second airfoil protection factor (APF2) by an expression: APF1/APF2 to define a stage protection factor (SPF), wherein the SPF is greater than or equal to 0.95 and less than or equal to 2.5 ($0.95 < SPF < 2.5$).

17. A gas turbine engine comprising:
a turbomachine comprising a compressor section, a combustion section, and a turbine section arranged in serial flow order, the compressor section having a high pressure compressor defining a high pressure compressor exit area ($A_{HPCExit}$) in square inches;
wherein the turbine section comprises a plurality of splitter airfoils extending from an arcuate flowpath surface of a portion of the turbine section;
wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$.

18. The gas turbine engine of claim 17, wherein the turbine section includes:
a turbine component defining the arcuate flowpath surface;
an array of axial-flow turbine airfoils extending from the flowpath surface, the turbine airfoils defining spaces therebetween; and
wherein the plurality of splitter airfoils extend from the flowpath surface in the spaces between the turbine airfoils,
wherein each of the plurality of splitter airfoils has opposed pressure and suction sides extending between a leading edge and a trailing edge,
wherein the splitter airfoils have a thickness ratio less than a thickness ratio of the turbine airfoils.

19. The gas turbine engine of claim 18 wherein each of the plurality of splitter airfoils only extends partially in a radial direction between an outer band and an inner band of the turbine component so as to form a radial gap between a radial tip of each of the splitter airfoils and the inner band or the outer band.

20. The gas turbine engine of claim 18 wherein each of the splitter airfoils only extends partially in a radial direction between an outer band and an inner band of a turbine rotor stage or a turbine nozzle stage so as to form a radial gap between a radial tip of each of the splitter airfoils and the inner band or the outer band.

* * * * *